United States Patent
Yoshimoto et al.

(10) Patent No.: US 8,253,861 B2
(45) Date of Patent: Aug. 28, 2012

(54) DISPLAY DEVICE, METHOD OF ADJUSTING THE IMAGE QUALITY OF THE DISPLAY DEVICE, DEVICE FOR ADJUSTING THE IMAGE QUALITY AND DEVICE FOR ADJUSTING THE CONTRAST

(75) Inventors: Takumi Yoshimoto, Kobe (JP); Minoru Maehata, Kobe (JP); Kanako Nishida, Kobe (JP); Momoko Fujiwara, Kobe (JP); Kiyoshi Hamatani, Kobe (JP); Tomoki Saito, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 1233 days.

(21) Appl. No.: 11/665,800

(22) PCT Filed: Oct. 20, 2005

(86) PCT No.: PCT/JP2005/019740
§ 371 (c)(1),
(2), (4) Date: Apr. 19, 2007

(87) PCT Pub. No.: WO2006/043720
PCT Pub. Date: Apr. 27, 2006

(65) Prior Publication Data
US 2007/0296874 A1 Dec. 27, 2007

(30) Foreign Application Priority Data

| Oct. 20, 2004 | (JP) | 2004-305773 |
| Jun. 15, 2005 | (JP) | 2005-175547 |
| Jun. 30, 2005 | (JP) | 2005-193219 |
| Sep. 1, 2005 | (JP) | 2005-253073 |
| Sep. 20, 2005 | (JP) | 2005-272668 |

(51) Int. Cl.
H04N 5/50 (2006.01)
(52) U.S. Cl. ...................................................... 348/564
(58) Field of Classification Search ................... None
See application file for complete search history.

(56) References Cited

U.S. PATENT DOCUMENTS

| 4,642,693 A | 2/1987 | Fuse et al. | |
| 5,087,976 A * | 2/1992 | Oda et al. | 348/25 |
| 5,822,002 A * | 10/1998 | Tokoro et al. | 348/383 |
| 5,990,940 A * | 11/1999 | Hashimoto et al. | 348/184 |
| 6,046,849 A | 4/2000 | Moseley et al. | |
| 6,055,013 A | 4/2000 | Woodgate et al. | |
| 6,055,103 A | 4/2000 | Woodgate et al. | |
| 6,377,295 B1 | 4/2002 | Woodgate et al. | |

(Continued)

FOREIGN PATENT DOCUMENTS
EP 0 982 709 A1 3/2000
(Continued)

OTHER PUBLICATIONS

Toru Yamane et al., "Fall 2-5 DUAL AVN Development," Fujitsu Ten Technical Journal, No. 26, pp. 17-22, 2006.

(Continued)

Primary Examiner — Paulos Natnael
(74) Attorney, Agent, or Firm — Oliff & Berridge, PLC

(57) ABSTRACT

A display device having a multi-view display panel (45) for displaying, on the common screen, individual images for more than one viewing direction and having image quality adjustment circuits (41, 42) for individually adjusting the quality of an image corresponding to each of the individual images.

7 Claims, 37 Drawing Sheets

U.S. PATENT DOCUMENTS

| | | | |
|---|---|---|---|
| 6,437,915 B2 | 8/2002 | Moseley et al. | |
| 6,624,863 B1 | 9/2003 | Jacobs et al. | |
| 6,724,450 B1 | 4/2004 | Knoll et al. | |
| 6,727,909 B1 * | 4/2004 | Matsumura et al. | 345/629 |
| 6,760,075 B2 * | 7/2004 | Mayer et al. | 348/383 |
| 6,791,624 B1 * | 9/2004 | Suga | 348/588 |
| 6,804,406 B1 * | 10/2004 | Chen | 382/254 |
| 7,415,166 B2 * | 8/2008 | Kubota | 382/284 |
| 7,782,409 B2 * | 8/2010 | Kean et al. | 349/15 |
| 2002/0050986 A1 | 5/2002 | Inoue et al. | |
| 2004/0075665 A1 * | 4/2004 | Ito | 345/581 |
| 2004/0263887 A1 * | 12/2004 | Kotani | 358/1.9 |

FOREIGN PATENT DOCUMENTS

| | | |
|---|---|---|
| GB | 2405546 A * | 2/2005 |
| GB | 2 405 546 A | 3/2005 |
| JP | A 58-164390 | 9/1983 |
| JP | A-58-164390 | 9/1983 |
| JP | A 60-247379 | 12/1985 |
| JP | A-04-166988 | 6/1992 |
| JP | A 6-186526 | 7/1994 |
| JP | A 6-236152 | 8/1994 |
| JP | A 9-46622 | 2/1997 |
| JP | A 10-123461 | 5/1998 |
| JP | A 11-84131 | 3/1999 |
| JP | A 11-331876 | 11/1999 |
| JP | A 2000-36927 | 2/2000 |
| JP | A 2000-137443 | 5/2000 |
| JP | A 2000-137462 | 5/2000 |
| JP | B2 3194024 | 6/2001 |
| JP | A-2001-275137 | 10/2001 |
| JP | A 2002-52018 | 2/2002 |
| JP | A 2002-171459 | 6/2002 |
| JP | A 2003-137005 | 5/2003 |
| JP | A-2003-208132 | 7/2003 |
| JP | A-2003-241720 | 8/2003 |
| JP | A 2004-206089 | 7/2004 |
| JP | A-2004-212648 | 7/2004 |
| JP | A 2004-233816 | 8/2004 |
| JP | A 2005-71286 | 3/2005 |
| JP | A 2005-73076 | 3/2005 |
| JP | A 2005-284592 | 10/2005 |
| WO | WO 99/62049 | 12/1999 |
| WO | WO 2004/016460 A1 | 2/2004 |
| WO | WO 2004/055769 A1 | 7/2004 |

OTHER PUBLICATIONS

Oct. 19, 2010 Office Action issued in Japanese Patent Application No. 2006-010077 (with translation).

Aug. 9, 2011 Office Action issued in Japanese Patent Application No. 2006-010077 (with translation).

Oct. 19, 2010 Office Action issued in Japanese Patent Application No. 2005-272668 (with translation).

Aug. 23, 2011 Office Action issued in Japanese Patent Application No. 2005-272668 (with translation).

Oct. 26, 2010 Office Action issued in Japanese Patent Application No. 2005-253073 (with translation).

Feb. 24, 2012 Extended European Search Report issued in European Application No. 05 799 360.2.

* cited by examiner

Fig.16
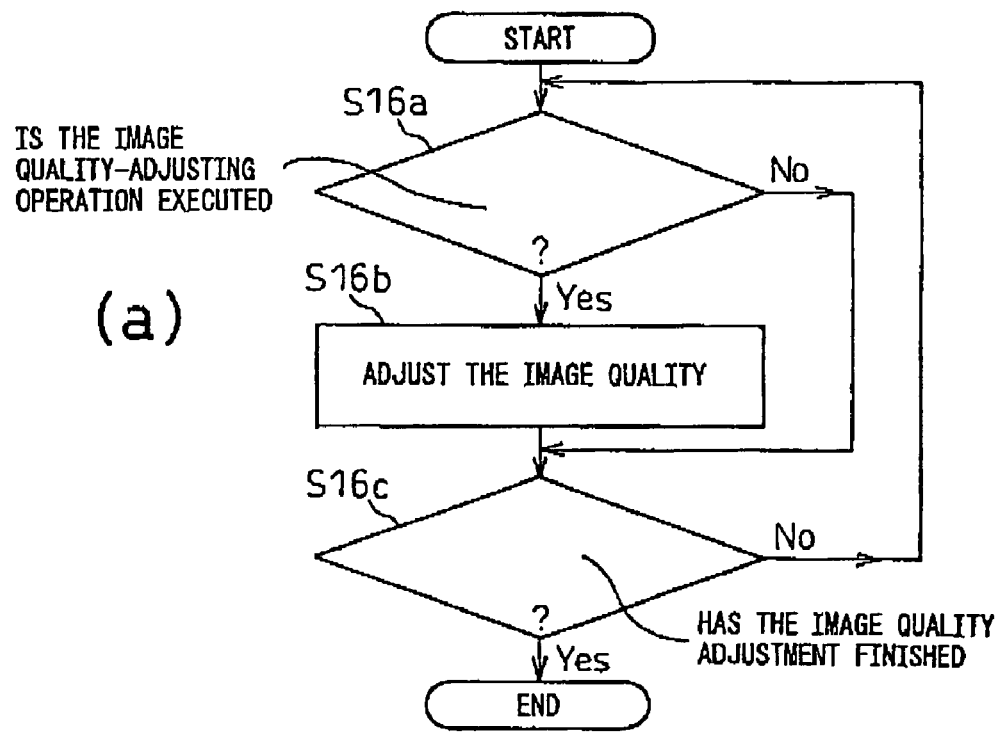
(a)
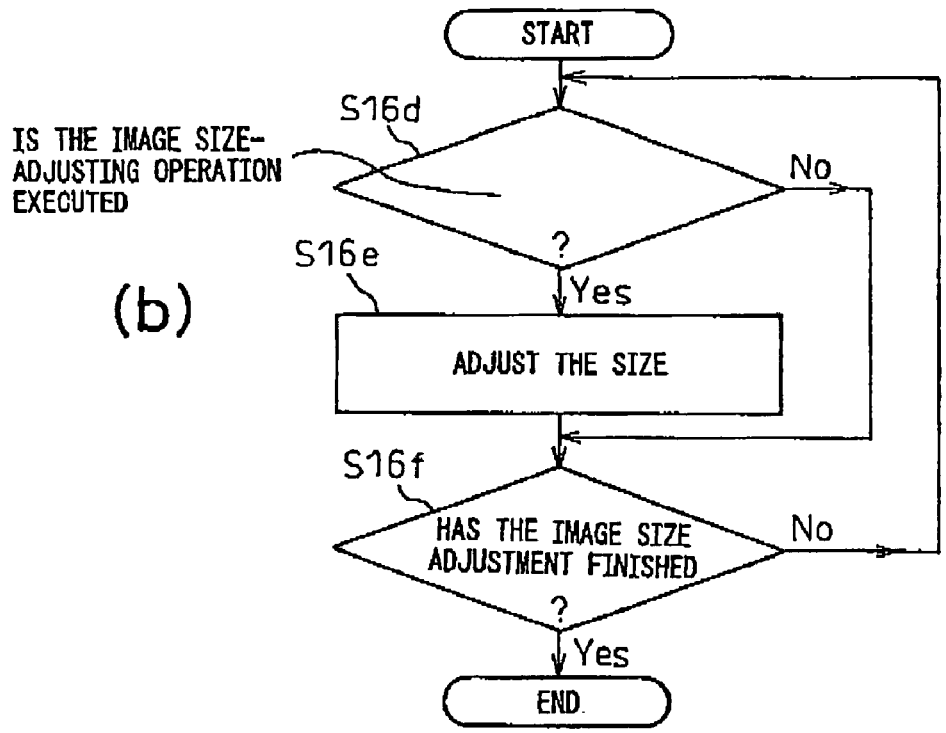
(b)

Fig. 24
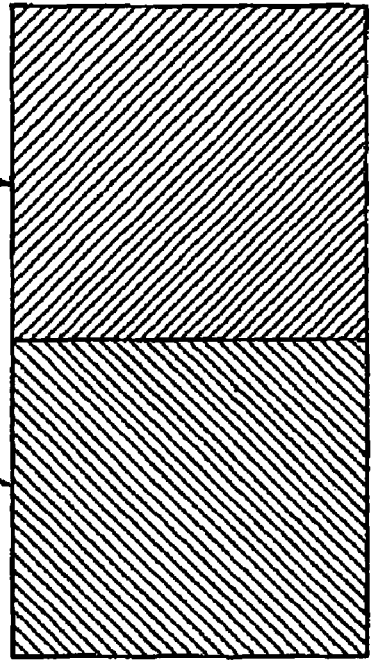
(b)
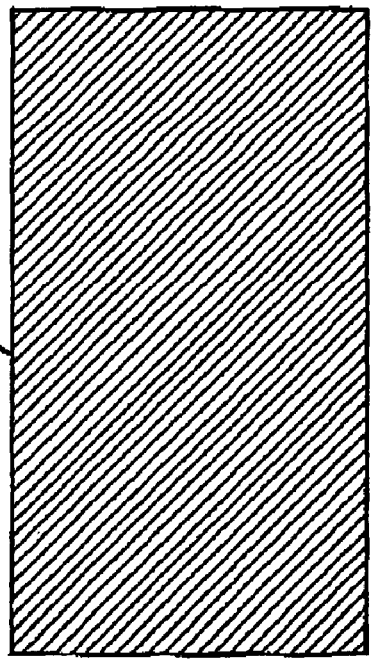
(a)

Fig.25
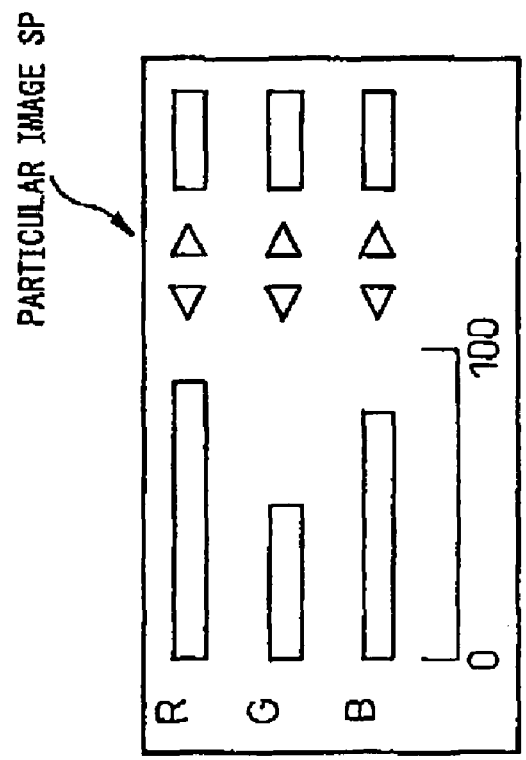
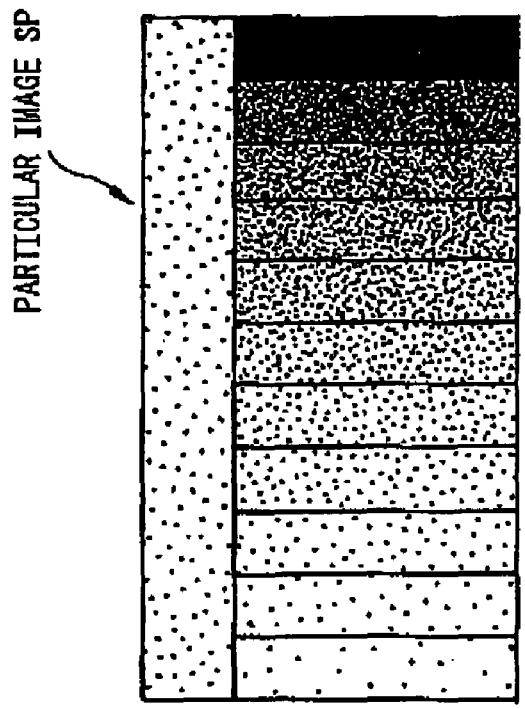

Fig.26
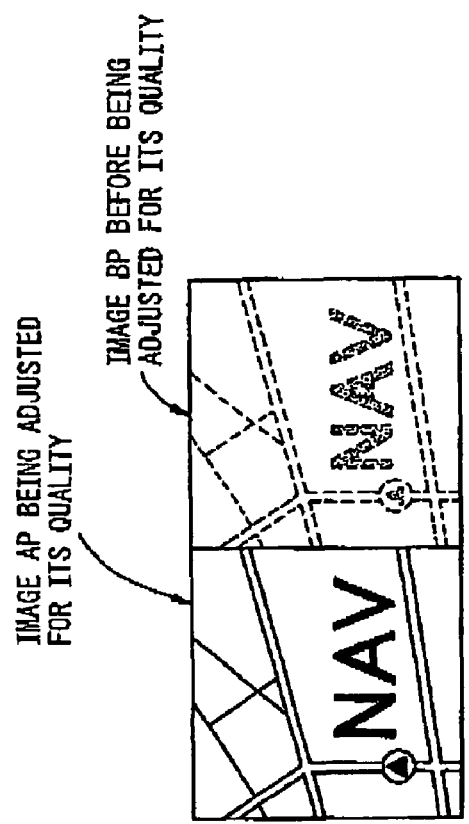
(b)
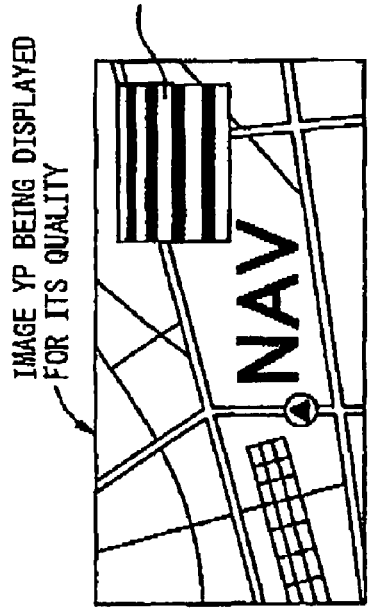
(a)

FROM STEP S22s OF FIG. 22
↓
STORE — S24i
↓
TO END OF FIG. 22

(b)

| REGION | SOURCE | ENVIRONMENT VALUE | IMAGE QUALITY ADJUST SETPOINT | FREQUENCY |
|---|---|---|---|---|
| FIRST REGION | SOURCE A | ○ | ○ | ○ |
| FIRST REGION | SOURCE A | △ | △ | △ |
| FIRST REGION | SOURCE A | × | × | × |
| FIRST REGION | SOURCE B | ○○ | ○○ | ○○ |
| ⋮ | ⋮ | ⋮ | ⋮ | ⋮ |
| SECOND REGION | SOURCE A | ● | ● | ● |
| SECOND REGION | SOURCE A | ▲ | ▲ | ▲ |
| SECOND REGION | SOURCE A | ▼ | ▼ | ▼ |
| SECOND REGION | SOURCE B | ●● | ●● | ●● |
| ⋮ | ⋮ | ⋮ | ⋮ | ⋮ |

Fig.39
(A)
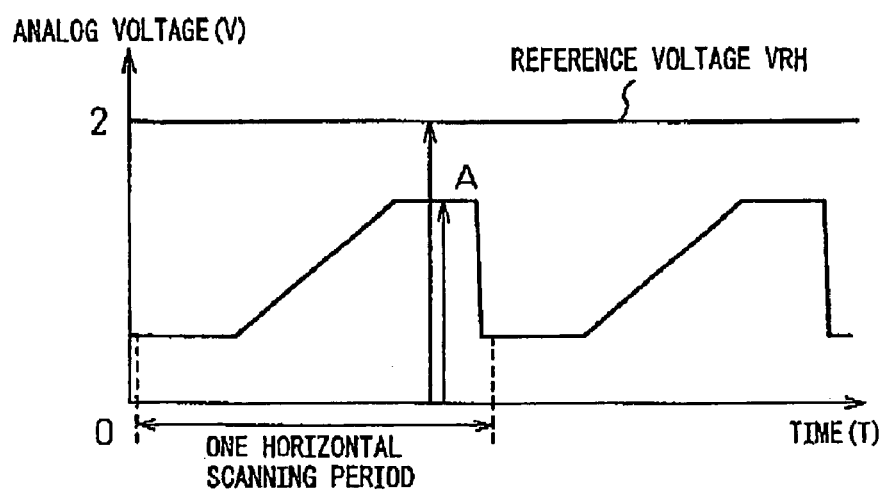
(B)
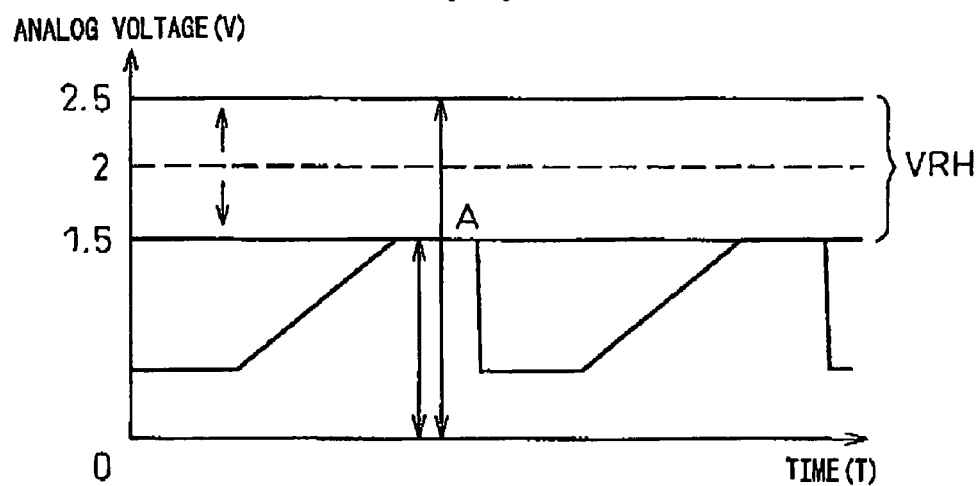

Fig.40
(A)
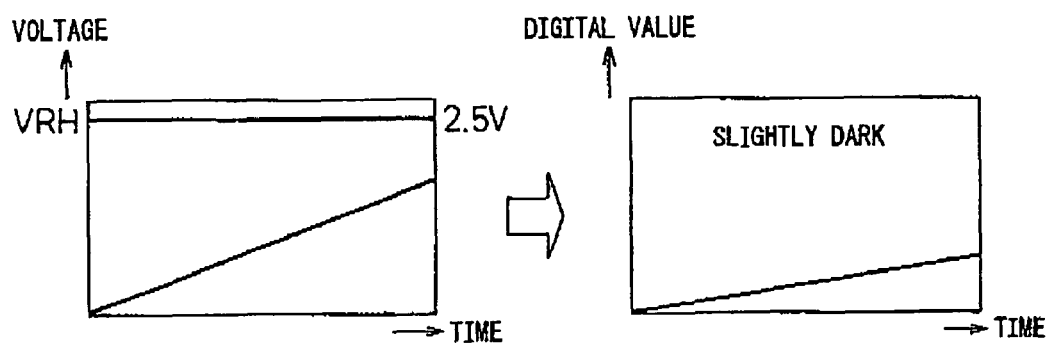
(B)
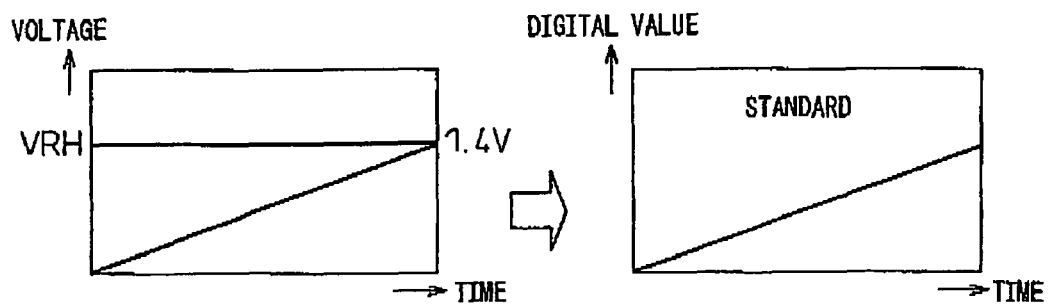
(C)
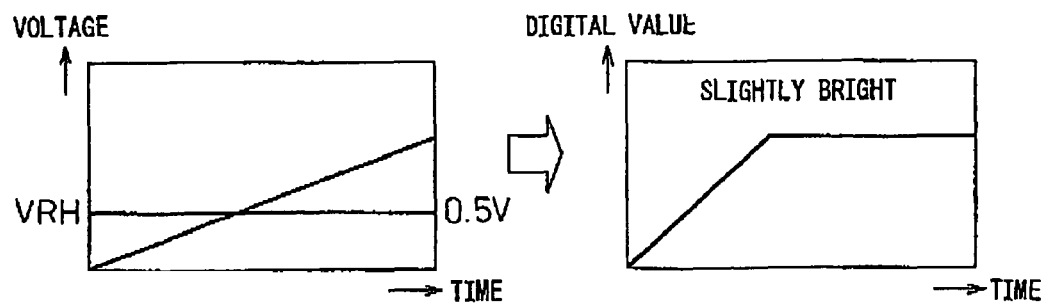

DISPLAY DEVICE, METHOD OF ADJUSTING THE IMAGE QUALITY OF THE DISPLAY DEVICE, DEVICE FOR ADJUSTING THE IMAGE QUALITY AND DEVICE FOR ADJUSTING THE CONTRAST

CROSS REFERENCE TO RELATED APPLICATION

This is a Continuation Application No. PCT/JP2005/019740 filed on Oct. 20, 2005. The entire disclosure of the prior application is hereby incorporated by reference herein in its entirety.

BACKGROUND OF THE INVENTION

1. Field of the Invention

The present invention relates to a display device or a so-called multi-view display device capable of displaying individual images for a plurality of viewing directions on a common screen. The multi-view display device is capable of offering individual and different data substantially simultaneously for a plurality of users on a single screen. The invention further relates to a method of adjusting the image quality in a display device which is capable of displaying individual images for a plurality of viewing directions on the common screen. The invention further relates to a device for adjusting the image quality of a display device or a so-called multi-view display device which is capable of displaying individual images for a plurality of viewing directions on the common screen. The invention further relates to a device for adjusting the contrast having an A/D converter unit that converts analog image signals into digital image signals and to a display device and, more specifically, to a device for adjusting the contrast for individual images displayed on the common screen by varying a reference voltage at the time of A/D conversion.

2. Description of the Related Art

A display device or a so-called multi-view display device has been realized, which is capable of offering individual images to the observers on the right and left sides through the same display panel. The following patent document No. 1 is disclosing a device of this kind. This device enables individual images to be observed from the left side and the right side of the display panel without using spectacles for viewing three-dimensional images. To use the display panel, a method is also provided to offer different images to a plurality of users simultaneously.

Further, patent documents No. 2 and No. 3 are disclosing display devices capable of simultaneously displaying two images on one liquid crystal display (LCD), e.g., a display device which enables different images to be seen from the driver's seat and from the assistant driver's seat. Further, patent documents No. 4 and No. 5 are disclosing two-screen display devices for simultaneously displaying two kinds of images on a common screen.

Typically, the display unit is constituted by using a liquid crystal panel having a parallax barrier as disclosed in patent documents No. 6 and No. 7 enabling an observer (user) positioned on the left side of the display unit (e.g., on the side of the assistant driver's seat) to see only those pixels corresponding to a first display image but substantially preventing a second display image from being seen due to the parallax barrier. On the other hand, an observer (user or driver) positioned on the right side of the display unit (e.g., on the side of the driver's seat) is allowed to see only those pixels corresponding to the second display image but is substantially prevented from seeing the first display image being interrupted by the parallax barrier. There is thus realized a display device enabling different screens to be seen from the driver's seat and from the assistant driver's seat.

Further, patent document No. 8 is realizing the above multi-view display device by alternately arranging pixels of two different images on a horizontal scanning line in the liquid crystal screen, by alternately providing slit barriers having a slit maintaining a predetermined pixel width in the longitudinal direction of the screen in front of the liquid crystal screen, and by individually displaying two images on the liquid crystal screen so as to appear differently depending upon the viewing positions.

Further, patent document No. 9 discloses an image display device which selectively offers necessary images in a direction in which an operator is present, and selectively limits the display of particular images for a predetermined operator depending upon the conditions occurring on the outer side.

When the above conventional display device or the so-called multi-view display device is mounted in a vehicle, navigation information can be displayed on the display panel of the display device for a driver on the driver's seat while displaying TV images or DVD (digital video disk) images on the display panel for a person sitting on the assistant driver's seat. Therefore, the driver on the driver's seat is allowed to devote himself to the driving while the person on the assistant driver's seat does not have to feel boring; i.e., the display device can be favorably used being mounted on the vehicle.

(1) Patent document No. 1: JP-A-2004-206089
(2) Patent document No. 2: JP-A-6-186526
(3) Patent document No. 3: JP-A-2000-137443
(4) Patent document No. 4: JP-A-11-331876
(5) Patent document No. 5: JP-A-9-46622
(6) Patent document No. 6: JP-A-10-123461
(7) Patent document No. 7: JP-A-11-84131
(8) Patent document No. 8: Japanese Patent No. 3194024 (particularly, FIG. 3)
(9) Patent document No. 9: JP-A-2004-233816

As described above, the multi-view display device is usually used in a manner of enabling different users to watch different images. Therefore, values for adjusting the images such as color tones may differ for each of the images. That is, each user wants to set the quality of the image which he watches depending upon his liking. However, the conventional image-adjusting circuit has been designed to adjust the image such as color tone of the display panel as a whole, and various display settings (brightness, contrast, sharpness, color tone, etc.) for adjusting the image are allowed to be effected for one display panel only. As a result, it was not allowed to set optimum or desired display quality for the images that were individually observed from the driver's seat side and from the assistant driver's seat side.

For example, glare on the screen may differ depending on the seats due to the direction of incidence of sunlight. In the conventional multi-view display device, the image could be adjusted for only the display panel as a whole; e.g., even if the image is just desirable for the driver's seat side, the image may be too bright for the assistant driver's seat side.

More concretely, when the conventional multi-view display device is applied to a car navigation device, it is desired to provide the multi-view display device with a so-called contrast-adjusting function for adjusting the brightness or darkness (whiteness, blackness) for both images displayed for the driver's seat and the assistant driver's seat since the vehicle travels under varying conditions.

It will become more convenient if the above contrast-adjusting function could be utilized for a variety of devices in addition to the multi-view display device.

SUMMARY OF THE INVENTION

It is an object of the present invention to provide a display device capable of individually adjusting the qualities of a plurality of images individually displayed for a plurality of viewing directions on a common screen, a method of adjusting the image quality of the display device, a device for adjusting the image quality, a device for adjusting the contrast individually for a plurality of images individually displayed on a common screen and a display device.

In order to achieve the above object, a display device according to one aspect of the present invention comprises:

a display unit for displaying, on a common screen, individual images for a plurality of viewing directions; and an image quality-adjusting unit for individually adjusting the qualities of a plurality of images corresponding to the individual images.

Desirably, the image quality-adjusting unit has a plurality of image quality-adjusting units for individually adjusting the qualities of the plurality of images.

Desirably, the display device of the invention has an image size-adjusting unit for individually adjusting the sizes of the plurality of images.

In the display device of the invention, desirably, an image quality adjust setpoint for the image for one viewing direction can be set as an image quality adjust setpoint for the image for the other viewing direction.

Desirably, the display device of the invention comprises:

a preset holding unit for storing an image quality adjust setpoint representing an image quality-adjusting state for at least one image quality adjust setpoint registration operation unit; and a preset image quality-adjusting unit for detecting the operation of the image quality adjust setpoint registration operation unit, and for adjusting the quality of the image that is to be adjusted by using the corresponding image quality adjust setpoint stored in the preset holding unit.

Desirably, the display device of the invention comprises:

a mode change-over operation unit for instructing the change-over of the adjusting mode; and a mode change-over unit for detecting the operation of the mode change-over operation unit, and for changing an individual mode for individually adjusting the qualities of the plurality of images over to a common mode for commonly adjusting the qualities of the plurality of images.

Desirably, the display device of the invention comprises:

a common surrounding environment sensor for detecting the surrounding environment; and a to-meet-the-surrounding-environment common compensation unit for commonly adjusting the qualities of the plurality of images depending upon the output of a common surrounding environment sensor.

Desirably, the display device of the present invention comprises:

a plurality of individual surrounding environment sensors for individually detecting the surrounding environments of the plurality of images; and a to-meet-the-surrounding-environment compensation unit for adjusting the quality of a corresponding image depending upon the outputs of the plurality of individual surrounding environment sensors.

Desirably, the display device of the invention comprises:

an initial image quality adjust setpoint storage unit for storing initial image quality adjust setpoints of the plurality of images;

wherein at the start of the display device or at the start of displaying individual images for a plurality of viewing directions, the image quality-adjusting unit adjusts the qualities of the plurality of images by using the initial image quality adjust setpoints stored in the initial image quality adjust setpoint storage unit.

Desirably, in the display device of the invention, the initial image adjust setpoint is an image adjust value of when the power source of the display device is turned off or at the end of display of individual images for the plurality of viewing directions.

Desirably, the display device of the invention comprises:

an adjust frequency storage unit for storing the image quality adjust setpoints of the plurality of images and the frequency of adjustments by using the image quality adjust setpoints;

wherein at the start of the display device or at the start of displaying individual images for a plurality of viewing directions, the image quality-adjusting unit adjusts the qualities of the plurality of images by using the frequency of adjustments stored in the adjust frequency storage unit.

Desirably, in the display device of the invention, at least one image quality-adjusting unit in the plurality of image quality-adjusting units comprises an A/D converter unit for converting analog image signals that are input into digital image signals and for outputting them, and adjusts the quality of the image by varying a reference voltage that serves as a reference at the time of effecting the A/D conversion by the A/D converter unit.

The invention is further concerned with a method of adjusting the image quality of a display device having a display unit for displaying, on a common screen, individual images for a plurality of viewing directions, wherein an image quality adjustment process is executed to individually adjust the qualities of a plurality of images corresponding to the individual images.

The invention is further concerned with a device for adjusting the image quality of a display device having a display unit for displaying, on a common screen, individual images for a plurality of viewing directions, comprising an image quality-adjusting unit for individually adjusting the qualities of a plurality of images corresponding to the individual images.

The invention further provides a device for adjusting the contrast comprising an A/D converter unit for converting analog image signals into digital image signals, wherein the A/D converter unit produces the digital image signals of which the contrast is adjusted based on a reference voltage that is input to the A/D converter unit and serves as a reference at the time of conversion by the A/D converter unit.

Desirably, the device for adjusting the contrast of the invention further includes a control unit for varying the reference voltage.

Desirably, in the device for adjusting the contrast of the invention, the A/D converter unit produces the digital image signals of which the contrast is adjusted by varying digital values that constitute the digital image signals based on the reference voltage.

Further, the display device according to another aspect of the present invention comprises:

a display unit capable of displaying, on a common screen, individual images for a plurality of viewing directions;

an A/D converter unit for receiving analog image signals corresponding to at least one image among a plurality of images corresponding to the individual images, and for converting the analog image signals into digital image signals; and a control unit for outputting a reference voltage that serves as a reference at the time of conversion by the A/D converter unit to the A/D converter unit;

wherein the control unit outputs the digital image signals of which the contract is adjusted from the A/D converter unit by varying the reference voltage.

The display device according to a further embodiment of the invention comprises:

a display panel capable of simultaneously displaying a first image observed from a first direction and a second image observed from a second direction; and a display panel drive unit connected to first and second image sources to display the data from the image sources on the display panel;

wherein the display panel drive unit includes image-adjusting units for individually adjusting the first and second images displayed on the display panel.

The display panel drive unit further includes an image size-adjusting unit for individually adjusting the sizes of the first and second images displayed on the display panel.

The display panel drive unit includes a setpoint display circuit for individually displaying the data that are set by the image-adjusting units for the first and second images. Further, the display device of the invention has an input unit by which adjust values can be set.

The display panel drive unit further includes a storage unit, and a setpoint of the image-adjusting unit is stored in the storage unit. Further, the image-adjusting unit is capable of setting a setpoint for the first image source stored in the storage unit for the second image source.

In the display device according to still another aspect of the present invention, a first screen which enables the image to be observed from a first direction and a second screen which enables the image to be observed from a second direction are formed on the display surface of the same region, enabling a first image to be displayed on the first screen and a second image to be displayed on the second screen simultaneously, and provision is made of a first image-adjusting unit for adjusting the quality of the first image and a second image-adjusting unit for adjusting the quality of the second image independently of each other.

Desirably, the display device of the invention includes an image adjusting/copying operation unit; and an image adjusting/copying unit which, when the image adjusting/copying operation portion is operated, sets the first image-adjusting state to be an image-adjusting state by the second image-adjusting unit.

Desirably, the display device of the invention includes a preset holding unit for storing the image-adjusting data responsive to a preset switch; and a preset image-adjusting unit for adjusting the image quality on the adjustment screen relying upon the image-adjusting data responsive to the preset switch stored in the preset holding unit when the preset switch is operated.

Desirably, the display device of the invention includes a preset data registering unit which, upon the registration operation by the preset switch, stores the image-adjusting data for the screen that is to be registered at the time of the registration operation in the preset holding unit.

Desirably, the display device of the invention includes: a mode change-over operation unit for changing over the adjust mode; and a mode change-over unit for changing an individual mode for individually adjusting the image on the first screen and the image on the second screen responsive to the operation by the mode change-over operation unit, over to a common mode for adjusting the image on the first screen and the image on the second screen in the same direction.

Desirably, the display device of the invention comprises:

a common surrounding environment sensor for detecting the surrounding environment; and a to-meet-the-surrounding-environment common compensation unit for adjusting the image quality on the first screen and the image quality on the second screen in the same direction depending upon the output of a common surrounding environment sensor.

Desirably, the display device of the present invention comprises:

a first individual surrounding environment sensor for detecting the surrounding environment for adjusting the image quality on the first screen;

a second individual surrounding environment sensor for detecting the surrounding environment for adjusting the image quality on the second screen:

a first to-meet-the-surrounding-environment compensation unit for adjusting the image quality on the first screen depending upon the output of the first individual surrounding environment sensor; and a second to-meet-the-surrounding-environment compensation unit for adjusting the image quality on the second screen depending upon the output of the second individual surrounding environment sensor.

Desirably, the display device of the invention includes:

an image adjustment exchange operation unit; and an image adjustment copying unit which, when the image adjustment exchange operation unit is operated, sets the image-adjusting state in the first image-adjusting unit to be the image-adjusting state of the second image-adjusting unit, and sets the image-adjusting state in the second image-adjusting unit to be the image-adjusting state of the first image-adjusting unit.

Desirably, the display device of the invention includes an adjust image display unit for displaying an image for adjustment on the screen being adjusted during the adjustment of the image.

Desirably, the display device of the invention includes an adjust image display unit for displaying an image for adjustment on the screen of not being adjusted during the adjustment of the images.

Desirably, in the display device of the invention, the adjust image display unit divides the screen displaying the image for adjustment, and simultaneously displays the image of before being adjusted and the image of during the adjustment on individual regions.

Desirably, in the display device of the invention, the adjust image display unit displays the image of the same content as the image of before being adjusted and as the image of during the adjustment.

Desirably, in the display device of the invention, the adjust image display unit displays the image of before being adjusted and the adjusted image in the image-adjusting state on the screen which is not being adjusted.

Desirably, in the display device of the invention, the adjust image display unit divides the screen displaying the image for adjustment, and simultaneously displays, on an individual region, the image adjusted with the image-adjusting data stored in the preset holding unit.

Desirably, in the display device of the invention, the adjust image display unit displays an image including a figure drawn in three primary colors.

Desirably, the display device of the invention includes a liquid crystal shutter for separating the first image on the first screen and the second image on the second screen in the viewing directions, and adjusts the first image and the second image by controlling the transmission factor of the liquid crystal shutter.

Desirably, the display device of the invention includes an initial adjust value storage unit for storing an initial first adjust value for the first image on the first screen and an initial second adjust value for the second image on the second screen, wherein, at the start, the first image-adjusting unit adjusts the image using the initial first adjust value and the second image-adjusting unit adjusts the image using the initial second adjust value.

Desirably, the display device of the invention includes an adjust frequency storage unit for storing the image adjust value on the first screen and a frequency of adjustment by the image adjust value as well as the image adjust value on the second screen and a frequency of adjustment by the image adjust value, wherein, at the start, the first image-adjusting unit adjusts the image using the image adjust value of the highest adjust frequency on the first screen and the second image-adjusting unit adjusts the image using the image adjust value of the highest adjust frequency on the second screen.

Desirably, the display device of the invention includes a common surrounding environment sensor for detecting the surrounding environment, wherein the first image-adjusting unit adjusts the image on the first screen and the second image-adjusting unit adjusts the image on the second screen based on the image adjust values for each of the screens depending upon the output of the common surrounding environment sensor at the time of start.

The invention further provides a method of adjusting the image quality comprising:

a first image adjust process for adjusting the first image; and a second image adjust process for adjusting the second image;

in a display device which forms a first screen of which the image can be observed from a first direction and a second screen of which the image can be observed from a second direction on the display surface of a display panel, the display device being capable of displaying a first image on the first screen and a second image on the second screen simultaneously.

The invention further provides a method of adjusting the image quality comprising:

a process for rewriting the adjust value in the first image adjust value storage unit that stores the adjust value for the first image in response to the operation for adjusting the first image on the first screen;

a process for rewriting the adjust value in the second image adjust value storage unit that stores the adjust value for the second image in response to the operation for adjusting the second image on the second screen;

a process for adjusting the first image on the first screen based on the adjust value in the first image adjust value storage unit; and a process for adjusting the second image on the second screen based on the adjust value in the second image adjust value storage unit;

in a display device which forms a first screen of which the image can be observed from a first direction and a second screen of which the image can be observed from a second direction on the display surface of a display panel, the display device being capable of displaying a first image on the first screen and a second image on the second screen simultaneously.

According to a display device (e.g., multi-view display, device) of an embodiment of the invention as described above, it is allowed to individually adjust the qualities of the plurality of images individually displayed for a plurality of viewing directions on a common screen by using an image-adjusting unit (preferably, a plurality of image-adjusting units). Therefore, the observers (users) of the images are allowed to selectively adjust the qualities of the images which they are viewing without affecting the other images. Further, the image size-adjusting units are capable of individually adjusting the image sizes for each of the images in each of the directions. Therefore, an observer viewing one image is allowed to selectively adjust the image size which he is now watching without affecting the image sizes of other image. There is thus realized a display device which is friendly to the users.

It is further allowed to realize a display device that can be more easily used by displaying image adjust setpoints on the respective display regions, by instructing the adjust of images through an input unit, and by storing the image adjust setpoint in the storage unit so as to be used for adjusting the image next time.

According to the invention, further, when the selection unit is operated, the image adjust setpoint for one image source can be set as the image adjust setpoint for at least one other image. Therefore, when the driver changes the seat, the image which has been set based on a preferred image adjust setpoint can be continuously used. It is further allowed to exchange the image adjust setpoints for the two image sources. Therefore, when the driver's seat and the assistant driver's seat are changed like, for example, changing the driver, the images set based on the preferred image adjust setpoints can be continuously used.

According to the present invention, further, a desired image adjust setpoint can be selected for each of the images out of the plurality of image adjust setpoints that have been held in advance owing to the preset function. Therefore, the images can be easily adjusted.

According to the present invention, further, when the mode change-over operation unit is operated, the individual mode and the common mode can be switched over, making it possible to commonly adjust the plurality of images, to individually adjust the plurality of images, and to finely adjust the images for a change in the surrounding environment.

According to the present invention, further, a plurality of images can be adjusted in common on the common screen depending upon the result detected by the common surrounding environment sensor (e.g., brightness sensor, etc.). Therefore, the images can be adjusted automatically and at one time for a change in the surrounding environment that affects the images in common.

According to the present invention, further, a plurality of individual surrounding environment sensors are provided to individually detect surrounding environments for a plurality of images, and the images are individually adjusted depending upon the results detected by the plurality of surrounding environment sensors. Therefore, the images can be automatically and suitably adjusted depending upon a change in the environment which affects differently depending upon the seats such as the driver's seat and the assistant driver's seat.

According to the present invention, further, a plurality of images are adjusted based on the initial image adjust setpoints stored in the initial image adjust setpoint storage unit at the start of the display device or at the start of displaying the individual images for a plurality of viewing directions. Therefore, the initial image-adjusting states of images are automatically selected, and no operation is required for adjusting the images.

According to the present invention, further, the image adjust values (also called last memories) of when the power source of the display device is turned off or at the end of display of the images in the plurality of viewing directions, are stored as the initial image adjust setpoints in the initial image adjust setpoint storage unit. It is, therefore, allowed to select the adjusting state of an image that is highly probable to be continuously used at the start of the display device.

According to the present invention, further, the images are adjusted by using the image adjust setpoint which is used most highly frequently at the start of the display device or at the start of displaying the individual images for a plurality of viewing directions, making it possible to select the image-adjusting state which is the most highly probable to be used.

According to the present invention, further, the images are set by reading a value of the highest frequency of display and of the highest frequency of setting for each of the seats at the start of the display device or at the start of displaying the individual images for a plurality of viewing directions. Therefore, there is selected the image-adjusting state which is most highly probable to be displayed and used, and no operation is required for adjusting the images.

According to the present invention, further, at least one of the plurality of image-adjusting units in the display device comprises an A/D converter unit for converting analog image signals to digital image signals, and a reference voltage input to the A/D converter unit is varied to individually adjust the plurality of images individually displayed on the common screen and to produce the adjusted digital image signals from the A/D converter unit.

According to the present invention, further, the image-adjusting unit having a function for adjusting the image quality of the display device that displays, on the common screen, individual images for a plurality of viewing directions, is fabricated by using an IC (integrated circuit). Therefore, the step for fabricating the image-adjusting unit is simplified, and the size of the display device as a whole can be decreased.

According to the device for adjusting the contrast of the present invention, a plurality of images individually displayed on the common screen are individually adjusted for their contrasts based on a reference voltage input to the A/D converter unit that converts analog image signals into digital image signals, and the digital image signals of which the contrasts are adjusted are output from the A/D converter unit.

According to the device for adjusting the contrast of the present invention, further, the reference voltage input to the A/D converter unit can be varied, and the plurality of images individually displayed on the common screen are adjusted for their contrasts expressing, particularly, whiteness or blackness.

According to the device for adjusting the contrast of the present invention, further, output digital values that constitute digital image signals are varied based on the reference voltage input to the A/D converter unit, so that the digital image signals of which the contrasts are finely adjusted are output from the A/D-converter unit.

According to the display device of a further embodiment of the invention, the reference voltage input to the A/D converter unit for a plurality of images is varied to individually adjust the contrasts of the plurality of images individually displayed on the common screen for a plurality of viewing directions. Therefore, the observer (user) of each image is allowed to set the contrast suited for the image which he is watching without affecting the contrast of the other image.

According to the display device of a further embodiment of the invention, the image-adjusting units are capable of individually setting the images for the image data that are displayed in the respective directions. Therefore, the user is allowed to select and set the image which he is watching without affecting the other image. Further, the image size-setting units are capable of individually adjusting the image sizes for each of the images in each of the directions. Therefore, the user is allowed to select and set an image size to meet the image which he is watching without affecting the image size of the other image. Thus, the display device which is more user friendly is realized.

There can be realized the display device which can be more conveniently used if the setpoint data of images are displayed on the screen and if the setpoints are stored in the storage unit and are used for setting the image next time.

According to the present invention, further, the first image is adjusted (for its brightness, contrast, sharpness, tint, etc.) on the first screen observed from the driver's seat individually from adjusting the second image on the second screen observed from the assistant driver's seat, making it possible to adjust the screens suited for each of the seats, i.e., driver's seat and assistant driver's seat.

According to the invention, further, when the image adjusting/copying operation unit (e.g., selection unit) is operated, the state of adjusting the first image can be changed into the state of adjusting the image by the second image-adjusting unit. Therefore, a desired image can be continuously viewed in case the driver has changed the seat.

According to the invention, further, a desired setpoint can be selected for each of the images out of a plurality of setpoints for the first and second images held in advance by the presetting function. Therefore, the images can be easily adjusted on the screens.

According to the present invention, further, the individually adjusting mode and the common mode can be changed over making it possible to adjust the images in the same direction on the whole screen in an integrated manner or to individually adjust the images on each of the screens and, therefore, to finely adjust the images for a change in the surrounding environment.

According to the present invention, further, the images can be adjusted in the same direction on the whole screen in an integrated manner depending upon the result detected by the surrounding environment sensor (e.g., brightness sensor). Therefore, images can be automatically adjusted at one time for a change in the surrounding environment that affects the images in common.

According to the present invention, further, a plurality of individual surrounding environment sensors are provided for the images, and the images are individually adjusted relying upon the results detected by the plurality of surrounding environment sensors. Therefore, the images can be adjusted automatically and suitably depending upon a change in the environment that differently affects the seats, i.e., driver's seat and assistant driver's seat.

According to the present invention, further, when the image adjust exchange operation unit (e.g., selection unit) is operated, the states of adjusting the images can be exchanged. Therefore, desired images can be seen continuously when the driver is changed like when the drive has changed his seat from the driver's seat to the assistant driver's seat.

According to the present invention, further, the image for adjustment is displayed on the screen of during the adjustment, enabling the images to be easily adjusted on the screens.

According to the present invention, further, the screen displaying the image for adjustment is divided so that the image of before being adjusted and the image of being adjusted can be simultaneously displayed on the different regions. Therefore, reference can be made to the state of adjusting the image on the screen of the opposite side, making it easy to adjust the image on the screen on which the image is to be adjusted.

According to the present invention, further, the display screen for adjusting either the first image or the second image is divided into a plurality of screens to display a plurality of preset states for adjusting the images on the screens. Therefore, the image-adjusting states can be compared so as to serve as a reference for selecting the display screen.

According to the present invention, further, the first image and the second image are corrected for their color components of three primary colors making it possible to highly finely adjust the first image and the second image.

According to the present invention, further, at the start of the display device, a first initial adjust value and a second initial adjust value (also called last memories) stored in the initial adjust value storage unit just before the start are read out to adjust the first and second images. It is, therefore, allowed, at the start, to automatically select the state of adjusting the image that is highly probable to be continuously used omitting the operation for adjusting the images.

According to the present invention, further, at the start of the display device, the first screen is adjusted by using an image adjust value of the highest frequency of adjustment on the first screen, and the second screen is adjusted by using an image adjust value of the highest frequency of adjustment on the second screen. It is therefore allowed to select the image-adjusting state having the highest probability of use.

According to the present invention, further, at the start of the display device, values having the highest frequency of display and the highest frequency of setting are read out for each of the seats to set the first and second images. Therefore, the image-adjusting state is that of the highest probability of display and of the use, and the operation for adjusting the image can be omitted.

According to the present invention, further, the images are adjusted on the first screen and on the second screen based upon the image adjust values for each of the screens dependent upon the output of the common surrounding environment sensor at the start. Therefore, the images can be suitably set depending upon a change in the surrounding environment. Moreover, even in case the surrounding environment has sharply changed, the images can be quickly adjusted by using custom values of images dependent upon radical changes in the surrounding environment such as in a tunnel or environment at night.

BRIEF DESCRIPTION OF THE DRAWINGS

The above object and features of the present invention will be more apparent from the following description of some preferred embodiments with reference to the accompanying drawings, wherein:

FIG. 16 is a flowchart for illustrating an image adjust process and an image size adjust process by a CPU 54 in FIG. 14;

FIG. 22 is a flowchart (part 1) for illustrating the image adjust process by a CPU 7a;

FIG. 23 is a flowchart (part 2) for illustrating the image adjust process by the CPU 7a;

FIG. 24 is a diagram (part 1) illustrating a display of an image for adjustment;

FIG. 25 is a diagram (part 2) illustrating a display of an image for adjustment;

FIG. 26 is a diagram (part 3) illustrating a display of an image for adjustment;

FIG. 32 is a diagram (part 5) illustrating a modified example of the image adjust process by the CPU7a shown in FIGS. 22 and 23;

FIG. 39 is a diagram illustrating a relationship between the reference voltage and the input analog signal;

FIG. 40 is a diagram illustrating a relationship between the reference voltage and the output digital signal;

DESCRIPTION OF THE PREFERRED EMBODIMENTS

Embodiments of the invention will now be described with reference to the accompanying drawings (FIGS. 1 to 42). Here, however, it should be noted that the technical scope of the present invention is not limited by the embodiments only but also encompasses the invention recited in claims and even equivalents thereof.

Described below, first, with reference to FIGS. 1 to 9 is the schematic constitution of a display device that serves as a prerequisite of the embodiments of the invention and the operation thereof.

Figure 1:
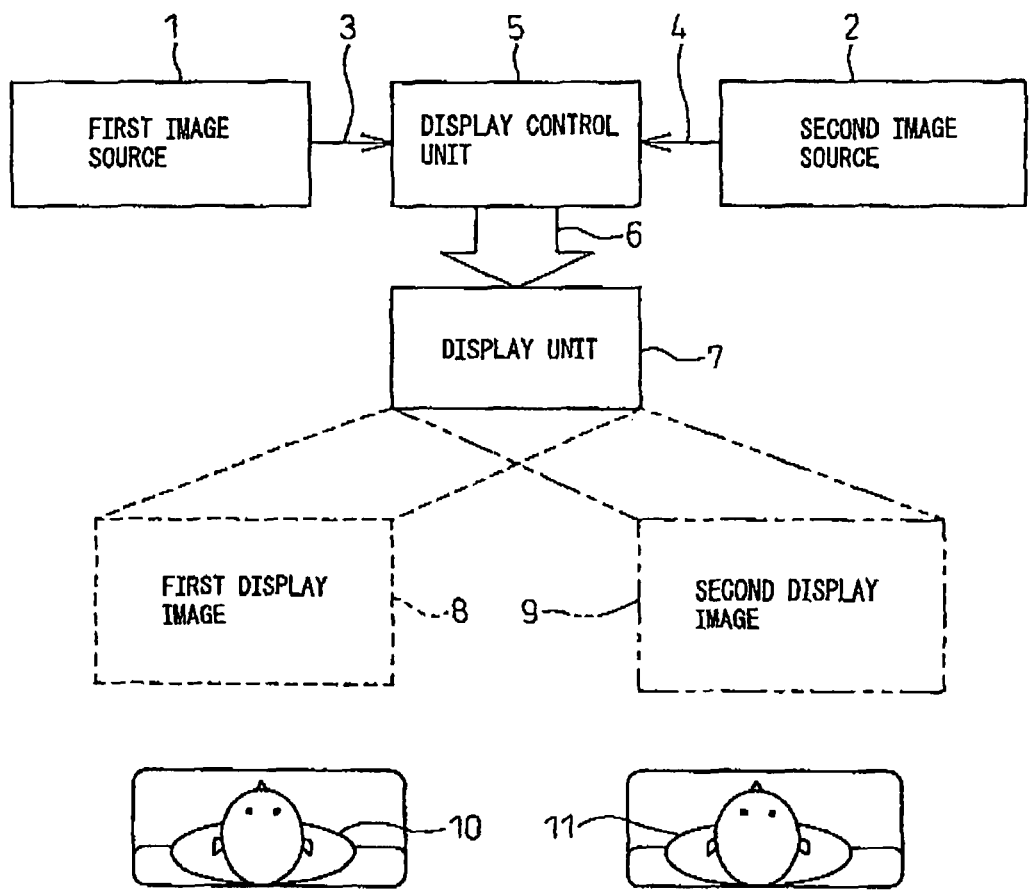
FIG. 1 is a diagram schematically illustrating a display device according to the present invention.

FIG. 1 is a diagram schematically illustrating a display device according to the present invention. Hereinafter, the constituent elements which are the same as those described above are denoted by the same reference numerals.

In the drawing, reference numeral 1 denotes a first image source, 2 denotes a second image source, 3 denotes a first image data from the first image source, 4 denotes a second image data from the second image source, 5 denotes a display control unit, 6 denotes a display data, 7 denotes a display unit (e.g., liquid crystal display panel or the like), 8 denotes a first display image based on the first image data 3 from the first image source 1, reference numeral 9 denotes a second display image based on the second image data 4 from the second image source 2, reference numeral 10 denotes an observer (user) positioned on the left side of the display unit 7, and reference numeral 11 denotes an observer (user) positioned on the right side of the display unit 7.

In the schematic diagram of FIG. 1, the observer 19 is allowed to watch the first display image 8 while the observer 11 is allowed to view the second display image 9 substantially simultaneously depending upon the positions of the observers 10 and 11 relative to the display unit 7 or, in other words, depending upon their visual field angles relative to the display unit 7. Besides, the display images 8 and 9 can be watched over the whole display surface of the display unit 7. In FIG. 1, the first image source 1 is, for example, a DVD player or a TV receiver. The first image data includes a movie image or a received image which is outputted from the DVD player or the TV receiver. The second image source 2 is, for example, a car navigation device. The second image data includes a map or a route guide image which is outputted from the car navigation device. The first image data 3 and the second image data 4 thereof are fed to the display control unit 5 in which they are so processed as can be displayed on the display unit 7 substantially simultaneously.

The display unit 7 fed with the display data from the display control unit 5 is constituted by a liquid crystal display panel or the like equipped with a parallax barrier that will be described later. A half of the total pixels of the display unit 7 in the transverse direction is used for displaying the first display image 8 based on the first image source 1, and another half of the pixels is used for displaying the second display image 9 based on the second image source 2. Only those pixels corresponding to the first display image 8 can be seen by the observer 10 on the left side of the display unit 7, but the second display image 9 cannot be substantially seen being interrupted by the parallax barrier formed on the surface of the display unit 7. On the other hand, only those pixels corresponding to the second display image 9 can be seen by the observer 11 on the right side of the display unit 7, but the first display image 8 cannot be substantially seen being interrupted by the parallax barrier.

A single screen of the above constitution makes it possible to offer different kinds of information and contents to the users on the right and left sides. If the first image source 1 is the same as the second image source 2, the users on the right and left sides can share the same image in a customary manner, as a matter of course.

As described above, attention should be given to that the display device according to the present invention has only one screen for displaying a plurality of images; i.e., a plurality of images (two kinds of images in FIG. 1) which can be individually adjusted for their image qualities are simultaneously displayed on one screen.

Figure 2:
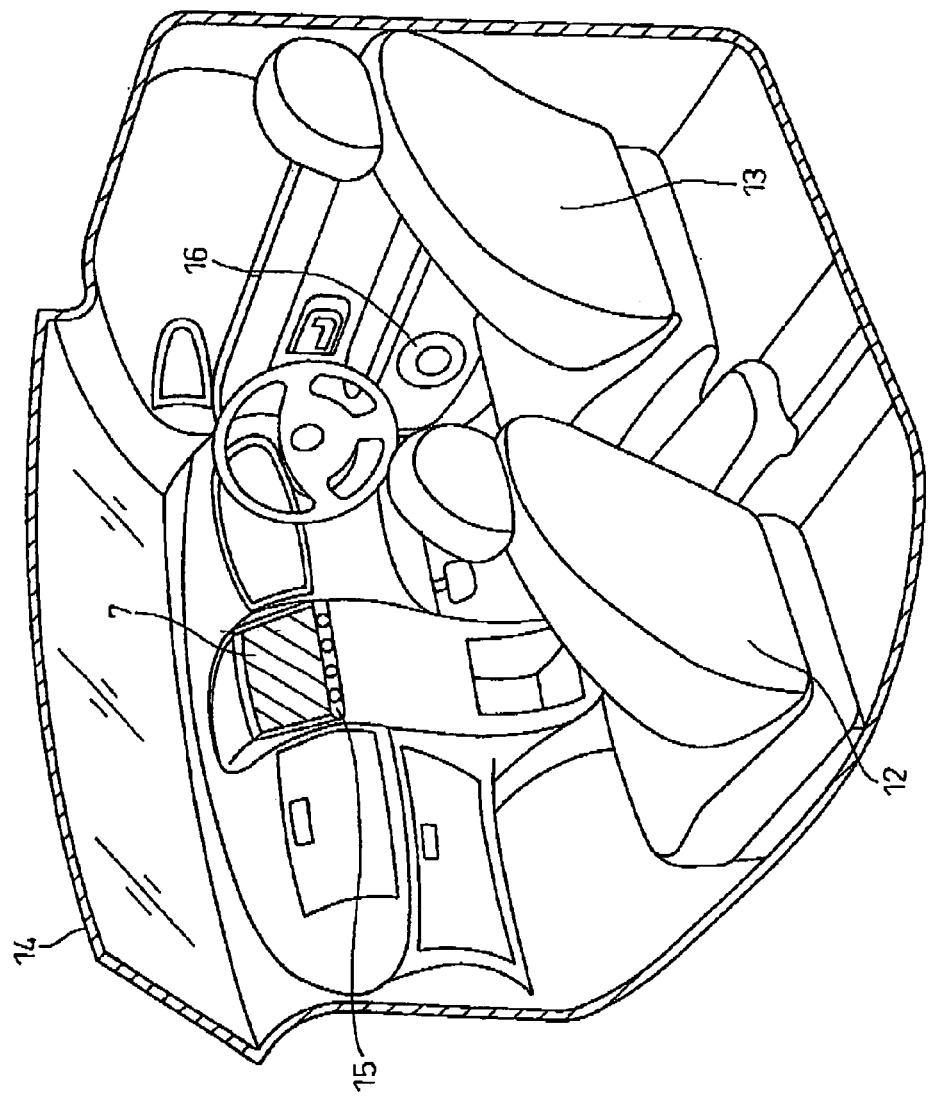
FIG. 2 is a perspective view illustrating an example of mounting the display device.

FIG. 2 is a perspective view illustrating an example of mounting the multi-view display device of the present invention on a vehicle, wherein reference numeral 12 denotes an assistant driver's seat, 13 denotes a driver's seat, 14 denotes a windshield, 15 denotes an operating unit and 16 denotes speakers.

Referring, for example, to FIG. 2, the display unit 7 of the multi-view display device of FIG. 1 is arranged in a dashboard portion nearly at the center between the driver's seat 13 and the assistant driver's seat 12. A variety of operations for the multi-view display device are executed by using a touch panel (not shown) or an operating unit 15 integrally formed on the surface of the display unit 7, or by using an infrared-ray or radio remote controller (not shown). Speakers 16 are arranged in the doors of the vehicle to produce sounds and alarm sounds which are related to the display images.

The observer 11 of FIG. 1 sits on the driver's seat 13, and the observer 10 sits on the assistant driver's seat 12. The image on the display unit 7 that can be seen from the first viewing direction (from the side of the driver's seat) is, for example, an image of a map or the like of a car navigation device, and an image that can be seen from a second viewing direction (from the side of the assistant driver's seat) substantially simultaneously is, for example, a TV received image or a movie image of DVD. Therefore, the passenger on the assistant driver's seat 12 can enjoy watching the TV or DVD while the driver on the driver's seat 13 is assisted for his driving by the car navigation device. Besides, each image is displayed over the whole screen of, for example, 7 inches. Unlike the conventional multi-window display, therefore, the image size does not become small. Namely, the driver and the passenger are furnished with information and contents which are best suited for them as if there are provided individual and dedicated displays.

Figure 3:
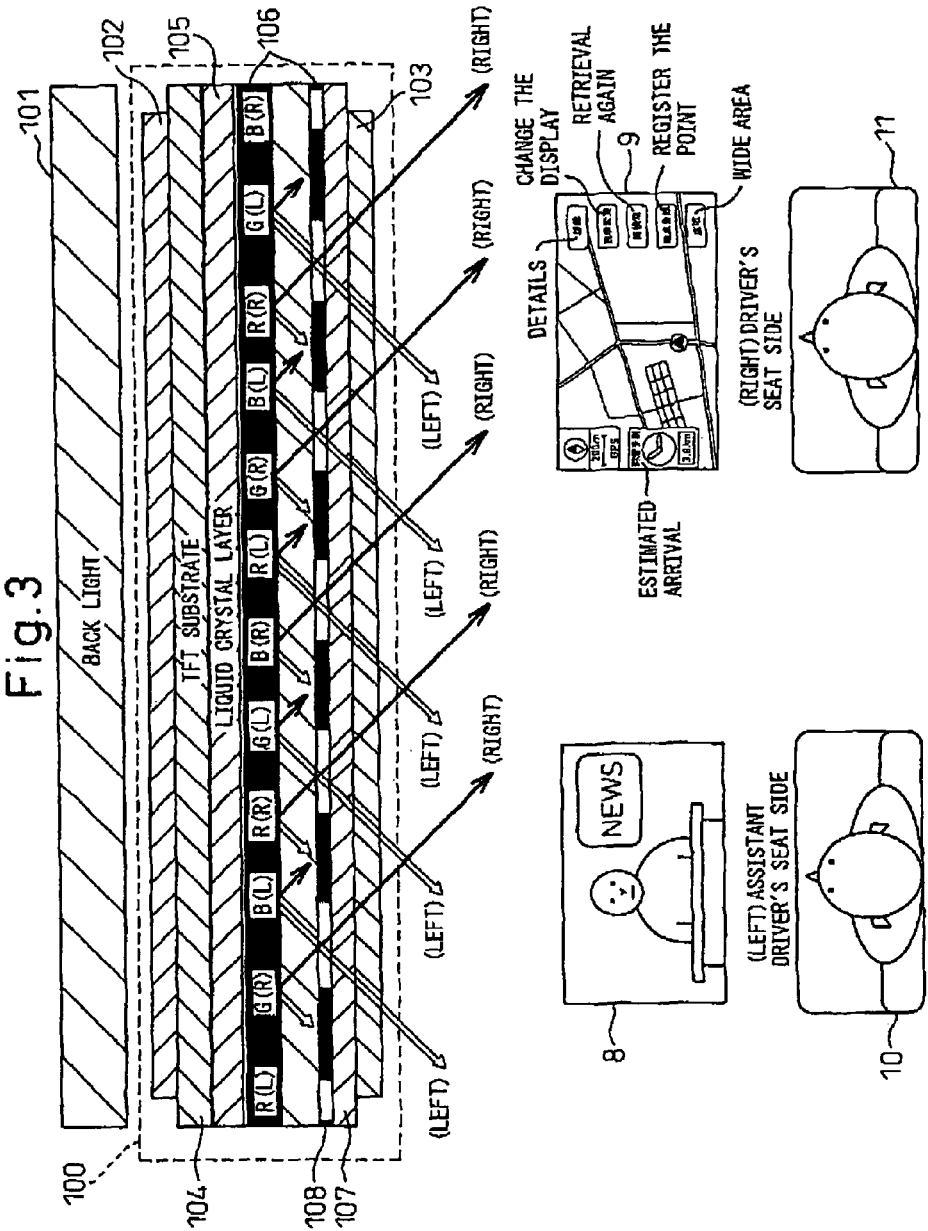
FIG. 3 is a schematic view illustrating the structure of a display unit 7 in cross section.

FIG. 3 is a schematic view illustrating the structure of the display unit 7 in cross section, wherein reference numeral 100 denotes a liquid crystal display panel, 101 denotes a back light, 102 denotes a polarizing plate installed on the liquid crystal display panel on the side of the back light, 103 denotes a polarizing plate arranged on the front surface of the liquid crystal display panel in the light-emitting direction, 104 denotes a TFT (thin film transistor) substrate, 105 denotes a liquid crystal layer, 166 denotes color filter substrates, 107 denotes a glass substrate, and 108 denotes a parallax barrier. The liquid crystal display panel 100 is constituted by a pair of substrates holding the liquid crystal layer 105 between the TFT substrate 104 and the color filter substrates 106 arranged facing thereto, and the parallax barrier 108 and the glass substrate 107 which are arranged on the front surface in the light-emitting direction sandwiched between the two pieces of polarizing plates 102 and 103. The liquid crystal display panel 100 is arranged being slightly individuald away from the back light 101. Thus, by virtue of the above constitution, the liquid crystal display panel 100 can have pixels of RGB colors (three primary colors).

The pixels of the liquid crystal display panel 100 are divided into those for display on the left side (assistant driver's seat side) and for display on the right side (driver's seat side), and are controlled for display. The pixels for display on the left side (assistant driver's seat side) are prevented by the parallax barrier 108 from offering display to the right side (driver's seat side), and can be seen only from the left side (assistant driver's seat side). On the other hand, the pixels for display on the right side (driver's seat side) are prevented by the parallax barrier 108 from offering display to the left side (assistant driver's seat side), and can be seen only from the right side (driver's seat side). Thus, different displays can be offered to the driver and to the passenger. That is, the driver is furnished with map information of navigation while the passenger can watch a movie of DVD. Upon changing the parallax barrier 108 and the constitution of pixels of the liquid crystal display panel, further, it becomes possible to fabricate a constitution that displays different images in a plurality of directions such as in three directions. Further, the parallax barrier itself may be constituted by using a liquid crystal shutter that can be electrically driven to vary the visual field angle.

Figure 4:
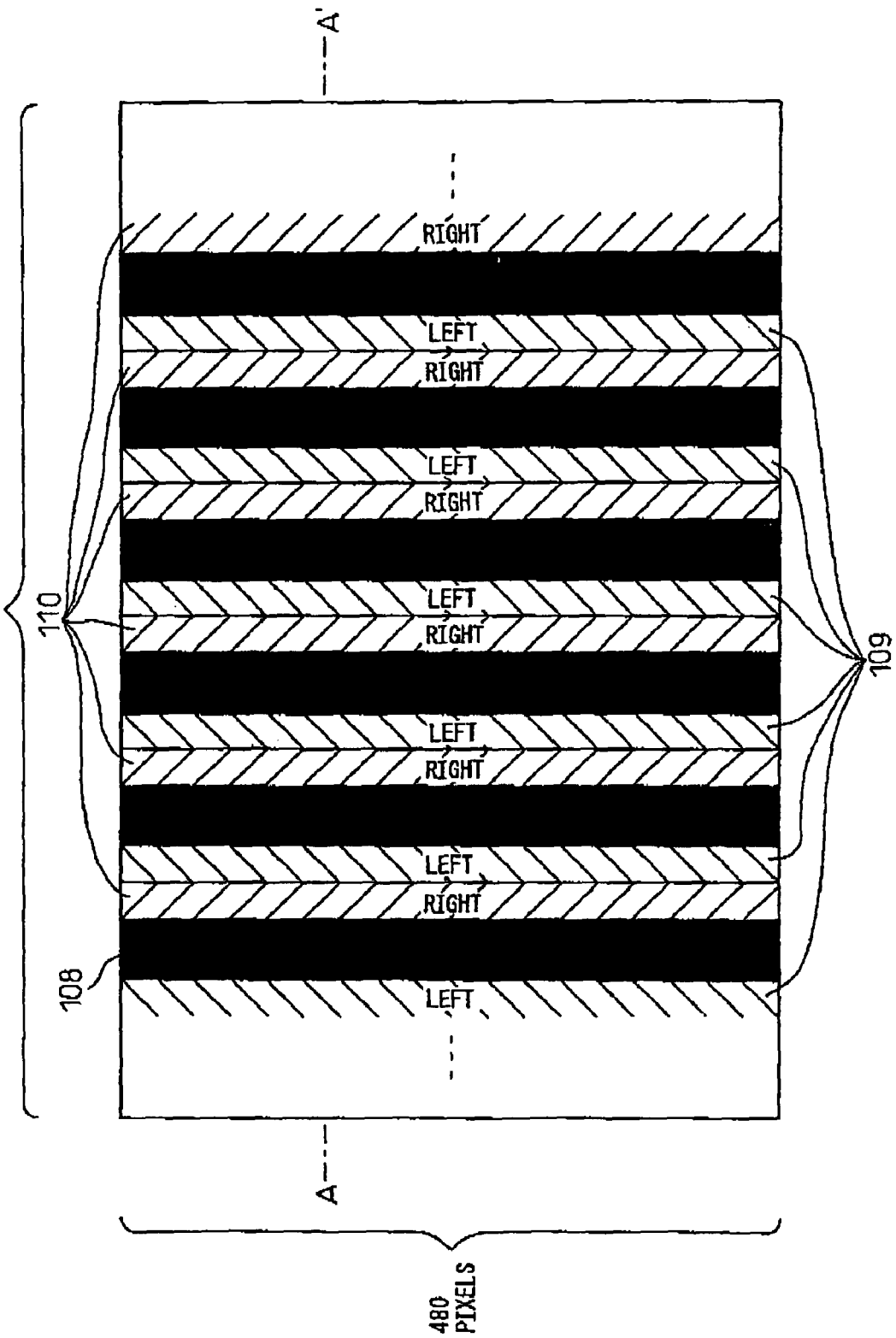
FIG. 4 is a schematic view illustrating the structure of a liquid crystal display panel 100 as viewed from the front.

FIG. 4 is a schematic view illustrating the structure of the liquid crystal display panel as viewed from the front, and FIG. 3 is a sectional view along A-A of FIG. 4. In FIG. 4, reference numeral 109 denotes pixels for display on the left side (assistant driver's seat side), and 110 denotes pixels for display on the right side (driver's seat side). FIGS. 3 and 4 illustrate a portion of the liquid crystal display panel 100 in which 800 pixels are arranged in the transverse direction and 480 pixels are arranged in the longitudinal direction. The pixels 109 for display on the left side (assistant driver's seat side) and the pixels 110 for display on the right side (driver's seat side) are grouped in the longitudinal direction, and are alternately arranged. The parallax barriers 108 are arranged maintaining a distance in the transverse direction and remain uniform in the longitudinal direction. Therefore, if the display panel is viewed from the left side, the parallax barriers 108 conceal the pixels 110 for the right side, and the pixels 109 for the left side can be seen. Similarly, if viewed from the right side, the parallax barriers 108 conceal the pixels 109 for the left side, and the pixels 110 for the right side can be seen. Near the surface, further, both the pixels 109 for the left side and the pixels 110 for the right side can be seen and, hence, the display image on the left side and the display image on the right side can be seen being substantially overlapped one upon the other. Here, the pixels 109 for the left side and the pixels 110 for the right side alternately arranged in FIG. 4 have colors RGB as shown in FIG. 3. However, each group may be constituted by a single color in the longitudinal direction like column R, column G or column B, or may be constituted as a column of a mixture of RGB.

Figure 5:
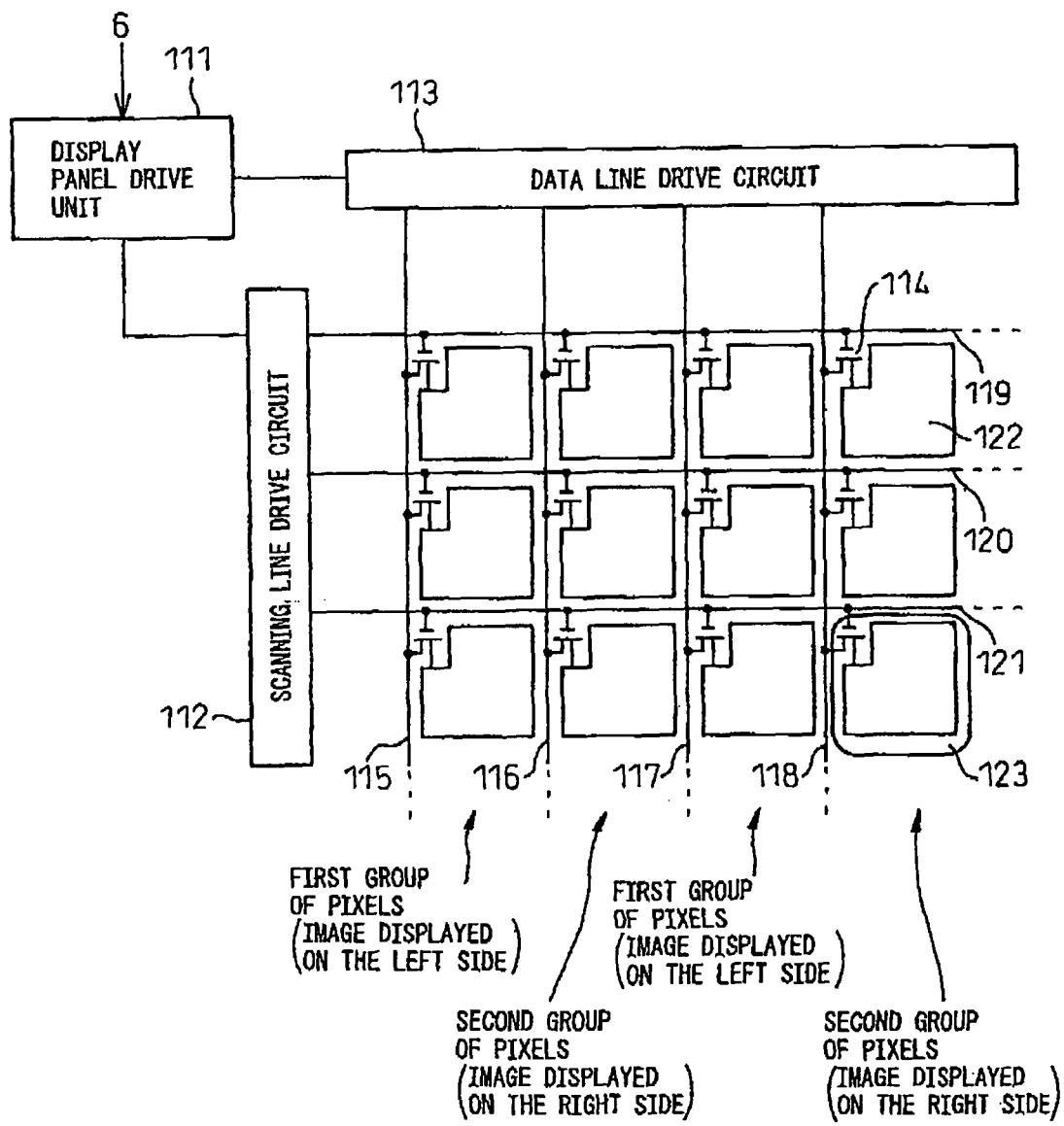
FIG. 5 is a circuit diagram schematically illustrating a TFT substrate 104.

FIG. 5 is a circuit diagram schematically illustrating the TFT substrate 104, and wherein reference numeral 111 denotes a display panel drive unit, 112 denotes a scanning line drive circuit, 113 denotes a data line drive circuit, 114 denotes TFT elements, 115 to 118 denote data lines, 119 to 121 denote scanning lines, 122 denotes pixel electrodes, and 123 denotes sub-pixels.

Referring to FIG. 5, the sub-pixels 123 are formed in a plural number with each region surrounded by the data lines 115 to 118 and by the scanning lines 119 to 121 as a unit. Each sub-pixel includes a pixel electrode 122 for applying a voltage to the liquid crystal layer 105 and a TFT element 114 for switch-controlling the pixel electrode 122. The display panel drive unit 111 controls the timings for driving the scanning line drive circuit 112 and the data line drive circuit 113. The scanning line drive circuit 112 selectively scans the TFT elements 114, and the data line drive circuit 113 controls the voltage applied to the pixel electrodes 122.

Based on the synthetic data of the first image data and the second image data or based on the first and second image data, the plurality of sub-pixels transmit the first pixel data (for displaying an image on the left side) to the data lines 115 and 117, and transmit the second pixel data (for displaying an image on the right side) to the data lines 116 and 118, to thereby form a first group of pixels for displaying the first image and a second group of pixels for displaying the second image.

Figure 6:
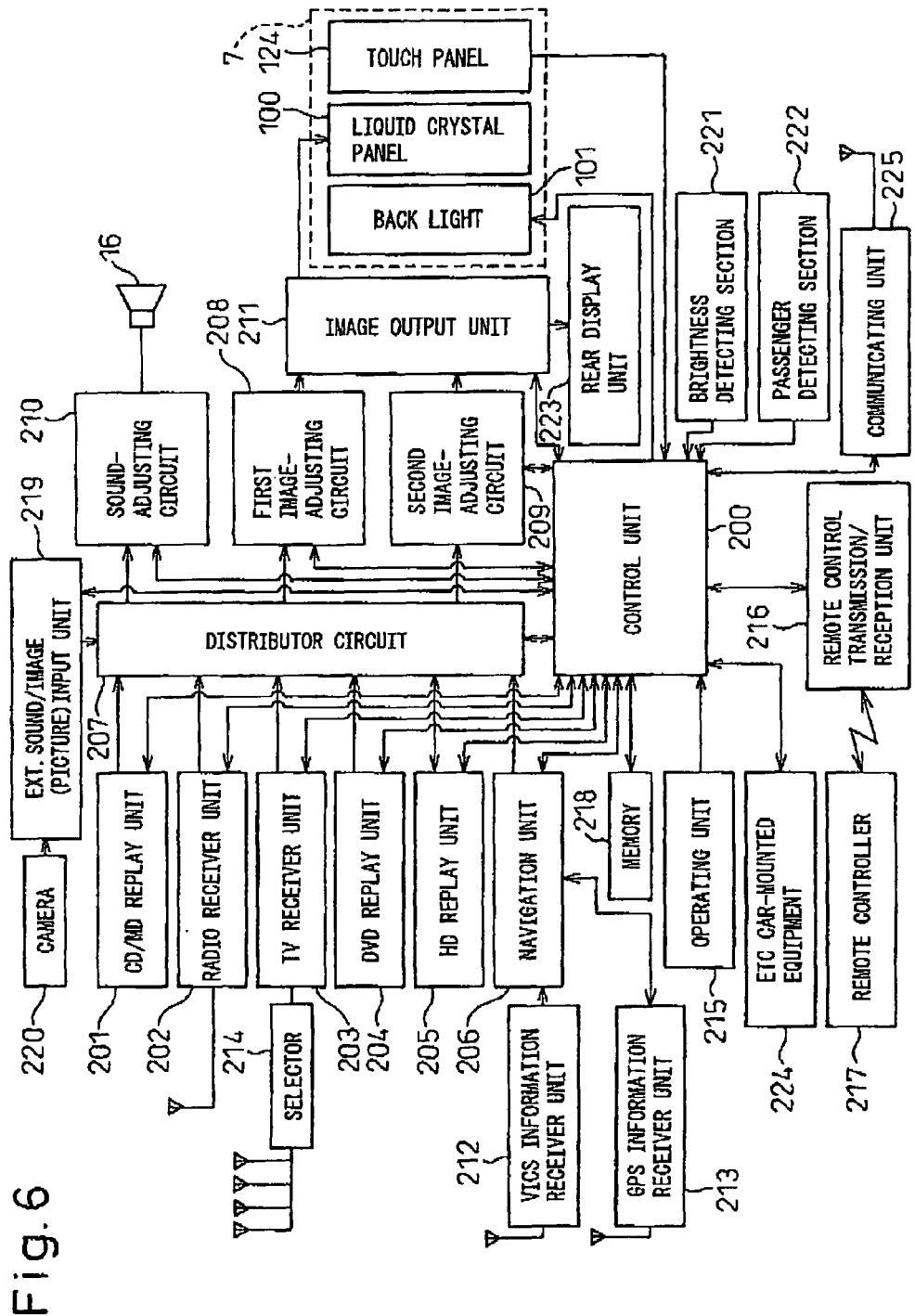
FIG. 6 is a block diagram schematically illustrating the display device according to the present invention.

FIG. 6 is a block diagram schematically illustrating the display device according to the present invention which is applied to a so-called AVN (audio visual navigation) composite device. In FIG. 6, reference numeral 124 denotes a touch panel, 200 denotes a control unit, 201 denotes a CD/MD replay unit, 202 denotes a radio receiver unit, 203 denotes a TV receiver unit, 204 denotes a DVD replay unit, 205 denotes a hard disk (HD) replay unit, 206 denotes a navigation unit, 207 denotes a distributor circuit, 208 denotes a first image-adjusting circuit, 209 denotes a second image-adjusting circuit, 210 denotes a sound-adjusting circuit, 211 denotes an image output unit, 212 denotes a VICS information receiver unit, 213 denotes a GPS information receiver unit, 214 denotes a selector, 215 denotes an operating unit, 216 denotes a remote control transmission/reception unit, 217 denotes a remote controller, 218 denotes a memory, 219 denotes an external sound/image input unit, 220 denotes a camera, 221 denotes a brightness detecting unit, 222 denotes a passenger detecting unit, 223 denotes a rear display unit, 224 denotes an ETC car-mounted equipment, and 225 denotes a communicating unit.

The display unit 7 is constituted by the touch panel 124, liquid crystal display panel 100 and back light 101. As described above, the liquid crystal display panel 100 of the display unit 7 is capable of substantially simultaneously displaying an image which is seen from the first viewing direction or from the side of the driver's seat and an image which is seen from the second viewing direction or from the side of the assistant driver's seat. As the display unit 7, there can be used a flat panel display other than the liquid crystal display panel, such as an organic EL display panel, a plasma display panel, or a cold-cathode flat panel display.

The image data and the sound data from various sources (CD/MD replay unit 201, radio receiver unit 202, TV receiver unit 203, DVD replay unit 204, HD replay unit 205 and navigation unit 206) are distributed, via the distributor circuit 207, to the first image-adjusting circuit 208 when they are the image data of the image source specified to be for the left side and to the second image-adjusting circuit 209 when they are the image data of the image source specified to be for the right side, i.e., the image data are distributed to the first image-adjusting circuit 208 and to the second image-adjusting circuit 209, and the sound data are distributed to the sound-adjusting circuit 210. The first and second image-adjusting circuits 208 and 209 adjust the brightness of the image, color tone and contrast, and the thus adjusted images are displayed on the display unit 7 through the image output unit 211. The sound-adjusting circuit 210 adjusts the distribution, sound volume and tone quality to each of the speakers, and the adjusted sound is output from the speakers 16.

Figure 7:
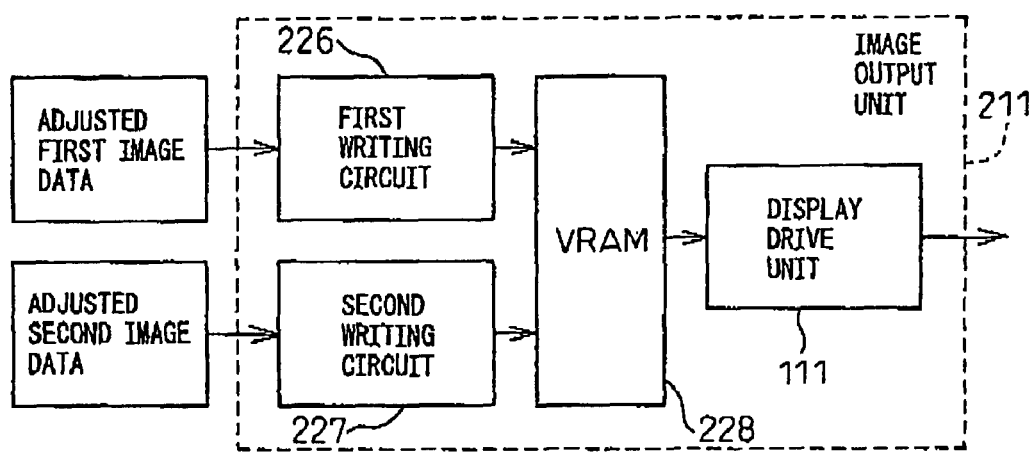
FIG. 7 is a block diagram schematically illustrating an image output unit 211.

FIG. 7 is a block diagram schematically illustrating the image output unit 211, wherein reference numeral 226 denotes a first writing circuit, 227 denotes a second writing circuit, and 228 denotes a VRAM (video random access memory: frame buffer-only RAM of graphics display).

As shown in, for example, FIG. 7, the image output unit 211 includes the first writing circuit 226, second writing circuit 227, VRAM (video RAM) 228 and display drive unit 111. For example, the first writing circuit 226 writes, into the corresponding region in the VRAM 228, the image data corresponding to the columns of odd numbers (i.e., image data for the first display image 8 in FIG. 1) among the image data adjusted by the first image-adjusting circuit 208, and the second writing circuit 227 writes, into the corresponding region in the VRAM 228, the image data corresponding to the columns of even numbers (i.e., image data for the first display image 9 in FIG. 1) among the image data adjusted by the second image-adjusting circuit 209. The display drive unit 111 is a circuit for driving the liquid crystal display panel 100, and drives the corresponding pixels in the liquid crystal display panel 100 based on the image data (synthetic data of the first image data and the second image data) held in the VRAM 228. Into the VRAM 228 are written the image data obtained by synthesizing the first image data and the second image data so as to be corresponded to the image for multi-view display. Therefore, only one drive circuit may be employed, and its operation is the same as the operation of a drive circuit in an ordinary liquid crystal display device. As another constitution, further, there can be contrived to use a first display panel drive circuit and a second display panel drive circuit for driving the corresponding pixels in the liquid crystal display panel based on the respective image data without synthesizing the first image data and the second image data together.

Various sources shown in FIG. 6 will now be described. When the HD replay unit 205 is selected, music data such as MP 3 file, image data such as JPEG file, that are stored in the hard disk (HD), and menu display and image data for selecting the music data and the image data that are to be replayed, can be displayed on the display unit 7.

The navigation unit 206 includes a map data information unit storing map information used for the navigation, obtains information from the VICS information receiver unit 212 and the GPS information receiver unit 213, forms an image for navigation operation, and outputs it. The TV receiver unit 203 receives, from the antenna, analog TV broadcast waves and digital TV broadcast waves through the selector 214, and outputs the image included therein.

Further, the image from, for example, the camera 220 for monitoring the rear view connected to the external sound/image input unit 219 may be displayed on the display unit 7. In addition to the camera 220 for monitoring the rear view, a video camera and a game machine or the like may be connected to the external sound/image input unit 219.

Figure 8:
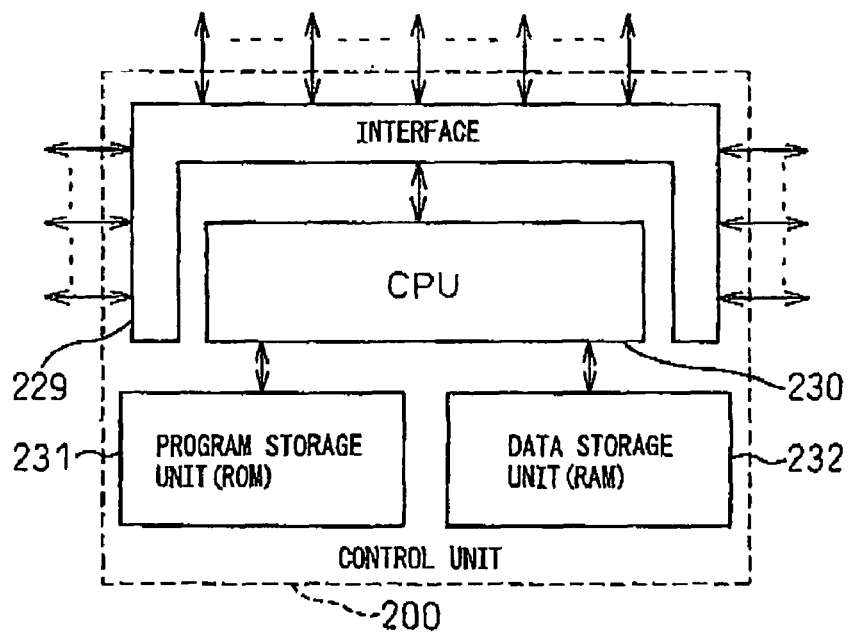
FIG. 8 is a block diagram schematically illustrating a control unit 200.

FIG. 8 is a block diagram schematically illustrating the control unit 200, wherein reference numeral 229 denotes an interface, 230 denotes a CPU, 231 denotes a storage unit, and 232 denotes a data storage unit.

The control unit 200 controls the distributor circuit 207 and various sources, and has the selected two sources or one source displayed. The control unit 200 further displays, on the display unit 7, an operation menu for controlling various sources. Here, as shown in FIG. 8, the control unit 200 is constituted by a microprocessor or the like and includes the CPU 230 which generally controls various unit and circuits in the display device via the interface 229. The CPU 230 is provided with a program storage unit 231 comprising a ROM (read-only memory) for storing various programs necessary for operating the display device and a data storage unit 232 comprising a RAM (random access memory) for holding various data. The ROM and RAM may be those incorporated in the CPU or those provided on the outer side thereof. Further, the ROM may be an electrically rewritable nonvolatile memory such as a flush memory.

The user may carry out the control of the above-mentioned various sources by effecting the input operation or selection operation by means of a touch panel 124 attached to the surface of the display unit 7, by means of the switches provided in the periphery of the display unit 7, or by means of an operating unit 215 constituted by a sound recognition device or the like. Alternatively, the input or selection operation may be executed by using the remote controller 217 via the remote control transmission/reception unit 216. The control unit 200 executes the control operation inclusive of the control of various sources according to the operation through the touch panel 14 and the operating is unit 215. Further, the control unit 200 controls the sound volumes of the speakers 16 provided in a plural number in the vehicle as shown in FIG. 2 by using the sound-adjusting circuit 210. The control unit 200 further works to store various setpoint data such as the image quality setpoint data, program and vehicle data in the memory 218.

Figure 9:
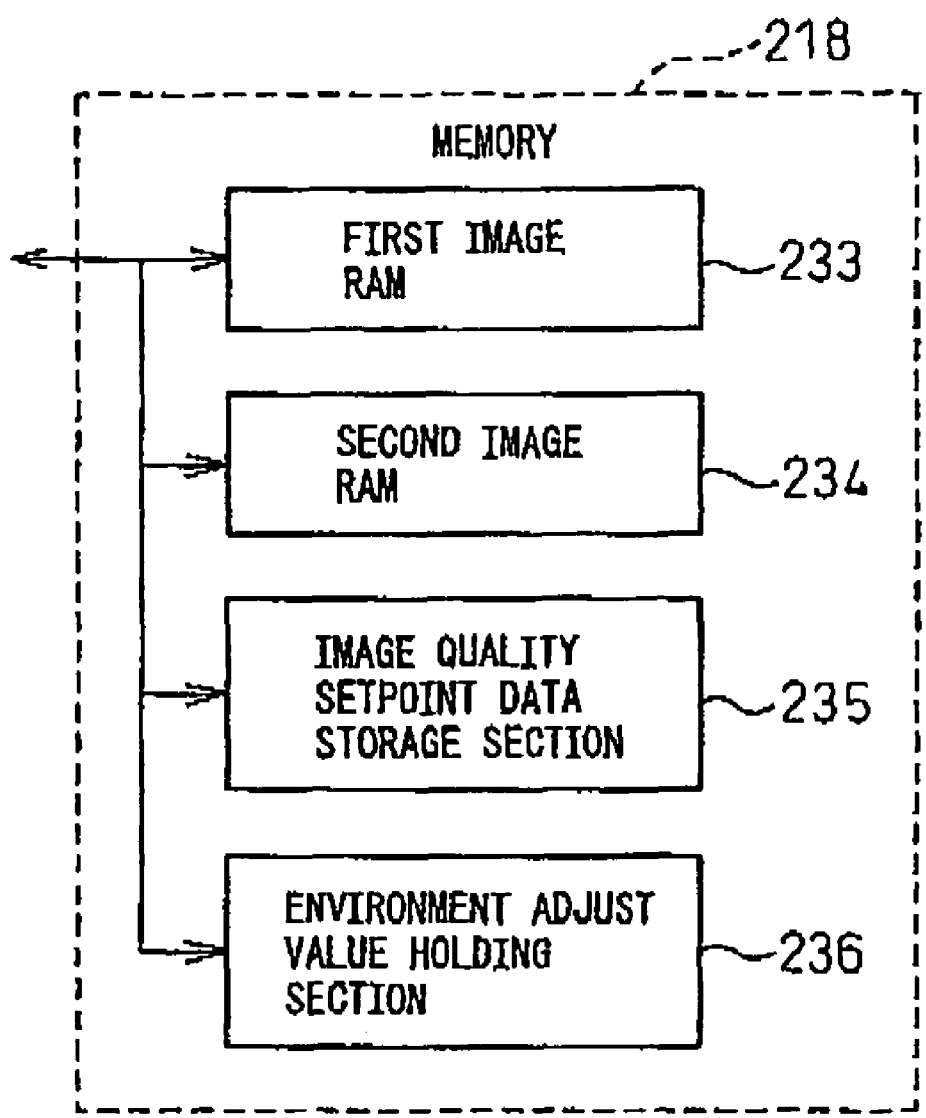
FIG. 9 is a block diagram schematically illustrating a memory 218.

FIG. 9 is a block diagram schematically illustrating the memory 218, wherein reference numeral 233 denotes a first image RAM, 234 denotes a second image RAM, 235 denotes an image quality setpoint data storage section, and 236 denotes a environment adjust value holding section. Concrete constitutions of the first image RAM, second image RAM, image quality setpoint data storage section and environment adjust value holding section will be described later with reference to FIG. 17.

As shown in, for example, FIG. 9, the memory 218 includes the first image RAM 233 and the second image RAM 234 into which can be written adjust values of image qualities of the first image and the second image set by the user. To adjust the image qualities of the first image and the second image, there is further provided the image quality setpoint data storage section 235 storing image quality adjust values of a plurality of steps as preset values for adjusting image qualities that can be read out. There is further provided the environment adjust value holding section 236 holding adjust values for adjusting the qualities of the first image and the second image for the surrounding environment in order to adjust the image quality in response to a change in the surrounding environment such as a change in the brightness on the outside of the vehicle. Here, the image quality setpoint data storage section 235 and the environment adjust value holding section 236 are constituted by electrically rewritable nonvolatile memories such as flush memories or volatile memories backed up with a battery.

The control unit 200 may vary the position of the sound based on the data detected by the brightness detecting unit 221 (e.g., light switch or optical sensor of the vehicle) or detected by the passenger detecting unit 222 (e.g., pressure sensors provided in the driver's seat and in the assistant driver's seat).

Reference numeral 223 denotes the rear display unit provided for the rear seat of the vehicle, and displays the same image as the one displayed on the display unit 7, or displays either the image for the driver's seat or the image for the assistant driver's seat through the image output unit 211.

The control unit 200 displays the fees from the ETC car-mounted equipment 250. The control unit 200 may further control the communicating unit 225 that wirelessly connects to a cell phone to display information related thereto.

Next, basic embodiments of the invention will be described with reference to the accompanying drawings (FIGS. 10 to 18).

Figure 10:
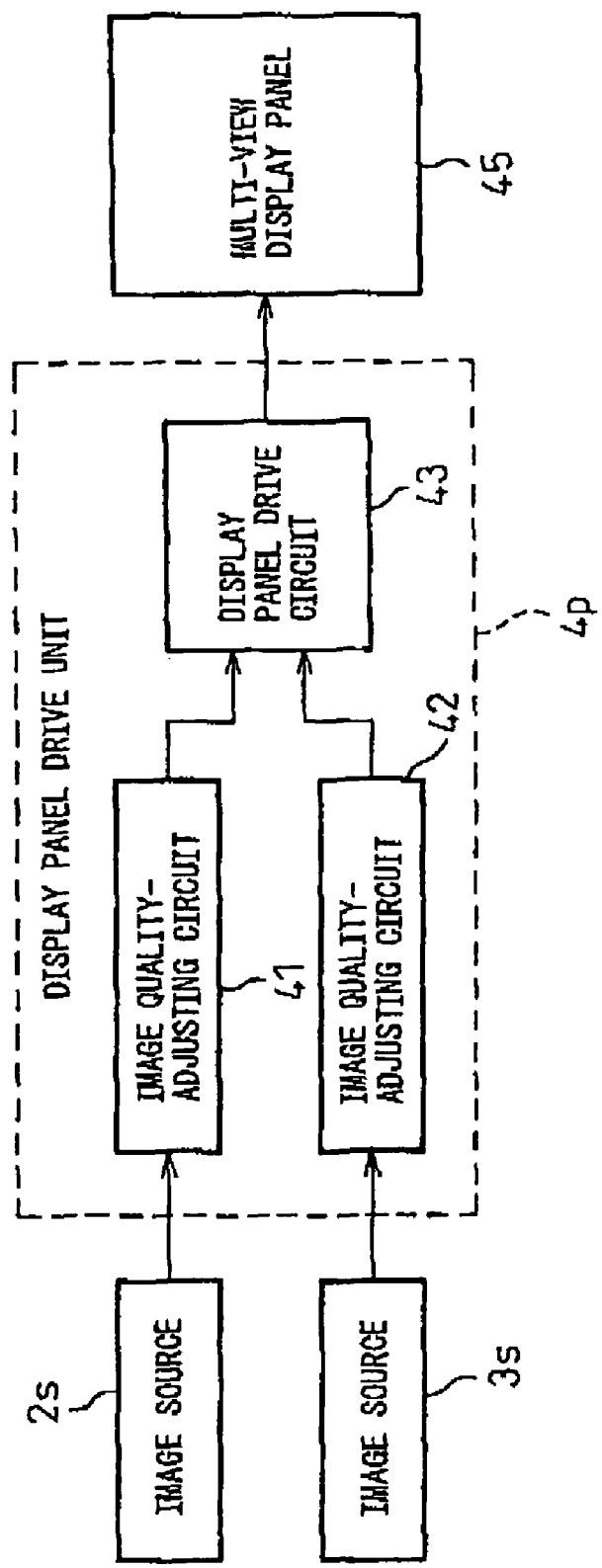
FIG. 10 is a block diagram schematically illustrating the constitution of a multi-view display device according to a concrete embodiment of the present invention.

FIG. 10 is a block diagram schematically illustrating the constitution of the multi-view display device according to the first embodiment of the present invention. In FIG. 10, reference numeral 45 denotes a display panel for multi-view display (i.e., display unit which in FIG. 10 is described as multi-view display panel), and is capable of simultaneously displaying two kinds of images that can be observed, for example, from the left side and the right side of the panel. The display panel can be realized by using a display panel of a structure disclosed in the patent document 1 described earlier.

Figure 11:
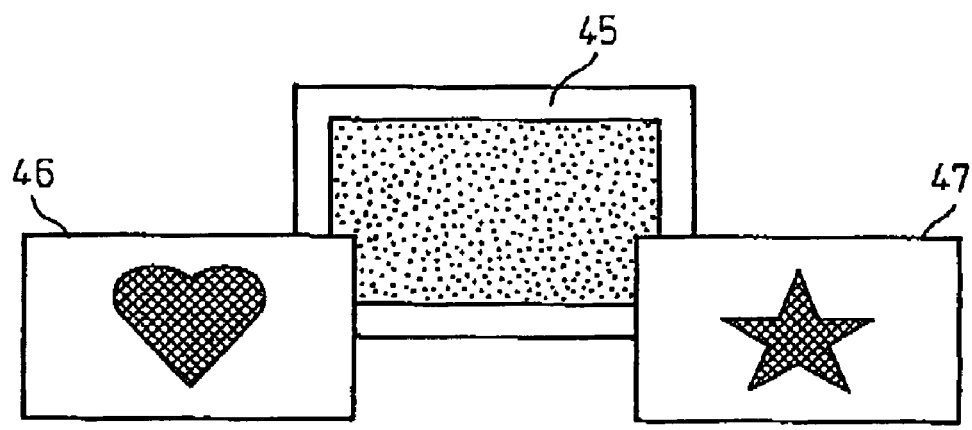
FIG. 11 is a view of a display on a display panel.

FIG. 11 is a diagram illustrating how the two kinds of images 46 and 47 simultaneously displayed on the display panel 45 can be observed by the users. As shown, the image 46 is observed by the user who watches it from the left side of the display panel 45 and the image 47 is observed by the user who watches it from the right side. The image 47 is not observed by the user on the left side and the image 46 is not observed by the user on the right side. Therefore, the user on the left side is allowed to watch the image which he or she wants to see without bothered by the eyes of the user on the right side while the user on the right side is allowed to watch the image which he or she wants to see without bothered by the eyes of the user on the left side.

In FIG. 10, reference numerals 2s and 3s denote first and second external image sources, and 4p denotes a display panel drive unit which processes the data of image signals input from the first and second external image sources 2s and 3s, and forms signals for driving a display panel 45. The display panel drive unit 4p includes an image quality-adjusting circuit 41 for the image 46 on the left side, an image quality-adjusting circuit 42 for the image 47 on the right side, and a display panel drive circuit 43. The image quality-adjusting circuit 41 has a function for adjusting the image quality of the first image source 2s, for example, for its brightness, contrast and sharpness. Similarly, the image quality-adjusting circuit 42 works to adjust the image quality of the second image source 3s, for example, for its brightness, contrast and sharpness. The signals after adjusted are input to the display panel drive circuit 43 and are so processed as to display images 46 and 47 on the display panel 45.

In the display unit shown in FIG. 10, the image quality-adjusting circuits 41 and 42 are provided for the external image sources 2s and 3s, respectively, and image signals from the different image sources 2s and 3s can be individually adjusted for their qualities. Therefore, the images 46 and 47 which are best adjusted for their qualities are displayed, and the users can comfortably watch the images.

Figure 12:
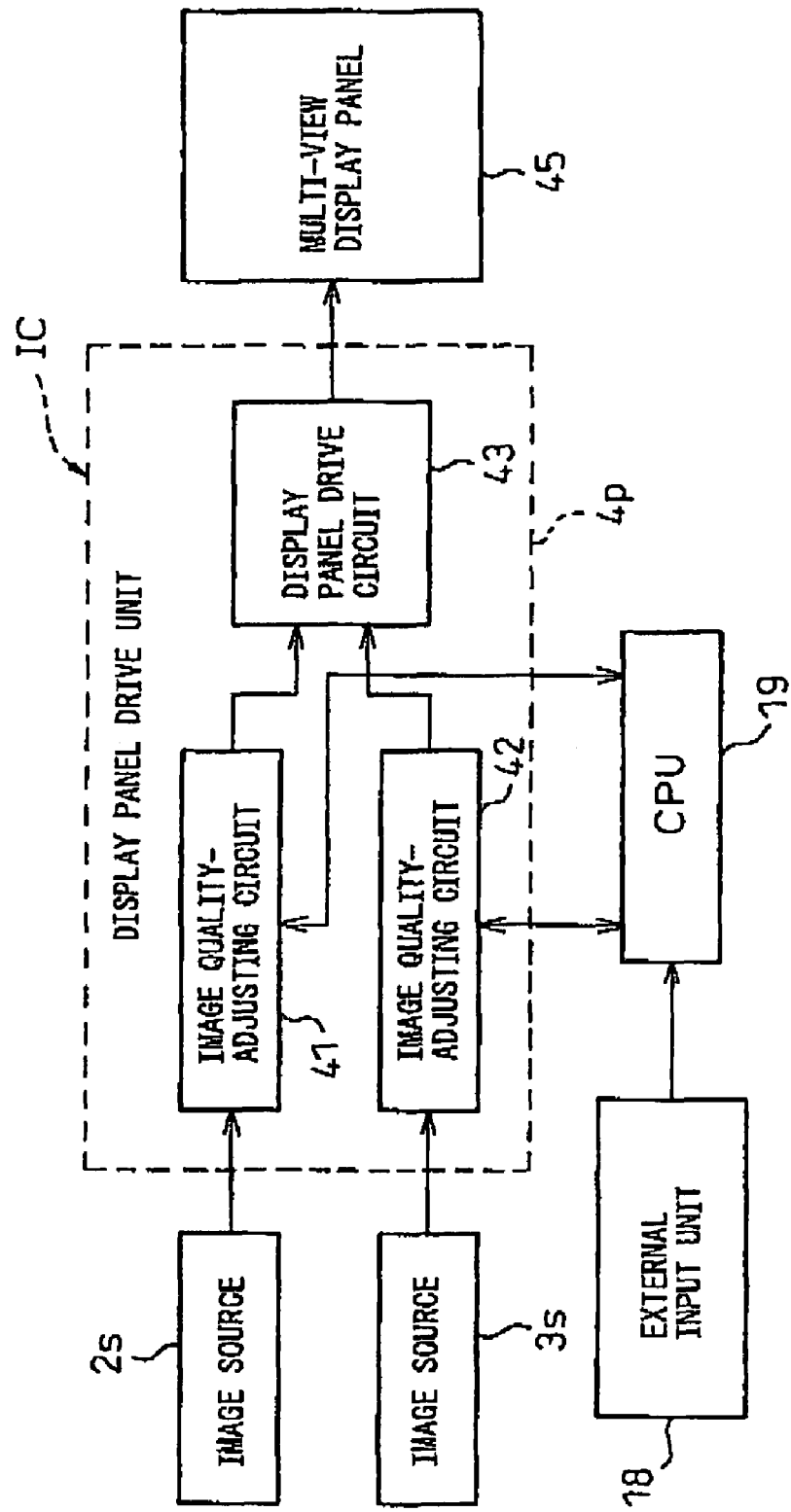
FIG. 12 is a block diagram schematically illustrating the constitution of the multi-view display device according to the concrete embodiment of FIG. 10.

FIG. 12 is a block diagram schematically illustrating the constitution of the multi-view display unit according to the concrete embodiment of FIG. 10. The multi-view display device of FIG. 12 comprises the multi-view display unit of FIG. 10 and further includes an external input unit 18 and a CPU 19. In the case of FIG. 12, too, a display panel 45 is provided for the multi-view display like the above case of FIG. 10, and two kinds of images are simultaneously displayed on the display panel so as to be observed, for example, from the left side and the right side.

In the case of FIG. 12, too, the first image source and the second image source 3s are provided like the above case of FIG. 10. The multi-view display unit of FIG. 12 has a display panel drive unit 4p like the above case of FIG. 10. Further, the display panel drive unit 40 includes an image quality-adjusting circuit 41 for the image 46 on the left side, an image quality-adjusting circuit 42 for the image 47 on the right side, and a display panel drive circuit 43.

The display panel drive unit 4p of FIG. 12 works as an image quality-adjusting unit having a plurality of image quality-adjusting units (image quality-adjusting circuit 41 and image quality-adjusting circuit 42 in FIG. 12) for individually adjusting the qualities of images from the first image source 2s and the second image source 3s. Desirably, the image quality-adjusting unit can be fabricated by using an IC (integrated circuit). Further, the image quality-adjusting unit may be constituted by the plurality of image quality-adjusting units (image quality-adjusting circuit 41 and image quality-adjusting circuit 42 in FIG. 12) without including the display panel drive circuit 43.

The multi-view display device of FIG. 12 further includes an external input unit 18 (i.e., input unit) for receiving a setpoint for adjusting image qualities, and a CPU (central processing unit) for controlling the image quality-adjusting circuit 41 and the image quality-adjusting circuit 42 based upon the setpoints input from the external input unit 18. The external input unit 18 includes an image quality adjust start instruction operation unit, an image quality adjust operation unit and an image quality adjust completion instruction operation unit which are not shown. In FIG. 12, the setpoint for adjusting the image quality is set by a user by using the external input unit 18. The setpoint data is introduced into the CPU 19 which forms signals for controlling the image quality-adjusting circuit 41 and the image quality-adjusting circuit 42 based on the setpoint data. The image quality-adjusting circuit 41 and the image quality-adjusting circuit 42 process the image data from the first and second image sources 2s and based on the control signals output from the CPU 19 to thereby adjust the qualities of images 46 and 47. In the multi-view display device of FIG. 12, the CPU 19 is provided on the outside of the display panel drive unit 4p. However, the CPU 19 may be provided inside the display panel drive unit 4p.

Figure 13:
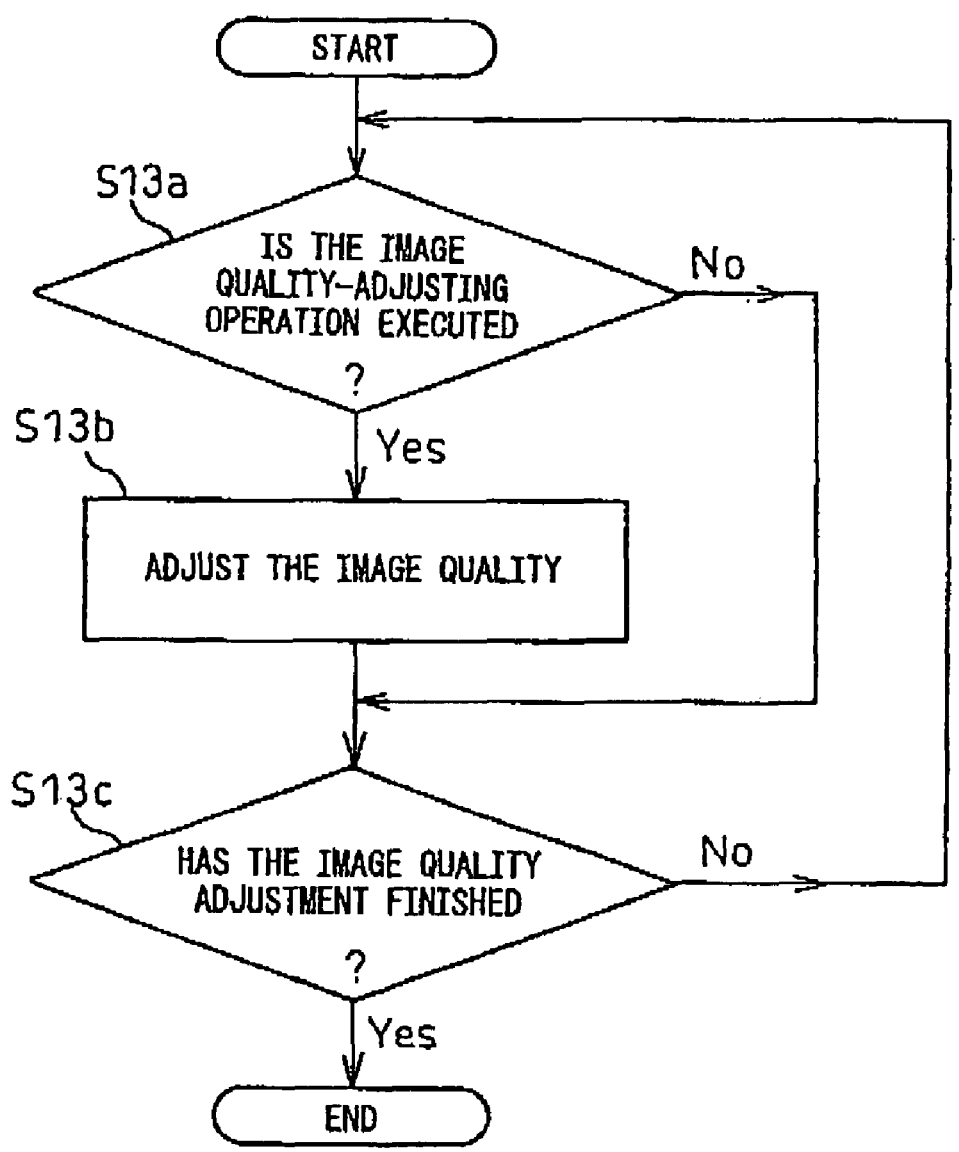
FIG. 13 is a flowchart for illustrating an image adjust process by a CPU 19 in FIG. 12.

FIG. 13 is a flowchart for illustrating an image quality adjust process by the CPU 19 in FIG. 12. This process is executed when the CPU 19 in FIG. 12 has detected an image quality adjust start instruction from the external input unit 18. That is, the flowchart is executed when the image quality adjust start instruction operation unit of the external input unit 18 is operated by the user.

First, it is detected if an image quality adjust instruction is input from the external input unit 18. If the image quality adjust instruction is input, the routine proceeds to step S13b. If no image quality adjust instruction is input, the routine proceeds to step S13c (step S13a). That is, step S13a proceeds to step S13b when the user has executed the image quality adjust operation by using the image quality adjust operation unit of the external input unit 18, and proceeds to step S13c when the user has not executed the image quality adjust operation.

At step S13b, the image quality adjust instruction is output to the image quality-adjusting circuit corresponding to the image that is to be adjusted for its quality in response to the image quality adjust instruction from the external input unit 18, and the routine proceeds to step S13c. Therefore, the image that is to be adjusted is adjusted for its quality in response to the image quality adjust operation executed by the user through the external input unit 18.

That is, when the image 46 on the left side is the image that is to be adjusted for its quality, the image quality-adjusting circuit 41 is controlled in response to the image quality adjust instruction (user's image quality adjust operation) from the external input unit 18 to adjust the quality of the image on the left side. When the image 47 on the right side is the image that is to be adjusted for its quality, the image quality-adjusting circuit 42 is controlled in response to the image quality adjust instruction (user's image quality adjust operation) from the external input unit 18 to adjust the quality of the image on the right side. The routine thereafter proceeds to step S13c.

At step S13c, it is detected if the image quality adjust completion instruction is input from the external input unit 18. If the completion instruction is input (if the image quality adjust operation unit is operated by the user), the process ends. If no image quality adjust completion instruction is input from the external input unit 18 (if the image quality adjust operation unit has not been operated by the user), the routine returns back to step S13a. As a method of detecting the image quality adjust completion instruction, it may be so judged that the image quality adjust operation is completed when a predetermined period has passed after the last operation of the external input unit 18 instead of detecting the image quality adjust completion instruction sent from the external input unit 18.

In this process, image quality adjust instructions are output to the image quality-adjusting circuits 41 and 42 for adjusting the qualities of images depending upon the image quality adjust operation through the external input unit 18. The image quality adjust instructions may be input to the image quality-adjusting circuits 41 and 42 after the image quality adjust operation completion instruction has been input.

In the multi-view display device of FIG. 12, the display panel drive unit that works as an image quality-adjusting unit is fabricated by using an IC, simplifying the step of producing the image quality-adjusting unit and decreasing the size of the multi-view display device as a whole.

Figure 14:
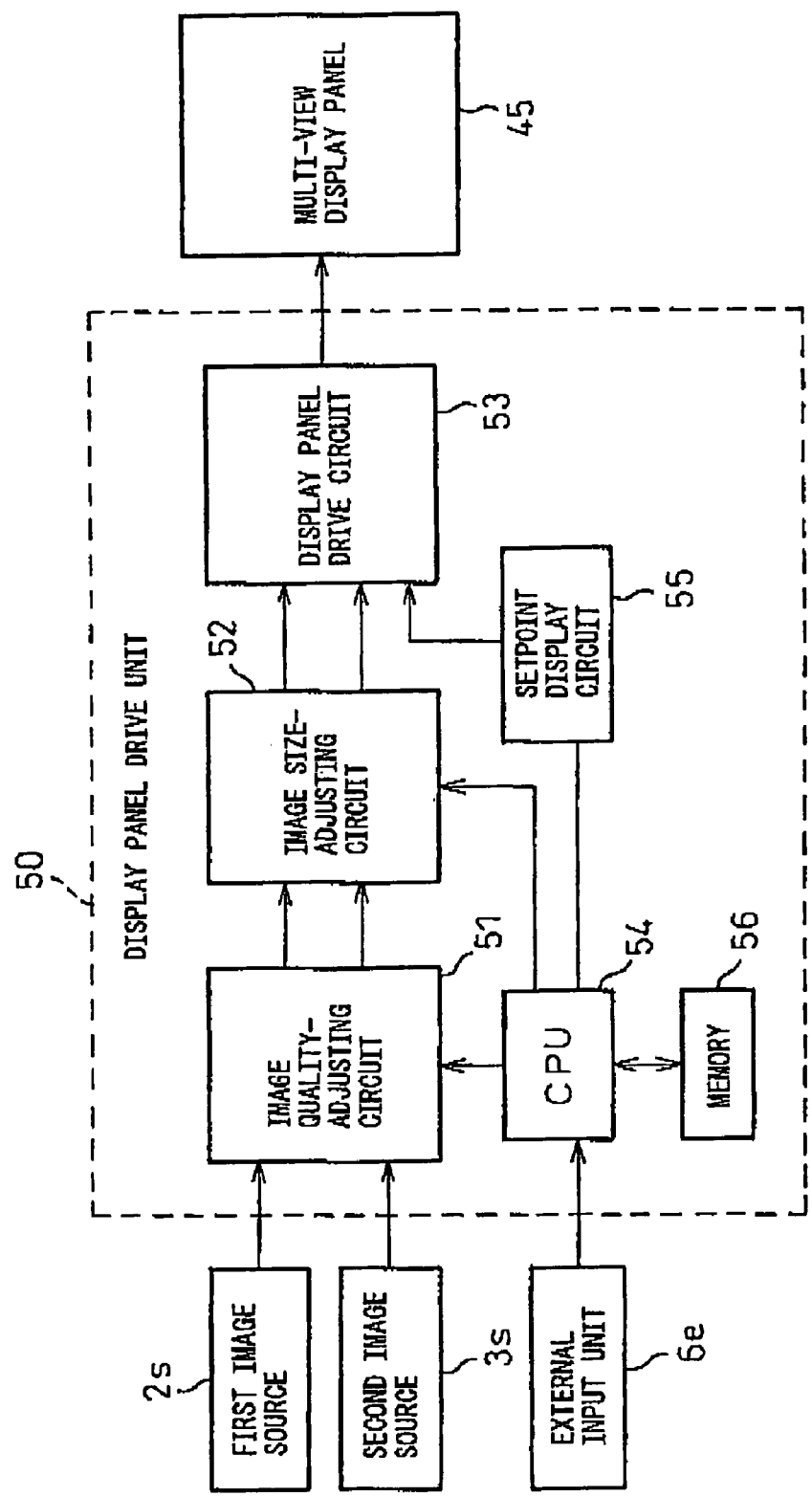
FIG. 14 is a block diagram schematically illustrating the constitution the multi-view display device according to a second embodiment of the present invention.
Figure 15:
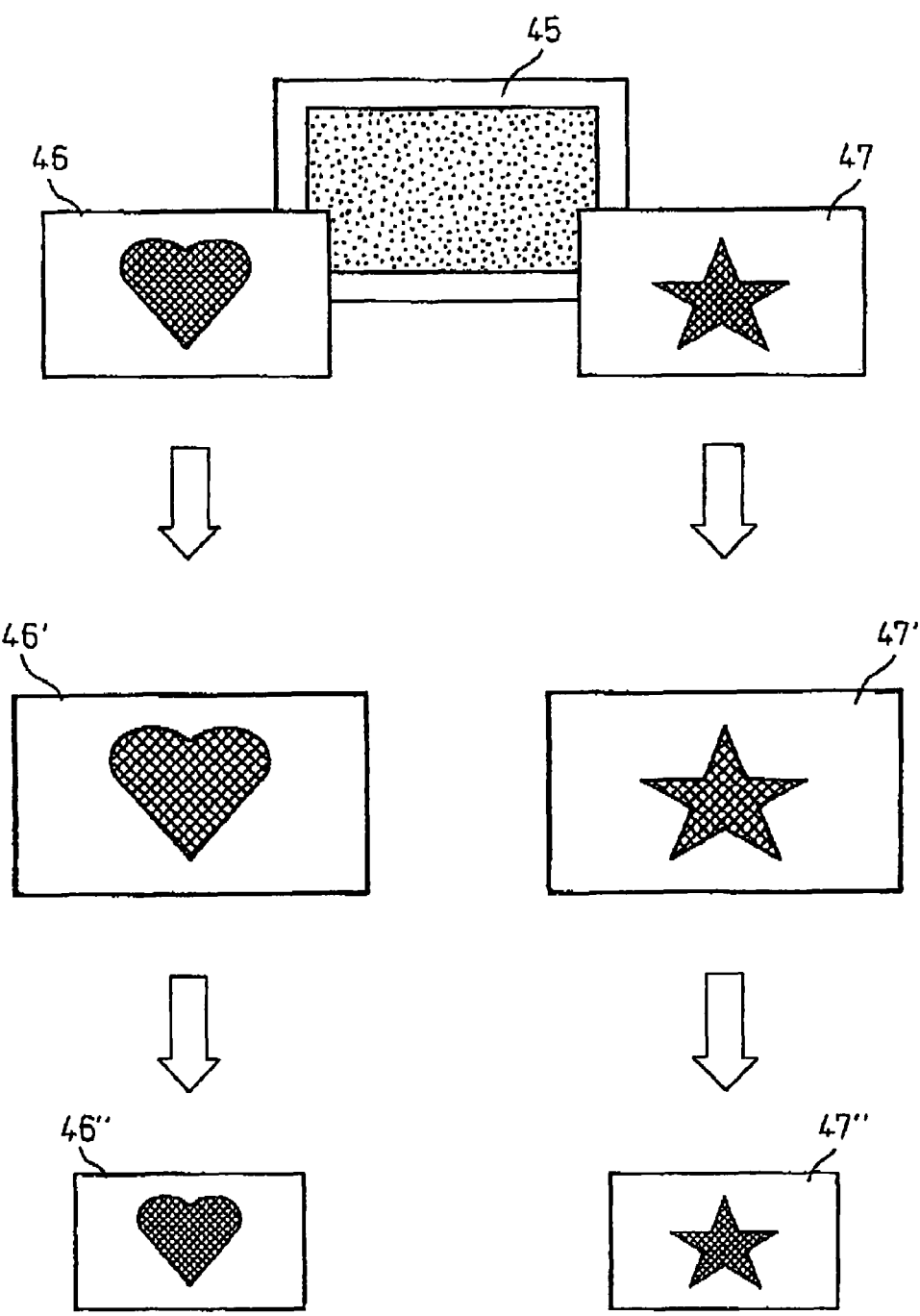
FIG. 15 is a diagram illustrating displays of images of different sizes.

FIG. 14 is a block diagram schematically illustrating the constitution of the multi-view display device according to a second embodiment of the present invention, and FIG. 15 is a diagram illustrating displays of images of different sizes. In these drawings (FIGS. 14 and 15), reference numerals common to those of FIGS. 10 to 12 denote the same or similar constituent elements and their description is not repeated again. In the drawings, reference numeral 50 denotes a display panel drive unit which makes a feature of the embodiment, 6e denotes an external input unit (i.e., input unit) constituted by operation keys of, for example, a remote control unit or a touch panel input unit. Here, the external input unit 6e includes an image quality adjust start instruction operation unit, an image quality adjust operation unit, an image quality adjust completion instruction operation unit, an image size adjust start instruction operation unit, an image size adjust operation unit and an image size adjust completion instruction operation unit.

The display panel drive unit 50 includes an image quality-adjusting circuit 51, an image size-adjusting circuit 52, a display panel drive circuit 53, a CPU 54, a setpoint display circuit 55 and a memory 56. The structure in which the image quality-adjusting circuits 41 and 42 are individually provided for the first and second images sources 2s and 3s as in the embodiment shown in FIG. 10 is accompanied by a problem in that the circuit scale becomes relatively large. To solve this problem in this embodiment, the single image quality-adjusting circuit 51 is used while adjusting its timing so that different image signals from the first and second image sources 2s and 3s are individually adjusted. The adjustment of timing will be described later.

In the device of this embodiment, further, the image size-adjusting circuit 52 is provided to individually adjust the sizes of the images 46 and 47. FIG. 15 illustrates an image 46' of an enlarged size and an image 46" of a contracted size relative to the image 46 on the left side, as well as an image 47' of an enlarged size and an image 47" of a contracted size relative to the image 47 on the right side. The images 46, 47' and 46" on the left side can be displayed independently of the images 47, 47' and 47" on the right side. Further, the image sources form images of various sizes, i.e., normal images, wide images and full images. Therefore, the user is allowed to set the image which he or she is watching to the one suited for the image source, so that the image can be watched more comfortably. With the conventional display device, however, adjusting the image size caused the size of the other image to be varied, too; i.e., the image could not be freely adjusted as the user likes.

In this embodiment, the image size-adjusting circuit 52 is provided to individually adjust the image sizes for each of the image sources, and the user is allowed to adjust the size of the image which he is now watching without worrying about the effect on the other image, and can comfortably watch the image. Like the image quality-adjusting circuit 51, the image size-adjusting circuit 52, too, is used while adjusting its timing, and is capable of individually adjusting the sizes of the individual images 46 and 47.

The setpoint for adjusting the image quality is set by the user through the external input unit 6e. The setpoint data is introduced into the CPU 54. Based upon the input data, the CPU 54 forms signals for controlling the image quality-adjusting circuit 51 and the image size-adjusting circuit 52, and outputs them to the circuits 51 and 52. Based upon the control signals output from the CPU 54, the image quality-adjusting circuit 51 and the image size-adjusting circuit 52 process the image data from the first and second image sources 2s and 3s, and adjust the images 46 and 47 and the sizes thereof.

FIG. 16 is a flowchart for illustrating a process by a CPU 54 in FIG. 14. More closely, portion (a) of FIG. 16 is a flowchart illustrating the image quality adjustment, and portion (b) of FIG. 16 is a flowchart illustrating a process for adjusting the image size.

The flowchart of portion (a) of FIG. 16 is executed when the CPU 54 of FIG. 14 has detected an image quality adjust start instruction from the external input unit 6e. That is, the flowchart is executed when the image quality adjust start instruction operation unit of the external input unit 6e is operated by the user.

First, it is detected if an image quality adjust instruction is input from the external input device 6e. If the image quality adjust instruction is input, the routine proceeds to step S16b. If no image quality adjust instruction is input, the routine proceeds to step S16c (step S16a). That is, step S16a proceeds to step S16b when the user has executed the image quality adjust operation by using the image quality adjust operation unit in the external input unit 6e, and proceeds to step S16c when the user has not executed the image quality adjust operation.

At step S16b, the image quality adjust instruction for the image to be adjusted for its quality is output to the image quality-adjusting circuit 51 in response to the image quality adjust instruction from the external input unit 6e, an image quality adjust setpoint is output to the memory 54, and the routine proceeds to step S16c. Therefore, the image is adjusted for its quality in response to the image quality adjust operation executed by the user through the external input unit 6e.

That is, when the image 46 on the left side is to be adjusted for its quality, the image 46 on the left side is adjusted for its quality by controlling the image quality-adjusting circuit 51 in response to the image quality adjust instruction (user's image quality adjust operation) from the external input unit 6e. When the image 47 on the right side is to be adjusted for its quality, the image 47 on the right side is adjusted for its quality by controlling the image quality-adjusting circuit 51 in response to the image quality adjust instruction (user's image quality adjust operation) from the external input unit 6e. Thereafter, the routine proceeds to step 16c.

At step S16c, it is detected if the image quality adjust completion instruction is input from the external input unit 6e. If the completion instruction is input (image quality adjust operation unit is operated by the user), the process ends. If no image quality adjust completion instruction is input from the external input unit 6e (image quality adjust operation unit has not been operated by the user), the routine returns back to step S16a. As a method of detecting the image quality adjust completion instruction, it may be so judged that the image quality adjust operation is completed when a predetermined period has passed after the last operation of the external input unit 6e instead of detecting the image quality adjust completion instruction sent from the external input unit 6e.

In this process, image quality adjust instructions are output to the image quality-adjusting circuit 51 for adjusting the images for their qualities depending upon the image quality adjust operation through the external input unit 6e. The image quality adjust instructions may be input to the image quality-adjusting circuit 51 after the image quality adjust operation completion instruction has been input.

The flowchart of portion (b) of FIG. 16 is executed when the CPU 54 of FIG. 14 has detected an image size adjust start instruction from the external input unit 6e. That is, the flowchart is executed when the image size adjust start instruction operation unit of the external input unit 6e is operated by the user.

First, it is detected if an image size adjust instruction is input from the external input device 6e. If the image size adjust instruction is input, the routine proceeds to step S16e. If no image size adjust instruction is input, the routine proceeds to step S16f (step S16d). That is, step S16d proceeds to step S16e when the user has executed the image size adjust operation by using the image size adjust operation unit of the external input unit 6e, and proceeds to step S16f when the user has not executed the image size adjust operation.

At step S16e, the image size adjust instruction for the image to be adjusted for its size is output to the image size-adjusting circuit 52 in response to an image size adjust instruction from the external input unit 6e, an image size adjust setpoint is output to the memory 56, and the routine proceeds to step S16f. Therefore, the image size is adjusted in response to the image size adjust operation executed by the user through the external input unit 6e.

That is, when the image 46 on the left side is to be adjusted for its size, the image 46 on the left side is adjusted for its size by controlling the image size-adjusting circuit 52 in response to the image size adjust instruction (user's image size adjust operation) from the external input unit 6e. When the image 47 on the right side is to be adjusted for its size, the image 47 on the right side is adjusted for its size by controlling the image size-adjusting circuit 52 in response to the image size adjust instruction (user's image size adjust operation) from in the external input unit 6e. Thereafter, the routine proceeds to step 16f.

At step S16f, it is detected if the image size adjust completion instruction is input from the external input unit 6e. If the completion instruction is input (image size adjust operation unit is operated by the user), the process ends. If no image size adjust completion instruction is input from the external input unit 6e (image size adjust operation unit has not been operated by the user), the routine returns back to step S16d. As a method of detecting the image size adjust completion instruction, it may be so judged that the image size adjust operation is completed when a predetermined period has passed after the last operation of the external input unit 6e instead of detecting the image size adjust completion instruction sent from the external input unit 6e.

In this process, image size adjust instructions are output to the image size-adjusting circuit 52 for adjusting the image sizes depending upon the image size adjust operation through the external input unit 6e. The image size adjust instructions may be input to the image size-adjusting circuit 52 after the image size adjust operation completion instruction has been input.

When the above flowchart of FIG. 16 is executed, the CPU 54 outputs a control signal to a setpoint display circuit 55 so that the user's setpoint data input through the external input unit 6e are displayed on the corresponding image 46 or 47. Here, the user's setpoint data may not be displayed on the corresponding image 46 or 47 but, instead, the user's setpoint data image may be displayed as an image for the left side (i.e., image on the left side) 46 or as an image for the right side (i.e., image on the right side) 47.

Figure 17:
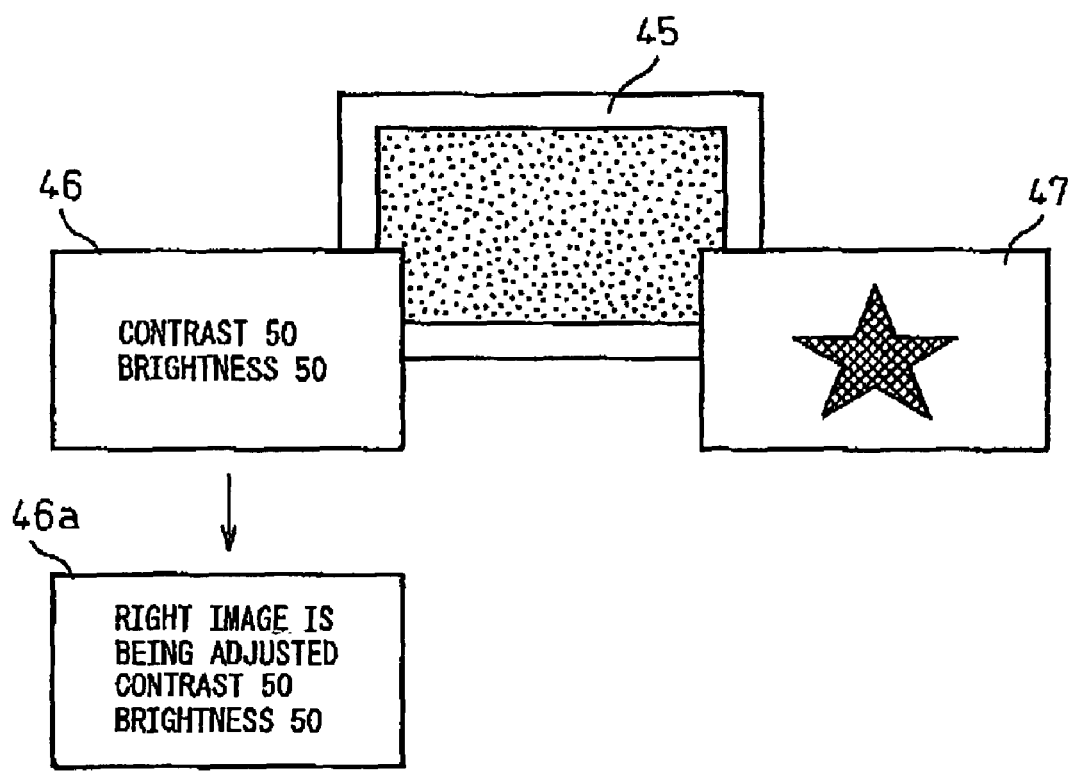
FIG. 17 is a diagram of a display on a display panel.

FIG. 17 illustrates a case of when the user's setpoint data image is displayed as the image for the left side (i.e., image on the left side) 46. If the user on the left side of the display panel 45 is going to adjust the image which he or she is now watching by using a remote control unit or the like, the user's setpoint data image is displayed, i.e., the contrast 50 and brightness 50 are displayed as the image for the left side (i.e., image on the left side) 46. Therefore, the user is allowed to adjust the image while confirming the details set by himself. The display is made on only the side of the user who effects the setting but is not made on the other side. Therefore, the user who is watching the other image is allowed to continuously watch his image without affected by the behavior of the user who is trying to adjust the quality of the image.

Depending upon the method of input through the external input unit 6e, further, it is allowed to adjust the image quality on the right side while, for example, displaying the details for adjusting the image quality on the right side on the image of the left side or displaying the details as the image for the left side. That is, the user on the left side is allowed to adjust the image quality on the right side while watching the image 46a on the left side. In this case as shown in, for example, FIG. 17, adjustment of the image quality on the right side is displayed on the image 46a on the left side by using the setpoint display circuit 55 making it easy to confirm which image the user is now adjusting.

In the device shown in FIG. 14, the memory 56 stores the input data from the external input unit 6e as well as the image adjust values in the image-adjusting circuit 51 and the image size adjust values in the image size-adjusting circuit 52. The setpoints are used by the user for adjusting the image quality and for adjusting the image size next time. That is, to adjust the image quality next time, the image quality and the image size are initially set based on the setpoints stored in the memory 56, and the initial setpoints are displayed on the image or as the image. Therefore, the user is allowed to start new setting based on the setting of the last time. When the setting which is the same as the setting of the last time is desired, therefore, no adjusting work is necessary. Or, the setting work can be newly forwarded by making reference to the setpoints of the last time. Therefore, the operation for adjusting the image quality is facilitated.

Further, by using the setpoints stored in the memory 56 for operating both the images 46 and 47 for the left side and the right side, it is allowed to decrease the size of the memory circuit. Further, when it is desired to use the setpoint used for the left image 46 or the right image 47 again for adjusting the other image, the work can be saved for effecting the adjustment again. The memory 56 may be the memory that is externally attached.

Figure 18:
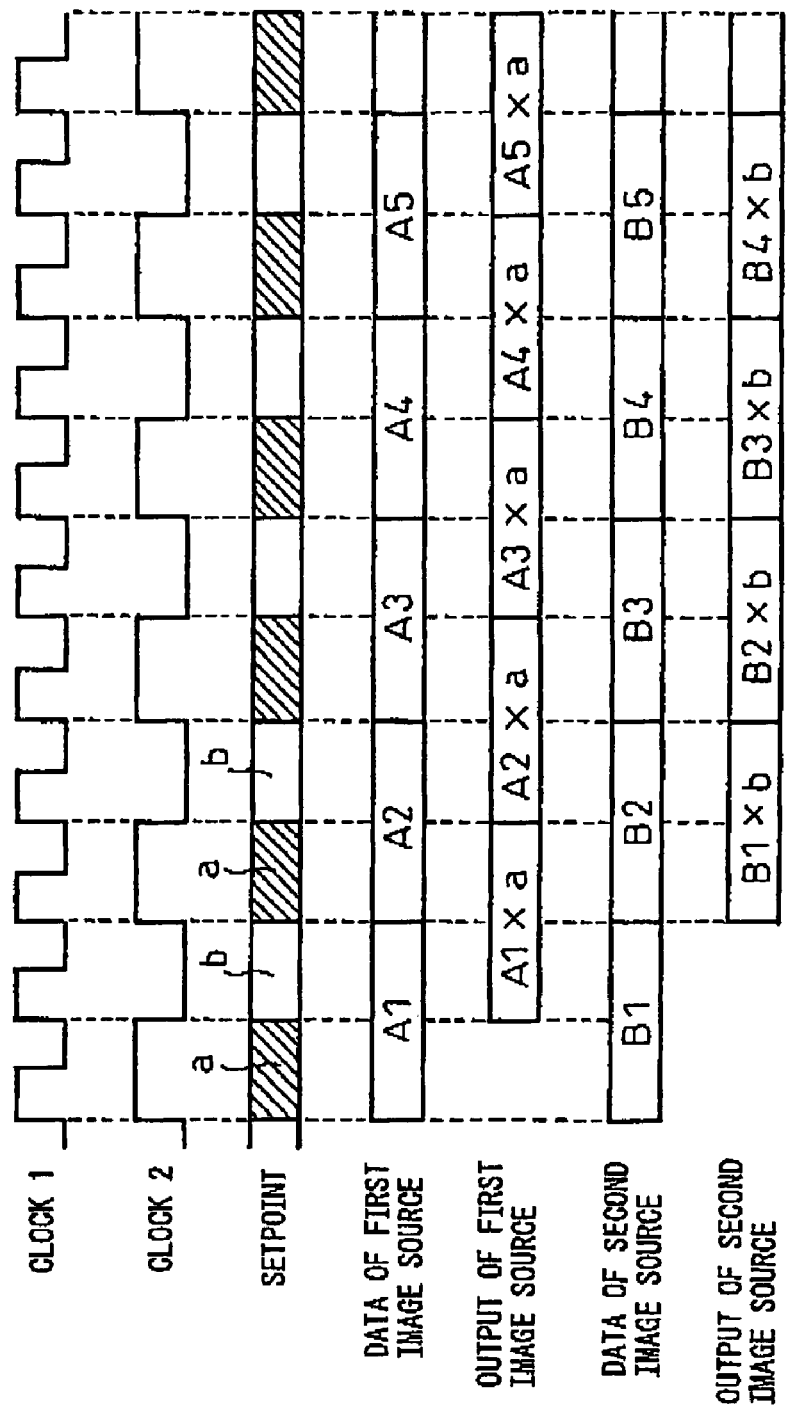
FIG. 18 is a timing chart for illustrating the operation of a device shown in FIG. 14.

FIG. 18 is a timing chart of when the image qualities of the first and second image sources 2s and 3s are individually adjusted by adjusting the timing in the circuit shown in FIG. 14. In FIG. 16, the image qualities are adjusted by the image-adjusting circuit 51 and by the CPU 54. However, the image size-adjusting circuit 52, too, is capable of individually adjusting two images by controlling the timing.

Clocks 1 of FIG. 18 are the system operation clocks, and clocks 2 are clocks of one-half the frequency of the clocks 1. Images of the first image source and the second image source to be adjusted for their qualities are sorted by the clocks 2. Referring to "setpoints" in FIG. 18, the hatched portions "a" represent an image quality adjust setpoint of the first image source, and the blank portions "b" represent an image quality adjust setpoint of the second image source 3.

When the clocks 2 are of the high level, the image of the first image source 2s is adjusted for its quality based on the data of the first image source 2s and on the data of hatched portions "a" which are the setpoints. When the clocks 2 are of the low level, the image of the second image source is adjusted for its quality based on the data of the second image source 3s and on the data of blank portions "b" which are the setpoints. A "first image source output" shown represents the operated result of the first image source data and the setpoint, while a "second image source output" represents the operated result of the second image source data and the setpoint.

That is, the values A1×a, A2×a, - - - obtained by operating the data A1, A2, A3, A4, - - - of the first image source by the setpoint "a" are output as the first image source output at timings shown in FIG. 18 while the values B1×b, B2×b, - - - obtained by operating the data B1, B2, B3, B4, - - - of the second image source by the setpoint "b" are output as the second image source output at timings shown in FIG. 18.

The "first image source output" is produced from the image quality-adjusting circuit 51 of FIG. 14 and is input to the display panel drive circuit 53 that controls and drives the image 46. The "second image source output", too, is similarly produced from the image quality-adjusting circuit 51 and is input to the display panel drive circuit 53 that controls and drives the image 47.

As described above, the two images 46 and 47 are individually controlled by the image quality-adjusting circuit 51. The image is adjusted for its brightness and contrast by using an arithmetic unit, and the numbers of the respective operations are not the same. In practice, therefore, the timings become slightly different from those of the timing chart of FIG. 18, but the basic operations are the same.

Next, the embodiment of the invention will be described more concretely with reference to the accompanying drawings (FIGS. 19 to 37).

Figure 19:
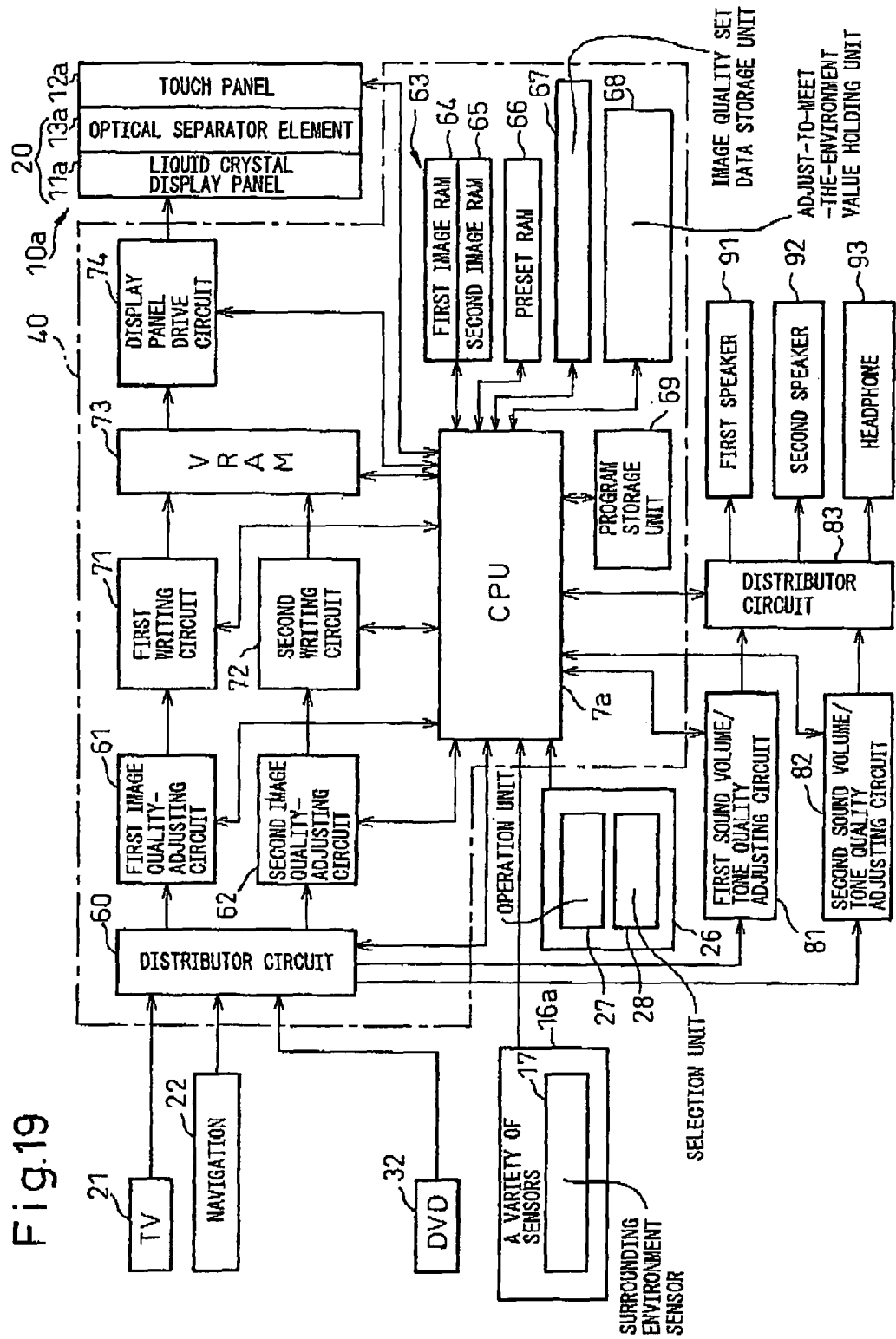
FIG. 19 is a block diagram schematically illustrating the constitution of the multi-view display device according to a third embodiment of the present invention.
Figure 20:
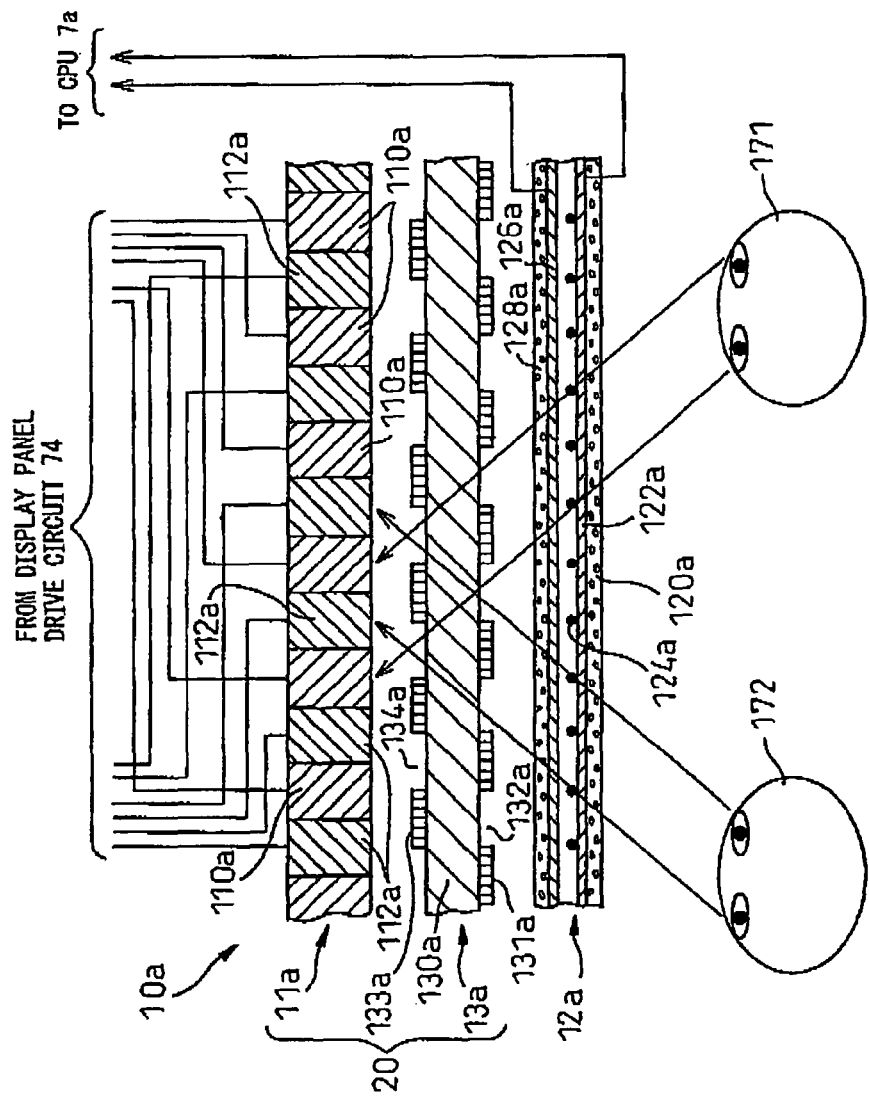
FIG. 20 is a view schematically illustrating the sectional shape of a display unit in FIG. 19.

FIG. 19 is a block diagram schematically illustrating the constitution of the multi-view display device according to a third embodiment of the present invention, and FIG. 20 is a view schematically illustrating the sectional shape of a display unit in FIG. 19.

Schematically described here is the constitution of a multi-view display device for mounting on a vehicle, which writes two kinds of image data from the image sources after having been individually adjusted for their qualities into a VRAM (video RAM) 73 in order to simultaneously display two kinds of individual images on the screen of the same multi-view display panel 20.

The multi-view display device according to the third embodiment of FIG. 17 is provided with a display unit 10a for providing multi-view displays for the driver's seat and the assistant driver's seat in the vehicle. The display unit 10a simultaneously displays, on the same multi-view display panel 20, the first image that can be observed from the first direction such as the driver's seat and the second image that can be observed from the second direction such as the assistant driver's seat.

The user (e.g., driver) on the right side of the multi-view display panel 10a observes the first image and the user (e.g., passenger on the assistant driver's seat) on the left side observes the second image. The user on the right side cannot observe the second image and the user on the left side cannot observe the first image. Therefore, the user on the right side is allowed to view the image which he likes without bothered by the eyes of the user on the left side, and the user on the left side is allowed to view the image which he likes without bothered by the eyes of the user on the right side.

Further, the display unit 10a of FIG. 19 is of a structure forming the multi-view display panel 20 with an optical separator element 13a being provided on the front surface side of the liquid crystal display panel 11a and, further, forming a touch panel 12a. In principle, it is also allowable to use a display device comprising a CRT (cathode-ray tube) or a plasma display device in addition to the liquid crystal display panel 11a. Further, the optical separator element 13a may be of the active type (e.g., variable shutter) being constituted by a liquid crystal shutter.

Referring to FIG. 20, the touch panel 12a is constituted by a pair of transparent insulating substrates 120a and 128a having flexibility, transparent electrodes 122a and 126a formed on the above pair of transparent insulating substrates, and dot spacers 124a arranged like a matrix on the transparent electrodes. As the user depresses the transparent insulating substrate 120a causing the dot spacer 124a to come in contact with the transparent electrode 126a, the position of contact is detected by measuring the electric resistance, and the input data is read by the CPU 7a in FIG. 19. The touch panel 12a is not limited to the one of the above constitution but may be the one based on other system.

The liquid crystal display panel 11a of FIG. 20 is constituted by liquid crystal display elements and is divided into a plurality of belt-like display regions in the longitudinal direction, alternately forming first display regions 110a displaying the first image and second display regions 112a displaying the second image. The multi-view display panel 20 is formed by arranging the optical separator element 13a on the front surface side of the liquid crystal display panel 11a of FIG. 20 as described above. The display elements of the liquid crystal display panel 11a are driven and controlled by the display panel drive circuit 74.

The optical separator element 13a has a function of offering a multi-view display by separating the first image observed from the driver's seat and the second image observed from the assistant driver's seat from each other at a predetermined visual field angle, and has a transparent cover (or transparent insulating substrate) 130*a* formed of a polycarbonate or the like. A plurality of light-shielding portions 131*a*, 133*a* are alternately formed on the front and back surfaces of the transparent cover 130*a* and, as a result, a plurality of light-transmitting slit portions 132*a*, 134*a* are alternately formed. In FIG. 20, a plurality of light-shielding portions and a plurality of light-transmitting slit portions are formed on the front and back surfaces of the transparent cover 130*a*. However, the plurality of light-shielding portions and the plurality of light-transmitting slit portions may be formed on one surface only of the transparent cover 130*a*.

Referring to FIG. 20, due to the action of the optical separator element 13*a*, a first passenger (e.g., driver) 171 in the first visual region inclusive of the driver's seat is allowed to watch only the image on a set of the first display regions 110*a* as a first image for the driver's seat, and due to the action of the optical separator element 13*a*, a second passenger (e.g., passenger on the assistant driver' seat) 172*a* in the second visual field inclusive of the assistant driver's seat is allowed to watch only the image on a set of the second display regions 112*a* as a second image for the assistant driver's seat. As described above, every other image is actually watched by dividing a single screen into a plurality of display regions in the longitudinal direction. By very decreasing the width of each display region, however, individual images can be simultaneously watched from both the driver's seat side and the assistant driver's seat side.

Desirably, the viewing angle, viewing range and crosstalk in the multi-view display device are determined by using light-transmitting slit portions having a preset thickness and a width.

In the multi-view display device of FIG. 19, a TV receiver 21, a navigation device 22 or a DVD player 32 is provided as an image source which can be observed from different directions.

Further, the multi-view display device of FIG. 19 is provided with a display panel drive unit 40. The display panel drive unit 40 processes the image data (image data of the selected two image sources when the images of different image sources are to be displayed) sent from the image sources that are selected for being displayed, and forms signals for driving the multi-view display panel 20, so that the corresponding first image and the second image are displayed on the respective regions of the multi-view display panel 20.

If described in further detail, the display panel drive unit 40 of FIG. 19 is provided with a distributor circuit 60 which also simultaneously receives the image data transmitted from the image sources. The distributor circuit 60 sends two kinds of image data of image sources selected by the user (selected as the first image data and the second image data or, often, the image data may be the same one) to the next stage.

Further, the display panel drive unit 40 of FIG. 19 includes a first image quality-adjusting circuit 61 for adjusting the quality of the first image displayed on the region where the first image is to be displayed, and a second image quality-adjusting circuit 62 for adjusting the quality of the second image displayed on the region where the second image is to be displayed. Here, adjusting the quality of the first image by the first image quality-adjusting circuit 62 is individual from adjusting the quality of the second image by the second image quality-adjusting circuit 62. The image quality may be adjusted by the first and second image quality-adjusting circuits 61 and 62 in an analog manner. In practice, however, it is desired to store the input image data in a digitized form in a memory (not shown) for process, and subject the image data stored in the memory to the arithmetic process to adjust the image quality.

Further, the display panel drive unit 40 of FIG. 19 includes a first writing circuit 71, a second writing circuit 72, a VRAM 73 and display panel drive circuit 74. Here, the first writing circuit 71 writes, into a corresponding region of the VRAM 73, the image data corresponding to odd number columns of the image (odd number columns of the image on the multi-view display panel 11*a*) among the image data processed by the first image quality-adjusting circuit 61, and the second writing circuit 72 writes, into a corresponding region of the VRAM 73, the image data corresponding to even number columns of the image (even number columns of the image on the multi-view display panel 11*a*) among the image data processed by the second image quality-adjusting circuit 62.

The display panel drive circuit 74 is a driver circuit for driving the liquid crystal display panel 11*a*, and drives the corresponding pixels of the liquid crystal display panel 11*a* based on the image data (synthetic data of the first image data and the second image data) held in the VRAM 73. As described already, the image data have been written into the VRAM 73 so as to be corresponded to the image for being multi-view displayed. Therefore, only one drive circuit may be used, and its operation is the same as the operation of the drive circuit in an ordinary liquid crystal display device.

The display panel drive unit 40 in FIG. 19 includes CPU 7*a* which is a microcomputer for generally controlling the operations of the distributor circuit 60, first image quality-adjusting circuit 61, second image quality-adjusting circuit 62, first writing circuit 71, second writing circuit 72, VRAM 73 and display panel drive circuit 74. The CPU 7*a* includes a program storage unit 69 such as ROM for holding various programs necessary for operating the display device, and a data storage unit such as RAM for holding various data. Here, the ROM and the RAM are provided on the outer side of the CPU. The ROM and the RAM, however, may be incorporated in the CPU.

Further, the multi-view display device of FIG. 19 is provided with an input unit 26 which includes an operation unit 27 such as push-button switches or operation keys of a remote control unit for inputting various data and a selection unit (e.g., selection buttons) 28 for selecting the state of adjusting the quality of the first image or the second image. As the input unit 26, there can be exemplified an image quality adjust operation instruction unit, an image quality adjust operation completion instruction unit and an image quality adjust operation unit. As the selection unit 28, there can be exemplified an image quality adjust/copy operation unit, a mode change-over operation unit, an image quality adjust exchange operation unit, an image quality adjust setpoint registration operation unit and an image quality adjust setpoint read operation unit (e.g., preset switch), etc. The selection unit 28 is included in the above-mentioned touch panel operation unit 26. Further, there may be provided an image quality adjust setpoint registration/read operation unit to work both as the above image quality adjust setpoint registration operation unit and the image quality adjust setpoint read operation unit, and the function (registration instruction/read instruction) may be changed over depending upon the operation state (long button/short button).

As the image quality-related data storage unit, further, there can be exemplified a preset RAM (i.e., preset holding unit) 66 for holding the quality adjust setpoints for the first image and/or the second image as preset values in advance or through the registration process that will be described later, a first image RAM 64 and a second image RAM 65 (image quality adjusting state storage unit 63) into which the quality adjust setpoints of the first image and the second image are written, an image quality set data storage unit 67 for storing the data related to the frequency of quality adjusting states of the first image and the second image, and an adjust-to-meet-the-environment value holding unit 68 for holding the state of adjusting the qualities of the first image and the second image set to meet the surrounding environment.

As the image quality set data storage unit 67, there can be exemplified an adjustment frequency storage unit for storing a frequency of adjustment using an image quality adjust value for the first image and a frequency of adjustment using an image quality adjust value for the second image.

If described in further detail, the preset RAM 66 stores the image adjust setpoints for the first image and/or the second image in response to the image quality adjust setpoint read operation unit (e.g., preset switch) of the operation unit 27. If the image quality adjust setpoint read operation unit (e.g., preset switch) is operated, a corresponding image quality adjust setpoint is read out, is written into the first image RAM 64 or the second image RAM 65 (on the side of the selected image), and the first image and/or the second image are adjusted for their qualities based on the image quality adjust setpoints. On the other hand, if the image quality adjust setpoint registration operation unit (e.g., registration switch) and the image quality adjust setpoint read operation unit (e.g., preset switch) in the operation unit 27 are operated, the image adjust setpoints written in the first image RAM 64 and/or the second image RAM 65 are written into the corresponding region of the image quality adjust setpoint read operation unit (e.g., preset switch) in the preset RAM 66. Values that are fixed by the manufacturer are also useful as some of the preset adjust values in the preset RAM 66. As described above, further, the image quality adjust setpoint registration/read operation unit may be provided to work both as the image quality adjust setpoint registration operation unit and the image quality adjust setpoint read operation unit, and the function (registration instruction/read instruction) may be changed over depending upon the operation state (long button/short button). In this case, the image quality adjust setpoints held in a region corresponding to the image quality adjust setpoint read operation unit that is operated of the preset RAM 66 are cyclically read out for every operation of the image quality adjust setpoint read operation unit.

Further, the multi-view display device of FIG. 19 includes a variety of sensors 16a inclusive of a surrounding environment sensor (e.g., brightness sensor) 17 for detecting a change in the surrounding environment on the driver's seat side and on the assistant driver's seat side. The surrounding environment sensor may consist of a single surrounding environment sensor for commonly detecting changes in the surrounding environment on the driver's seat side and the assistant driver's seat side, or a plurality of surrounding environment sensors for individually detecting changes in the surrounding environment on the drivers seat side and the assistant driver's seat side.

The multi-view display device of FIG. 19 is provided with two kinds of image quality-adjusting circuits for individually adjusting the quality of the first image observed from the driver's seat and the quality of the second image observed from the assistant driver's seat. Upon writing the image data of which the qualities have been adjusted, it is allowed to display the images individually for the driver's seat side and for the assistant driver's seat side.

The multi-view display device of FIG. 19 is provided with a first sound volume/tone quality-adjusting circuit 81, a second sound volume/tone quality-adjusting circuit 82, a distributor circuit 83, a first speaker 91, a second speaker 92 and a headphone 93.

If described in detail, the first sound volume/tone quality-adjusting circuit 81 has a function for adjusting the sound volume and the tone quality of the first acoustic signal corresponding to the first image data of the image source, and the second sound volume/tone quality-adjusting circuit 82 has a function for adjusting the sound volume and the tone quality of the second acoustic signal corresponding to the second image data of the image source. Here, the first sound volume/tone quality-adjusting circuit 81 adjusts the sound volume and the tone quality of the first acoustic signal individually from the adjustment of the sound volume and the tone quality of the second acoustic signal by the second sound volume/tone quality-adjusting circuit 82. The distributor circuit 83 so controls that from which speaker the voices corresponding to the first image and the second image be produced, and works to switch and mix the voices for the images.

The acoustic signal from the distributor circuit 83 is output to the specified first speaker 91, second speaker 92 and headphone 93 enabling the tone quality and the sound volume of the acoustic signals to be individually adjusted on the driver's seat side and on the assistant driver's seat side.

As for adjusting the tone quality and sound volume of the acoustic signals, too, the tone quality/sound volume adjust values can be preset by the same method as that of the above-mentioned case of adjusting the image quality. In this case, the tone quality/sound volume adjust value corresponding to the preset switch that is operated is input to the first tone quality/sound volume-adjusting circuit 81 or the second tone quality/sound volume-adjusting circuit 82.

Figure 21:
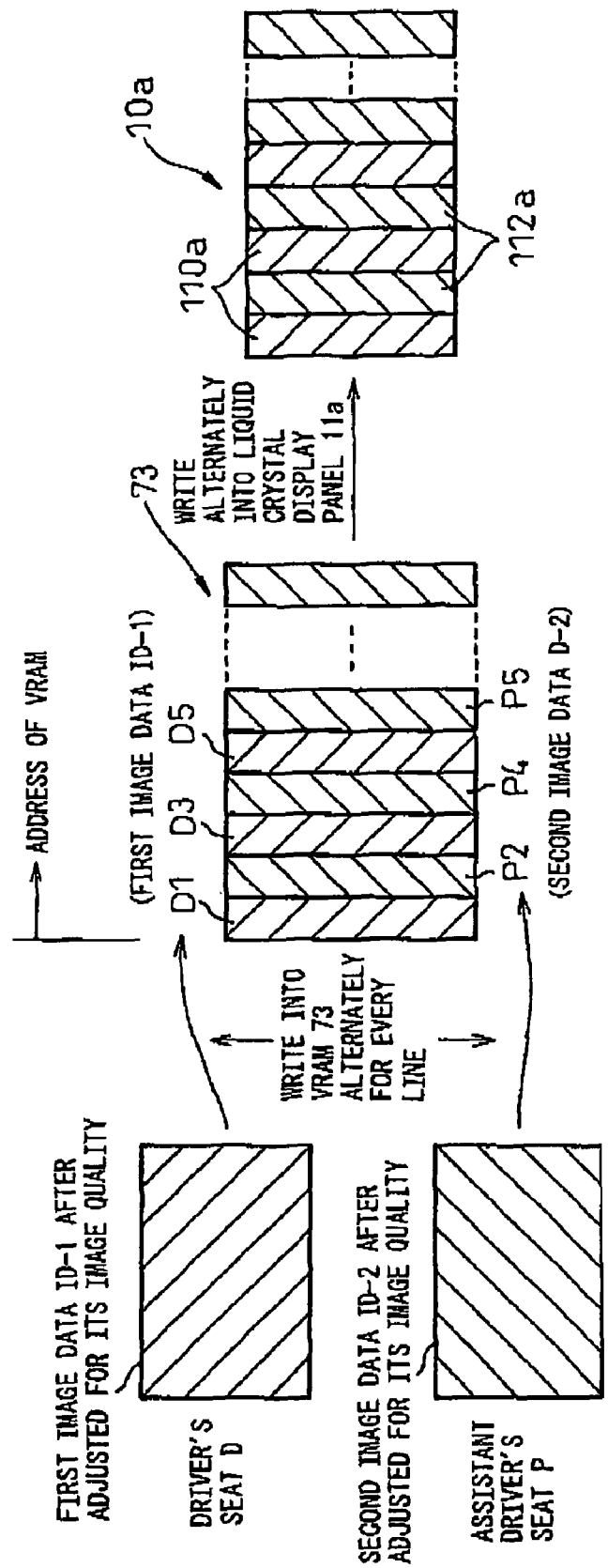
FIG. 21 is a diagram schematically illustrating how to write two kinds of image data into VRAM.

FIG. 21 is a diagram schematically illustrating a state of writing two kinds of image data into the VRAM 73. As described with reference to FIG. 19, the first image data corresponding to the first image observed from the driver's seat D is adjusted for its quality by the first image quality-adjusting circuit 61, and the second image data corresponding to the second image observed from the assistant driver's seat is adjusted for its quality by the second image quality-adjusting circuit 62 which is individual from the first image quality-adjusting circuit 61.

Referring to FIG. 21, the first image data ID-1 adjusted for its quality by the first image quality-adjusting circuit 61 is written into the VRAM 73 via the first writing circuit 71 (see FIG. 19), and the second image data ID-2 adjusted for its quality by the second image quality-adjusting circuit 62 is written into the VRAM 73 via the second writing circuit 72 (see FIG. 19). Here, the first image data ID-1 after adjusted for its quality and the second image data ID-2 after adjusted for its quality are alternately written for every line into the same VRAM 73. In other words, the first image data ID-1 are written into the VRAM 73 like D1, D3, D5, - - - according to every other addresses of odd numbers. Further, the second image data ID-2 are written into the VRAM 73 like D2, D4, D6, - - - according to every other addresses of even numbers.

A synthetic image comprising the first image data ID-1 and the second image data ID-2 held in the VRAM 73 is displayed on the display unit 10a by the display panel drive circuit 74 (see FIG. 19). Finally, the first image data ID-1 and the second image data ID-2 are displayed on the first display region 110a and the second display region 112a of the liquid crystal display panel 11a on the display unit 10a.

Figure 22:
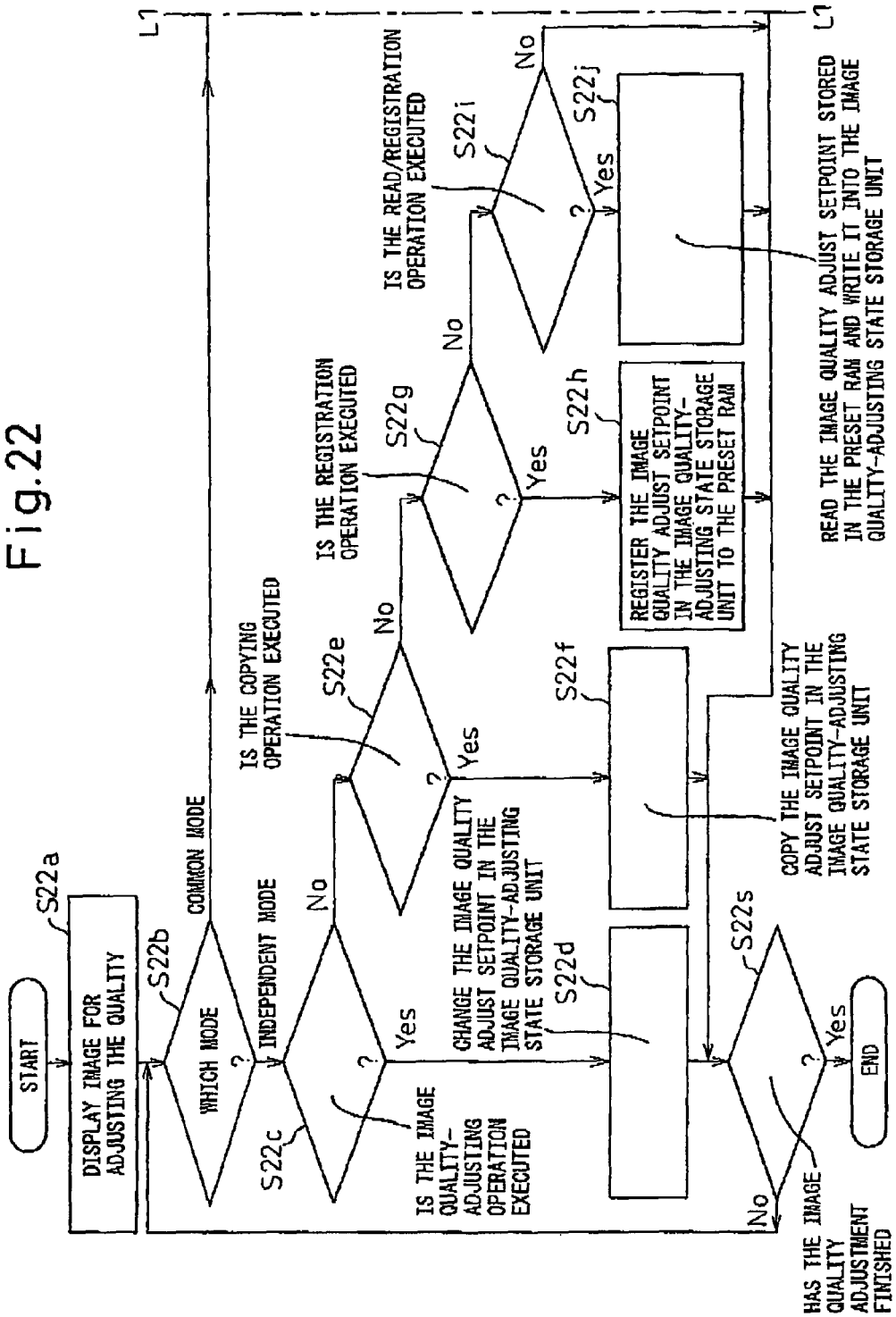
Figure 23:
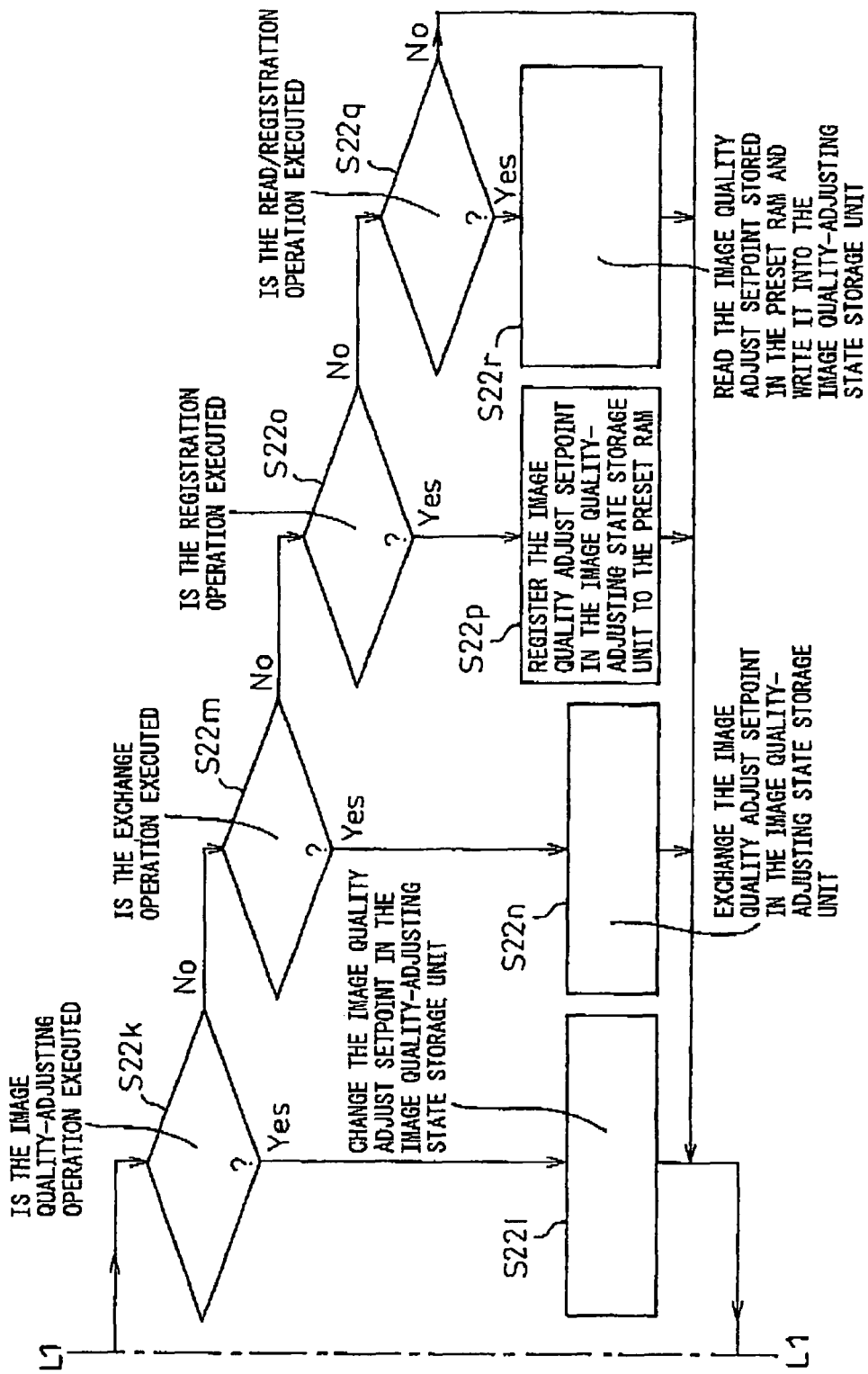

FIGS. 22 and 23 are flowcharts (part 1 and part 2) for illustrating the image quality adjust process by the CPU 7a. This process is executed when the CPU 7a of FIG. 19 has detected the image quality adjust start instruction from the input unit 26 (operation unit 27). That is, the flowchart is executed when the image quality adjust start instruction operation unit of the external input device (CPU 7*a*) is operated by the user. Steps S22*c* and S22*d* in FIG. 22 are image quality adjust processes in an individual mode, steps S22*e* and S22*f* are image copy processes in the individual mode, steps S22*g* and S22*h* are preset processes in the individual mode, steps S22*l* and S22*j* are preset read processes in the individual mode, steps S22*k* and S22*l* in FIG. 23 are image quality adjust processes in a common mode, steps S22*m* and S22*n* are image exchange/copy processes in the common mode, steps S22*o* and S22*p* are preset processes in the common mode, and steps S22*q* and S22*r* are preset read processes in the common mode.

First, a display instruction for an image for adjusting the image quality that will be described later is output to the image quality-adjusting circuit and to the writing circuit, and the routine proceeds to step S22*b* (step S22*a*).

Next, a mode instruction from the mode change-over operation unit of the input unit 26 (selection unit 28) is detected, and it is decided if the present mode of the multi-view display device is an individual mode for individually adjusting the qualities of a plurality of images or a common mode for commonly adjusting the qualities of the plurality of images. When the present mode is the individual mode, the routine proceeds to step S22*c*. When the present mode is the common mode, the routine proceeds to step S22*k*. That is, step S22*b* decides the state of the mode change-over operation unit of the input unit 26 (selection unit 28) operated by the user. The routine proceeds to step S22*c* when it is the individual mode and proceeds to step S22*k* of FIG. 23 when it is the common mode.

Next, described below with reference to FIG. 22 is an image quality adjust process according to an adjust instruction from the image quality adjust operation unit in the individual mode.

At step S22*c*, it is decided if an image adjust instruction is input from the input unit 26 (operation unit 27). The routine proceeds to step S22*d* if the image quality adjust instruction is input and proceeds to step S22*e* if no image quality adjust instruction is input. That is, the routine proceeds to step S22*d* if the user at step S22*c* has executed the image quality adjust operation by using the image quality adjust operation unit of the input unit 26 (operation unit 27). In other cases, the routine proceeds to step S22*e*.

At step S22*d*, the image quality adjust setpoint is adjusted depending upon the image quality adjust instruction from the input unit 26 (operation unit 27), the image quality adjust setpoint held in the image quality adjusting state storage unit 63 (first image RAM 64 or second image RAM 65) corresponding to the image which is to be adjusted for its quality, is rewritten by the image quality adjust setpoint that has been adjusted, an image quality adjust instruction corresponding to the adjusted image quality adjust setpoint is output to the image quality-adjusting circuit (first image quality-adjusting circuit 61 or the second image quality adjusting circuit 62) corresponding to the image which is to be adjusted for its quality, and the routine proceeds to step S22*s*. That is, at step S22*d*, if the first image is an image that is to be adjusted for its quality, the image quality adjust setpoint in the first image RAM 64 is rewritten in response to an image quality adjust instruction (image quality adjust operation by the user) from the input unit 26 (operation unit 27), and the image quality adjust instruction corresponding to the image quality adjust setpoint written in the first image RAM 64 is transmitted to the first image quality-adjusting circuit 61 to change the quality of the first image. If the second image is an image that is to be adjusted for its quality, the image quality adjust setpoint in the second image RAM 65 is rewritten in response to an image quality adjust instruction (image quality adjust operation by the user) from the input unit 26 (operation unit 27), and the image quality adjust instruction corresponding to the image quality adjust setpoint written in the second image RAM 645 is transmitted to the second image quality-adjusting circuit 62 to change the quality of the second image, and the routine proceeds to step S22*s*.

Next, described below is an image quality adjust process in response to a copy instruction from the image quality copy operation unit in the individual mode.

At step S22*e*, it is decided if an image quality adjust setpoint copy instruction is input from the input unit 26 (selection unit 28). The routine proceeds to step S22*f* if the image quality adjust setpoint copy instruction is input and proceeds to step S22*g* if no image quality adjust setpoint copy instruction is input. That is, the routine proceeds to step S22*f* if the user at step S22*e* has executed the image quality copy operation by using the image quality copy operation unit of the input unit 26 (selection unit 28). In other cases, the routine proceeds to step S22*g*.

At step S22*f*, the image quality adjust setpoint of an image (e.g., second image) other than the image that is to be adjusted for the quality, is read out from the image quality adjusting state storage unit (e.g., second image RAM 65) corresponding to the image that is to be adjusted for its quality. The image quality adjust setpoint in the image quality adjusting state storage unit 63 (e.g., first image RAM 64) corresponding to the image (e.g., first image) to be adjusted, is rewritten by the image quality adjust setpoint read out from the image quality adjusting state storage unit 63 (e.g., second image RAM 65) corresponding to an image (e.g., second image) other than the image that is to be adjusted for its quality. Further, an image quality adjusting instruction corresponding to the image quality adjust setpoint that is rewritten is output to the image quality-adjusting circuit (e.g., first image quality-adjusting circuit 61) corresponding to the image that is to be adjusted for its quality. That is, the quality of the image (e.g., first image) which is to be adjusted for its quality is changed into the quality of the image (e.g., second image) other than the image that is to be adjusted for its quality.

In this process, if the user operates the image quality copy operation unit on the multi-view display device shown in FIG. 19 to issue an instruction for copying the image quality adjust setpoint, the image quality setpoint for either the first image or the second image (image which is to be adjusted for its quality) is changed to an image quality adjust setpoint value of the other image (other than the image that is to be adjusted for its quality). Concretely, when the state of adjusting the quality of the first image (image quality adjust setpoint) is to be changed into the state of adjusting the quality of the second image (image quality adjust setpoint), the image quality adjust setpoint in the first image RAM 64 is rewritten by the value (image quality adjust setpoint) stored in the second image RAM 65. Or, when the state of adjusting the quality of the second image (image quality adjust setpoint) is to be changed into the state of adjusting the quality of the first image (image quality adjust setpoint), the image quality adjust setpoint in the second image RAM 65 is rewritten by the value (image quality adjust setpoint) stored in the first image RAM 64. Due to this process, the driver who has changed the seat is allowed to continuously use the image quality which he likes.

Next, described below is a preset process in response to a registration instruction from the image quality copy adjust setpoint registration operation unit in the individual mode.

At step S22g, it is decided if an image quality adjust setpoint registration instruction is input from the input unit 26 (selection unit 28). The routine proceeds to step S22h if the image quality adjust setpoint registration instruction is input and proceeds to step S22i if no image quality adjust setpoint registration instruction is input. That is, the routine proceeds to step S22h if the user at step S22g has executed the image quality adjust setpoint registration operation by using the image quality adjust setpoint registration operation unit (e.g., preset switch) provided in the input unit 26 (selection unit 28). In other cases, the routine proceeds to step S22l. The operation for registering the image quality adjust setpoint can be suitably changed into the one by operating the preset switch as described above or the one by operating the preset switch plus operating the registration switch.

At step S22h, the image quality adjust setpoint is read out from the image quality adjusting state storage unit 63 corresponding to the image that is to be adjusted for its quality, and is written into a region of the preset RAM 66 corresponding to the image quality adjust setpoint registration operation unit that is operated. The routine proceeds to step S22s.

That is, when the first image is an image that is to be adjusted for its quality, the image quality adjust setpoint stored in the first image RAM 64 is written into the preset RAM 66 corresponding to the image quality adjust setpoint registration operation unit that is operated in response to a registration instruction (registration operation by the user) from the input unit 26 (selection unit 28). Or, when the second image is an image that is to be adjusted for its quality, the image quality adjust setpoint stored in the second image RAM 65 is written into the preset RAM 66 corresponding to the image quality adjust setpoint registration operation unit that is operated. The image quality adjust setpoint written in the region of the preset RAM 66 corresponding to the image quality adjust setpoint registration operation unit may be in a number of one or in a plural number. Further, the image quality adjust setpoint written into the region of the preset RAM 66 may be registered for each of the images, or may be commonly stored irrespective of the image.

Next, described below is an image quality adjust process in response to a read instruction from the image quality adjust setpoint read operation unit in the individual mode.

At step S22i, it is decided if a read instruction is input from the image quality adjust setpoint read operation unit (e.g., preset switch) of the input unit 26 (selection unit 28). The routine proceeds to step S22j if the read instruction is input and proceeds to step S22s if no read instruction is input. That is, the routine proceeds to step S22j if the user at step S22i has executed the image quality adjust setpoint read operation by using the image quality adjust setpoint read operation unit provided in the input unit 26 (selection unit 28). In other cases, the routine proceeds to step S22s.

At step S22j, the image quality adjust setpoint is read out from the region of the preset holding unit (preset RAM 66) corresponding to the image quality adjust setpoint read operation unit that is operated, the image quality adjust setpoint in the image quality adjusting state storage unit 63 (e.g., first image RAM 64) corresponding to the image (e.g., first image) that is to be adjusted for its quality is rewritten by the image quality adjust setpoint that is read out, and an image quality adjust instruction corresponding to the image quality adjust setpoint that is written is output to the image quality-adjusting circuit (e.g., first image quality-adjusting circuit 61) corresponding to the image quality adjust setpoint that is written. Thus, the image quality adjust setpoint for the image that is to be adjusted for its quality is rewritten into a predetermined image quality adjust setpoint stored in a region of the preset RAM 66.

In this process, if the image quality adjust setpoint read operation unit (e.g., preset switch) is operated in the multi-view display device shown in FIG. 19 above, the image quality adjust setpoint is read out from a region of the preset RAM 66 corresponding to the image quality adjust setpoint read operation unit (e.g., preset switch) that is operated to thereby set the image quality adjust setpoint for the image (first image or second image) that is to be adjusted for its quality. In this constitution as described above, the qualities of the images can be easily adjusted relying on the image quality adjust setpoints held in advance in the preset RAM 66 (preset by the manufacturer or preset by the user). When a plurality of image quality adjust setpoints have been stored responsive to the image quality adjust setpoint read operation unit as described above, the image quality adjust setpoints that have been stored may be cyclically read out for every operation of the image quality adjust setpoint read operation unit.

Next, described below with reference to FIG. 23 is an image quality adjust process in response to an adjust instruction from the image quality adjust operation unit in the common mode.

At step S22k in FIG. 23, it is decided if an image quality adjust instruction is input from the input unit 26 (operation unit 27). The routine proceeds to step S22l if the image quality adjust instruction is input and proceeds to step S22m if no image quality adjust instruction is input. That is, the routine proceeds to step S22l if the user at step S22k has executed the image adjust operation by using the image quality adjust operation unit in the input unit 26 (operation unit 27). In other cases, the routine proceeds to step S22m.

At step S22l, the image quality adjust setpoint is adjusted in response to an image quality adjust instruction from the input unit 26 (operation unit 27). The image adjust setpoint held in the image quality adjusting state storage unit 63 (first image RAM 64 and second image RAM 65) is rewritten by the image quality adjust setpoint that has been adjusted. Further, the image quality adjust instruction corresponding to the image quality adjust setpoint that has been adjusted is output to the image quality-adjusting circuit (first image quality-adjusting circuit 61 and second image quality-adjusting circuit 62), and the routine proceeds to step S22s in FIG. 22. That is, at step S22l, when the first image is an image that is to be adjusted for its quality, the image quality adjust setpoints stored in the first image RAM 64 and in the second image RAM 65 are rewritten in response to an image adjust instruction (image quality adjust operation by the user) from the image quality adjust operation unit in the input unit 26 (operation unit 27). Image quality adjust instructions corresponding to the image quality adjust setpoints written in the first image RAM 64 and in the second image RAM 65 are transmitted to the first image quality-adjusting circuit 61 and to the second image quality-adjusting circuit 62 to thereby change the qualities of the first image and the second image, and the routine proceeds to step S22s. The image quality adjustment at step S22l may be such that the first image and the second image assume the same quality (first image RAM 64 and second image RAM 65 have the same values) or the image quality adjust setpoints for the images may be adjusted by the same value in the same direction (in the plus direction or in the minus direction).

Next, described below is an image quality adjust process in response to a copy instruction from the image quality copy operation unit in the common mode.

At step S22m, it is decided if an image quality adjust setpoint copy instruction is input from the input unit 26 (selection unit 28). The routine proceeds to step S22n if the image quality adjust setpoint copy instruction is input and proceeds to step S22o if no image quality adjust setpoint copy instruction is input. That is, the routine proceeds to step S22n if the user at step S22m has executed the image quality copy operation by using the image quality copy operation unit of the input unit 26 (selection unit 28). In other cases, the routine proceeds to step S22o.

At step S22n, the image quality adjust setpoint of an image (e.g., first image) is read out from the image quality adjusting state storage unit 63 (e.g., first image RAM 64) corresponding to an image (e.g., first image), and the image quality adjust setpoint of the other image (e.g., second image) is read out from the image quality adjusting state storage unit 63 (e.g., second image RAM 65) corresponding to the other image (e.g., second image). The image quality adjust setpoint held in the image quality adjusting state storage unit 63 (e.g., second image RAM 65) corresponding to the other image (e.g., second image), is rewritten by the image quality adjust setpoint of the image (e.g., first image) that is read out. An image quality adjusting instruction corresponding to the image quality adjust setpoint that is rewritten is output to the image quality-adjusting circuit, and the routine proceeds to step S22s in FIG. 22. Thus, the quality of the one image (e.g., first image) is changed into the quality of the other image (e.g., second image), and the quality of the other image (e.g., second image) is changed into the quality of the one image (e.g., first image). At step S22m, the image quality adjust setpoints for the images are once read out from the image quality adjusting state storage unit 63 (first image RAM 64 and second image RAM 65), and the image quality adjust setpoints in the image quality adjusting state storage unit 63 (first image RAM 64 and the second image RAM 65) are rewritten. However, the definition of the image quality adjusting state storage unit may be changed (the first image RAM 64 may be changed over to the second image RAM 65, and the second image RAM 65 may be changed over to the first image RAM 64).

In this process, if the user operates the image quality exchange operation unit provided on the multi-view display device shown in FIG. 19 above to issue an instruction for exchanging the image quality adjust setpoint, the state of adjusting the quality of the first image (image quality adjust setpoint) is changed into the state of adjusting the quality of the second image (image quality adjust setpoint), and the state of adjusting the quality of the second image (image quality adjust setpoint) is changed into the state of adjusting the quality of the first image (image quality adjust setpoint). Namely, the value of the first image RAM 64 and the value of the second image RAM 65 are exchanged with each other. Due to this process, the desired image qualities can be continuously used when the driver and a passenger on the assistant driver's seat change their seats, for example, after having driven the vehicle for extended periods of time.

Next, described below is a preset process in response to a registration instruction from the image quality adjust setpoint registration operation unit in the common mode.

At step S22o, it is decided if an image quality adjust setpoint registration instruction is input from the input unit 26 (selection unit 28). The routine proceeds to step S22p if the image quality adjust setpoint registration instruction is input and proceeds to step S22q if no image quality adjust setpoint registration instruction is input. That is, the routine proceeds to step S22p if the user at step S22o has executed the image quality adjust setpoint registration operation by using the image quality adjust setpoint registration operation unit (e.g., preset switch) provided in the input unit 26 (selection unit 28). If the image quality adjust setpoint registration operation is not executed, the routine proceeds to step S22q. The operation for registering the image quality adjust setpoint can be suitably changed into the one by operating the preset switch as described above or into the one by operating the preset switch plus operating the registration switch.

At step S22p, the image quality adjust setpoint is read out from the image quality adjusting state storage unit 63 (first image RAM 64 and second image RAM 65), and is written into a region of the preset RAM 66 corresponding to the image quality adjust setpoint registration operation portion that is operated. The routine proceeds to step S22s of FIG. 22.

That is, in response to the registration instruction (registration operation by the user) from the input unit 26 (selection unit 28), the image quality adjust setpoint stored in the first image RAM 64 and the image quality adjust setpoint stored in the second image RAM 65 are written into the preset RAM 66 corresponding to the image quality adjust setpoint registration operation unit that is operated. Here, the image quality adjust setpoint written in the region of the preset RAM 66 corresponding to the image quality-adjust setpoint registration operation unit may be in a number of one or in a plural number. Further, the image quality adjust setpoint written into the region of the preset RAM 66 may be registered for each of the images, or may be commonly stored irrespective of the image.

Next, described below is an image quality adjust process in response to a read instruction from the image quality adjust setpoint read operation unit in the common mode.

At step S22q, it is decided if a read instruction is input from the image quality adjust setpoint read operation unit (e.g., preset switch) of the input unit 26 (selection unit 28). The routine proceeds to step S22r if the read instruction is input and proceeds to step S22s if no read instruction is input. That is, the routine proceeds to step S22r if the user at step S22q has executed the image quality adjust setpoint read operation by using the image quality adjust setpoint read operation unit provided in the input unit 26 (selection unit 28). If the image quality adjust setpoint read operation is not executed, the routine proceeds to step S22s.

At step S22r, the image quality adjust setpoint is read out from the region of the preset holding unit (preset RAM 66) corresponding to the image quality adjust setpoint read operation unit that is operated, the image quality adjust setpoints in the image quality adjusting state storage unit 63 (e.g., first image RAM 64 and second image RAM 65) corresponding to the first image and the second image are rewritten by the image quality adjust setpoint that is read out, and an image quality adjust instructions corresponding to the image quality adjust setpoints that are written are output to the first image quality-adjusting circuit 61 and the second image quality-adjusting circuit 62. Thus, the image quality adjust setpoints corresponding to the first image and the second image are rewritten into a predetermined image quality adjust setpoints stored in a region of the preset RAM 66.

In this process, if the image quality adjust setpoint read operation unit (e.g., preset switch) is operated in the multi-view display device shown in FIG. 19 above, the image quality adjust setpoint is read out from a region of the preset RAM 66 corresponding to the image quality adjust setpoint read operation unit (e.g., preset switch) that is operated to thereby set the image quality adjust setpoint for the first image or the second image. In this constitution as described above, the qualities of the images can be easily adjusted relying upon the image quality adjust setpoints that have been held in advance in the preset RAM 66 (preset by the manufacturer or preset by the user). When a plurality of image quality adjust setpoints have been stored responsive to the image quality adjust setpoint read operation unit as described above, the image quality adjust setpoints that have been stored may be cyclically read out for every operation of the image quality adjust setpoint read operation unit. As described above, further, different image quality adjust setpoints are read out for the images when different image quality adjust setpoints are held in the image quality adjust setpoint read operation unit for each of the images.

At step S22*s*, it is detected if an image quality adjust completion instruction is input from the input unit 26 (operation unit 27). The process ends if the completion instruction is input and returns back to step S22*b* if the completion instruction is not input. That is, at step S22*s*, the process ends if the user has executed the image quality adjust completion operation by using the image quality adjust completion operation unit provided in the input unit 26 (operation unit 27). If the image quality adjust completion operation is not executed (image quality adjust setpoint is not favorable), the routine returns back to step S22*b* to repeat the above process. The method of detecting the image quality adjust completion instruction may be the one which decides that the image quality adjustment is completed when a predetermined period of time has passed after the final operation of the input unit 26 instead of the method which detects the input of the image quality adjust completion instruction from the image quality adjust completion operation unit provided in the input unit 26 (operation unit 27).

As described above, since the individual mode or the common mode can be selected, it is made possible to adjust the image quality over the whole display region (adjust to accomplish the same image quality or in the same direction) in an integrated manner or to individually adjust the image qualities for each of the images depending upon the conditions.

The above copy process may be executed in the common mode, and the exchange process may be executed in the individual mode.

Next, described below is the above-mentioned images that are to be adjusted for their qualities. FIGS. 24 to 27 are diagrams (parts 1 to 4) illustrating displays of images which are to be adjusted for their qualities.

If described in further detail, portion (a) of FIG. 24 is a diagram illustrating a display of an image for adjusting the image quality over the whole region of the display unit 10*a* where the image to be adjusted for its quality is displayed, and portion (b) of FIG. 24 is a diagram illustrating a display of an image for adjusting the image quality and an image to be adjusted for its quality simultaneously on the region of the display unit 10*a* where the image to be adjusted for its quality is displayed. Portion (a) of FIG. 25 is a diagram illustrating a particular image, and portion (b) of FIG. 25 is a diagram illustrating another particular image.

Figure 27:
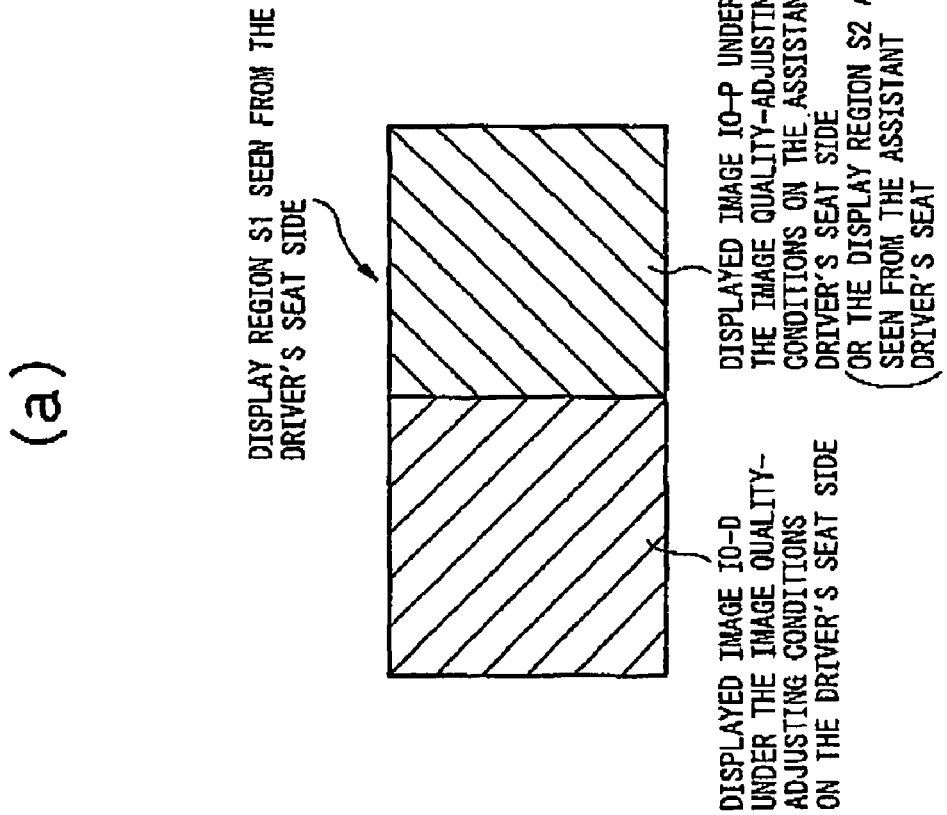
FIG. 27 is a diagram (part 4) illustrating a display of an image for adjustment.

Portion (a) of FIG. 26 is a diagram concretely illustrating a display of an image to be adjusted for its quality and a particular image on the region of the display unit 10*a* where the image to be adjusted for its quality is displayed, and portion (b) of FIG. 26 is a diagram concretely illustrating a display of an image to be adjusted for its quality and an image of before being adjusted for its quality as an image for adjusting the image quality on the region of the display unit 10*a* where the image to be adjusted for its quality is displayed. Portion (a) of FIG. 27 is a diagram illustrating a display of an image to be adjusted for its quality and an image in a state of being adjusted for is quality, other than the image to be adjusted for its quality, as an image for adjusting the image quality on the region of the display unit 10*a* where the image to be adjusted for its quality is displayed, and portion (a) of FIG. 27 is a diagram illustrating a display of an image adjusted for its quality by using the preset values as an image for adjusting the image quality on the region of the display unit 10*a* where the image to be adjusted for its quality is displayed.

Referring to portion (a) of FIG. 24, the image for adjusting the image quality that roughly serves as a reference for adjusting the image quality is displayed on the whole display region of the display unit 10*a* on which the image to be adjusted for its quality (e.g., first image) YP is displayed. As the image for adjusting the image quality, for example, there is used a particular image SP like a band image after the end of the broadcast as shown in portion (a) of FIG. 25 or a particular image including figures of single colors of three primary colors like the one shown in portion (b) of FIG. 25, so that the image can be divided into color components of three primary colors, i.e., red component (R), green component (G) and blue component (B) enabling the image quality to be corrected concerning the color components. The particular image is not limited to the ones displayed here but may be suitably varied (e.g., a pattern designated at 47 in FIG. 17).

In displaying a particular image as shown in portion (a) of FIG. 25, when it is attempted to adjust the quality of the image which is to be adjusted for its quality relying upon the quality adjustment described above, it is allowed to easily adjust the quality of the image which is to be adjusted for its quality by making reference to the particular image. Further, when the particular image shown in portion (b) of FIG. 25 is displayed, it is made possible to highly precisely adjust the color components of three primary colors on the image relying upon the image adjustment described above.

The image quality at the start of displaying the particular image can be suitably varied into a default value, into an image quality of the image that is to be adjusted for its quality, into an image quality of an image other than the image that is to be adjusted for its quality, or into an image quality of the above preset value.

In portion (b) of FIG. 25, in particular, squares by the side of the red component (R), green component (G) and blue component (B) are diagrams that represent image quality adjust setpoints, and squares on the right side of triangles are corresponding to the images for adjusting the image quality drawn in three primary colors.

Referring to portion (b) of FIG. 24, further, the image to be adjusted for its quality and the image for adjusting the quality are simultaneously displayed on the region of the display unit 10*a* where the image to be adjusted for its quality is displayed. The method of simultaneously displaying these two kinds of images may be the one that displays the image for adjusting the image quality on a portion of the image that is to be adjusted for its quality as shown in portion (a) of FIG. 26. Alternatively, the method may be the one for displaying particular images shown in portion (a) of FIG. 25 and portion (b) of FIG. 25 as the images for adjusting the image quality, or the image quality may be suitably varied like the image other than the image to be adjusted for its quality or the image having the same content as the image to be adjusted for its quality. This constitution makes it easy to adjust the quality of the image which is to be adjusted for its quality by making a reference to the image for adjusting the quality relying upon the image quality process described above.

Portion (a) of FIG. 26 concretely illustrates a display of an image for adjusting the image quality on a portion of the image which is to be adjusted for its quality, i.e., displays the particular image on a portion of the image for navigation. In this constitution, it is made possible to easily adjust the quality of the image which is to be adjusted for its quality by making a reference to the particular image based on the image quality process described above.

It is further allowable to adjust the quality of the particular image by making a reference to the image to be adjusted for its quality so that the adjusted image quality is reflected on the image to be adjusted for its quality after the image quality adjust process (operation) has been finished, or the image to be adjusted for its quality may be displayed on a potion of the particular image. The image quality at the start of displaying the particular image can be suitably varied into a default value, into an image quality of the image that is to be adjusted for its quality, into an image quality of an image other than the image that is to be adjusted for its quality, or into an image quality of the above preset value. As the image for adjusting the image quality, further, there may be displayed an image other than the image to be adjusted for its quality or an image having the same content as the image to be adjusted for its quality instead of displaying the particular image.

As shown in portion (b) of FIG. 26, further, there may be simultaneously displayed an image to be adjusted for its quality and an image in the state of being adjusted for its quality at the start of adjusting the image quality as the image for adjusting the image quality, on the region of the display unit 10*a* where the image to be adjusted for its quality is displayed. Desirably, the image to be adjusted for its quality has the same content as the image for adjusting the image quality. As the image for adjusting the image quality, however, there may be displayed an image (having a quality of the image to be adjusted for its quality at the start of adjusting the quality) other than the image to be adjusted for its quality. This constitution makes it easy to adjust the quality of the image to be adjusted for its quality in comparison with the image quality at the start of adjusting the image quality. The image to be adjusted for its quality may be displayed on a portion of the image for adjusting the image quality as described above. In this example, a half of the region S1 for displaying the image to be adjusted for its quality is set in a state of adjusting the quality of the image to be adjusted for its quality, and the image quality varies depending upon the adjusting operation. The other half of the display region S1 is set to the state of adjusting the image quality of the image other than the image to be adjusted for its quality. This setting can be realized relying on the process for writing the image data into the image quality-adjusting circuit corresponding to the image to be adjusted for its quality and by setting the image quality adjust setpoint to be a corresponding value. Desirably, the display image IO-D displayed on half of the display region S1 has the same content as the display image IO-P displayed on the other half of the display region, and an image (having an image quality other than that of the image to be adjusted for its quality) other than the image to be adjusted for its quality may be displayed as the image for adjusting the image quality. This constitution makes it easy to adjust the image quality of the image to be adjusted for its quality by making a reference to the image quality of the image other than the image to be adjusted for its quality, which can be used as a reference for effecting the copying operation.

When the image for adjusting the image quality is adjusted for its quality by selecting either the image quality of the image to be adjusted for its quality or the image quality of the image for adjusting the image quality, the image quality may be reflected on the image quality of the image to be adjusted for its quality after the image quality has been adjusted.

Referring to portion (b) of FIG. 27, the region of the display unit 10*a* for displaying the image to be adjusted for its quality is divided (divided, for example, into four image quality-adjusting regions PR-1, PR-2, PR-3 and PR-4 as shown in portion (b) of FIG. 27), and a plurality of images for adjusting the image quality adjusted relying upon the preset values are displayed on these regions. This can also be realized by writing image data into the image quality-adjusting circuit corresponding to the image to be adjusted for its quality and by adjusting the image quality adjust setpoint.

Here, the plurality of images for adjusting the image quality have the same content (content of the image to be adjusted for its quality) or may have different contents.

According to this example, the images for adjusting the image quality adjusted by using a plurality of preset values are displayed, and the image quality-adjusting states can be compared and can be referred to in selecting the image quality.

The number of division is not limited to four. Further, an image adjusted with the image quality of the image to be adjusted for its quality may be displayed on one divided region. Further, the image for adjusting the image quality may be the above-mentioned particular image. Further, the regions may or may not be corresponded to the image quality adjust setpoint registration/read unit. When the images for adjusting the image quality corresponding to all preset values cannot be all displayed on the region of displaying the images for adjusting the image quality, the images may be successively read out in response to the operation instructions by the user or at regular intervals. Further, the preset value that can be displayed may be a preset value corresponding to the image to be adjusted for its quality or a preset value corresponding to the image other than the image to be adjusted for its quality.

Here, as described above, step S22*a* of FIG. 22 can be deleted and, therefore, the image for adjusting the image quality may not be displayed.

On the region of displaying the image other than the image to be adjusted for its quality, further, there may be displayed the above image for adjusting the image quality or an image (e.g., image having the same content (image quality) as the image displayed on the region of displaying the image to be adjusted for its quality, or image other than the image to be adjusted for its quality but is adjusted with the image quality of the image to be adjusted for its quality) which helps confirm the image quality of the image to be adjusted for its quality. According to this constitution, the image quality can be easily adjusted (inclusive of being copied) by making a reference to the other image quality-adjusting state.

FIGS. 28 to 32 are diagrams (parts 1 to 5) illustrating modified examples of the image adjust process by the CPU 7*a* shown in FIGS. 22 and 23.

Figure 28:
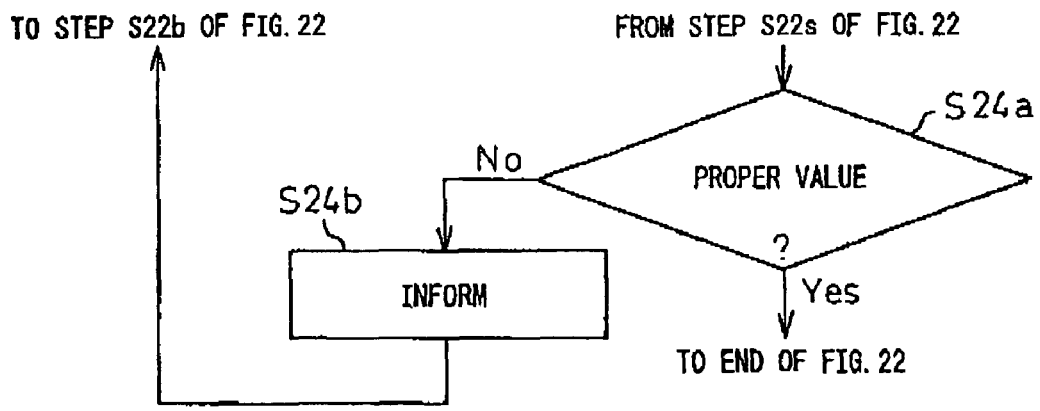
FIG. 28 is a diagram (part 1) illustrating a modified example of the image adjust process by the CPU7a shown in FIGS. 22 and 23.
Figure 29:
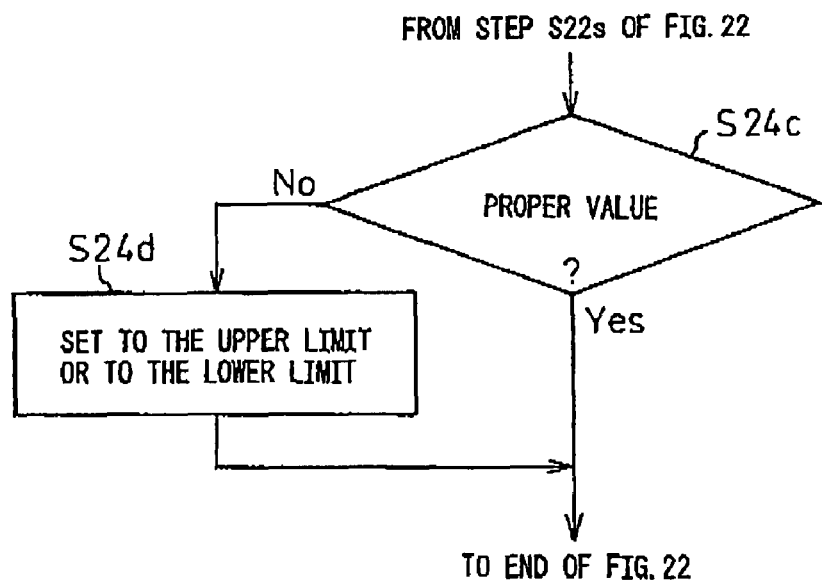
FIG. 29 is a diagram (part 2) illustrating a modified example of the image adjust process by the CPU7a shown in FIGS. 22 and 23.
Figure 30:
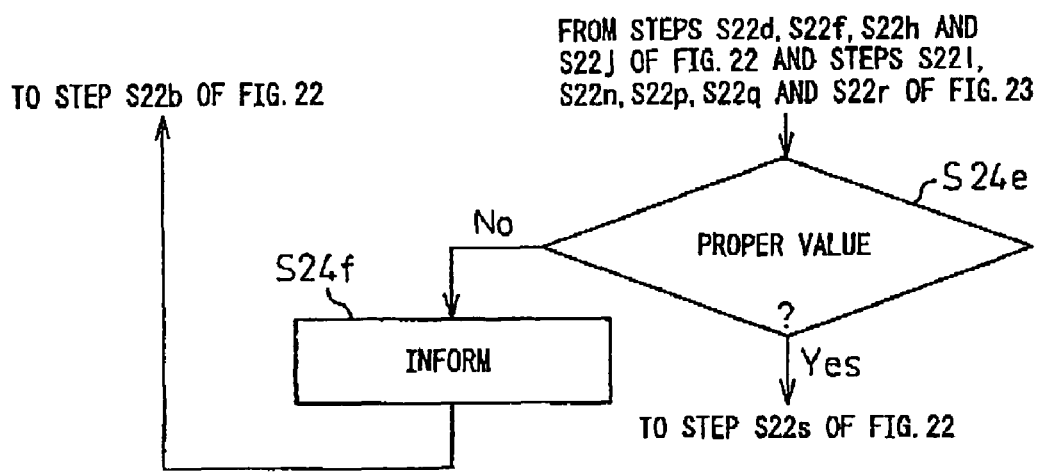
FIG. 30 is a diagram (part 3) illustrating a modified example of the image adjust process by the CPU7a shown in FIGS. 22 and 23.
Figure 31:
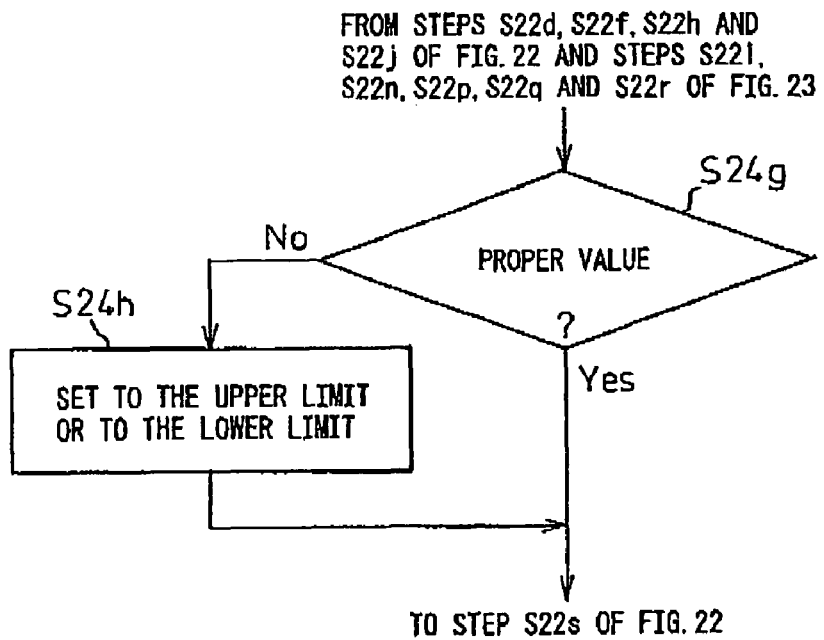
FIG. 31 is a diagram (part 4) illustrating a modified example of the image adjust process by the CPU7a shown in FIGS. 22 and 23.

If described in further detail, FIG. 28 is a flowchart illustrating an image quality process imposing an upper limit and a lower limit on the image quality adjust setpoint. FIG. 29 is a flowchart illustrating a first modified example of FIG. 28, FIG. 30 is a flowchart illustrating a second modified example of FIG. 28, and FIG. 31 is a flowchart illustrating a third modified example of FIG. 28. Portion (a) of FIG. 32 is a flowchart illustrating a process for holding the adjusted image quality adjust setpoint in the image quality set data storage unit 67 and in the adjust-to-meet-the-environment value holding unit 68, and portion (b) of FIG. 32 is a diagram illustrating image quality adjust setpoints held in the image quality set data storage unit 67 and in the adjust-to-meet-the-environment value holding unit 68, which can be suitably added to the image quality adjust processes of FIGS. 22 and 23.

Image quality adjust processes of FIGS. 28 to 32 will now be described. In these processes, adjustable ranges (proper ranges) have been set in advance for the image quality adjust setpoints.

First, described below with reference to FIG. 28 is an image quality adjust process.

At step S24a, it is decided if the image quality adjust setpoint adjusted by the image quality adjust process of FIG. 22 (step S22s) is within a preset adjustable range (proper range). If it is within the proper range, the process ends. If it is outside the proper range, the routine proceeds to step S24b.

At step S24b, an instruction is output to the corresponding constitutions to inform that the adjusted image quality adjust setpoint is outside the proper range, and the routine returns back to step S22b of FIG. 22.

That is, in this process, if the adjusted image quality adjust setpoint is outside the proper range, the adjustment is so conducted that the image quality adjust process will not end and that the image quality adjust setpoint lies within the proper range.

Next, described below with reference to FIG. 29 is another image quality adjust process.

At step S24c, it is decided if the image quality adjust setpoint adjusted by the image quality adjust process of FIG. 22 is within a preset adjustable range (proper range). If it is within the proper range, the process ends. If it is outside the proper range, the routine proceeds to step S24d.

At step S24d, the adjusted image quality adjust setpoint is adjusted to be an upper limit or a lower limit of the adjustable range, is written into the corresponding image quality adjusting state storage unit 63, and an image quality adjust instruction corresponding to the upper limit or the lower limit of the adjustable range is output to the corresponding image quality-adjusting circuit to end the process.

That is, in this process, if the adjusted image quality adjust setpoint is outside the proper range, the adjustment is so conducted that the image quality adjust process will not end and that the image quality is set to be that of the upper limit or the lower limit in the adjustable range.

Next, described below with reference to FIG. 30 is a further image quality adjust process.

At step S24e, it is decided if the image quality adjust setpoint adjusted by the image quality adjust process of FIG. 22 (step S22d, step S22f, step S22h and step S22j) and of FIG. 23 (step S22l, step S22n, step S22p, step S22q and step S22r) is within a preset adjustable range (proper range). If it is within the proper range, the routine proceeds to step S22s. If it is outside the proper range, the routine proceeds to step S24f.

At step S24f, an instruction is output to the corresponding constitutions to inform that the adjusted image quality adjust setpoint is outside the proper range, and the routine returns back to step S22b of FIG. 22.

That is, in this process, if the adjusted image quality adjust setpoint is outside the proper range, the adjustment is so conducted that the image quality adjust process will not end and that the image quality adjust setpoint lies within the proper range.

Next, described below with reference to FIG. 31 is a further image quality adjust process.

At step S24g, it is decided if the image quality adjust setpoint adjusted by the image quality adjust process of FIG. 22 (step S22d, step S22f, step S22h and step S22j) and of FIG. 23 (step S22l, step S22n, step S22p, step S22q and step S22r) is within a preset adjustable range (proper range). If it is within the proper range, the routine proceeds to step S22s. If it is outside the proper range, the routine proceeds to step S24h.

At step S24h, the adjusted image quality adjust setpoint is adjusted to be the upper limit or the lower limit of the adjustable range, and is written into the corresponding image quality-adjusting state storage unit 63. Further, the image quality adjust instruction corresponding to the upper limit or the lower limit of the adjustable range is output to the corresponding image quality-adjusting circuit, and the routine returns back to step S22b of FIG. 22.

That is, in this process, if the adjusted image quality adjust setpoint is outside the proper range, the adjustment is so conducted that the image quality adjust process will not end and that the image quality is set to that of the upper limit or the lower limit in the adjustable range. Here, the adjustable range may be of a fixed value or may be set relying upon the result detected by the surrounding environment sensor.

Next, described below with reference to portion (a) of FIG. 32 and portion (b) of FIG. 32 is a process for storing the image quality adjust setpoint adjusted by the image quality adjust process of FIG. 22 in the image quality set data storage unit 67 and in the adjust-to-meet-the-environment value holding unit 68.

At step S24i of portion (a) of FIG. 32, the image quality adjust setpoint adjusted by the image quality adjust process of FIG. 22 is written into the image quality set data storage unit 67 and into the adjust-to-meet-the-environment value holding unit 68 like a format shown in portion (b) of FIG. 32 to end the process.

Portion (b) of FIG. 32 shows an example of storing the image quality adjust setpoints adjusted by the image quality adjust process of FIG. 22. As for the storing method in this case, the image quality adjust setpoint should be stored in a pair with at least any other item (e.g., environment value, frequency, etc.).

The image quality adjust setpoint stored by this process is used in the image quality adjust process at the start or when a change in the environment is detected that will be described later.

Figure 33:
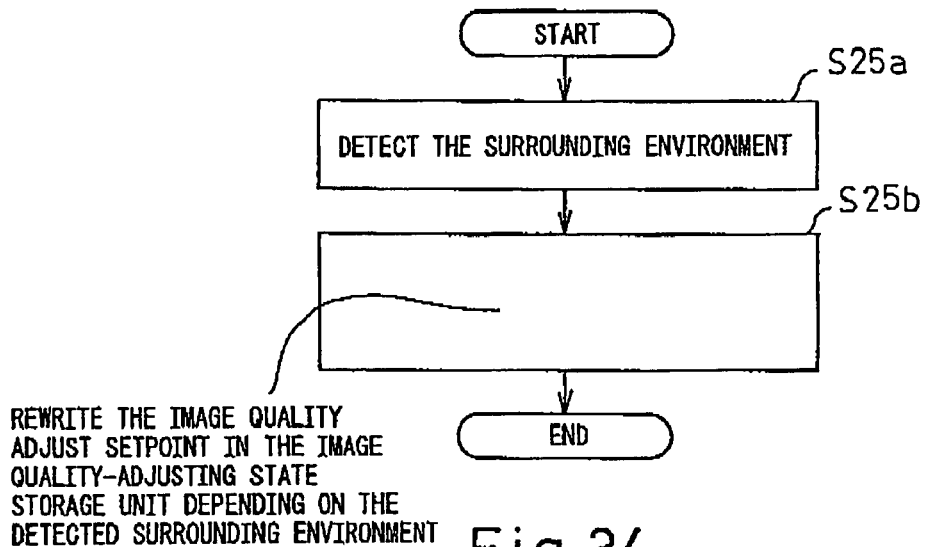
FIG. 33 is a flowchart for illustrating an image adjust process depending upon a change in the environment.

FIG. 33 is a flowchart for illustrating the image quality adjust process by the CPU 7a depending upon a change in the environment. This flowchart is regularly executed when the power source of the multi-view display device is turned on (i.e., when the power source circuit of the multi-view display device is made)(or when the single-view display is changed over to the multi-view display) or when the multi-view display is being made.

At step S25a, first, the surrounding environment is detected by the surrounding environment sensor 17, and the routine proceeds to step S25b. The surrounding environment sensor 17 may be the one for detecting the surrounding environments on the driver's seat side and on the assistant driver's seat side in common as described earlier, or may be provided in a plural number so as to individually detect the surrounding environments on the driver's seat side and on the assistant driver's seat side.

At step S25b, the image quality adjust setpoints in the first image RAM 64 and in the second image RAM 65 are adjusted based on the adjust value stored in the adjust-to-meet-the-environment value holding unit 68 in response to the result detected by the surrounding environment sensor 17, and the image quality adjust instruction corresponding to the adjusted image quality adjust setpoint is output to the image quality-adjusting circuits to end the process. According to this process, the two images (first image and second image) can be adjusted depending upon the result detected by the surrounding environment sensor 17. Therefore, the image qualities can be adjusted automatically and integrally for the surrounding environment that affects the images.

Further, the images may be adjusted by detecting the amount of change in the surrounding environment. Further, the adjust-to-meet-the-environment value holding unit 68 may store, as an adjust value, an image quality adjust setpoint dependent upon the environment or an adjust amount dependent upon the amount of change in the environment. In this case, the adjust value may be a fixed value stored in advance by the manufacturer or may be an image quality adjust setpoint stored by the process described above with reference to portion (a) of FIG. 32 and portion (b) of FIG. 32. Or, the adjust values may be stored for each of the regions.

When the surrounding environment sensor 17 detects the surrounding environments on the driver's seat side and on the assistant driver's seat side in common, the image quality can be adjusted in the same direction or to assume the same image quality in an integrated manner on the whole display region in response to the result detected by the surrounding environment sensor making it possible to automatically and integrally adjust the image qualities for a change in the surrounding environment that affects the images in common. When the surrounding environment sensors 17 are provided in a plural number so as to individually detect the surrounding environments on the driver's seat side and on the assistant driver's seat side, the image qualities are adjusted automatically and suitably depending upon a change in the surrounding environments that differently affect the driver's seat side and the assistant driver's seat side. In this constitution, the image quality can be suitably set depending upon a change in the surrounding environment. Further, even when the surrounding environment has sharply changed, the image qualities of the images can be quickly adjusted to meet a conspicuous change in the surrounding environment such as in a tunnel or in an environment at night.

Figure 34:
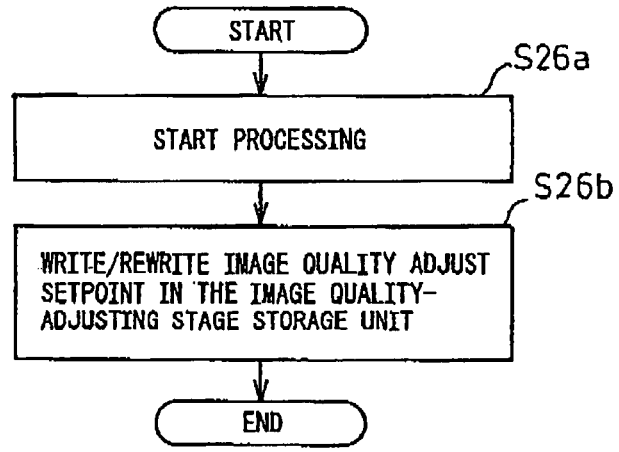
FIG. 34 is a flowchart for illustrating the image adjust process at the start.

FIG. 34 is a flowchart for illustrating the image adjust process by the CPU 7a at the start. This flowchart is executed when the power source of the multi-view display device is turned on (or when the single-view display is changed over to the multi-view display).

First, at step S26a, a process is executed such as initial setting at the start and the routine proceeds to step S26b. At step S26b, a predetermined image quality adjust setpoint that will be described later is written into the image quality adjusting-state storage unit 63 (first image RAM 64 and second image RAM 65), and an image quality adjust instruction corresponding to the image quality adjust setpoint that is written is output to the corresponding image quality-adjusting circuit to end the process. In this process, the images are set to their predetermined image qualities when the power source of the multi-view display device is turned on (or when the single-view display is changed over to the multi-view display), and no operation is required for adjusting the image quality.

Next, described below are the above-mentioned predetermined image quality adjust setpoints. As the predetermined image quality adjust setpoints, there can be exemplified initial image quality adjust setpoints stored by the manufacturer in advance in the image quality set data storage unit 67 (initial image quality adjust setpoint storage unit), image quality adjust setpoints that meet predetermined conditions among the image quality adjust setpoints stored by the user in the image quality set data storage unit 67 (initial image quality adjust setpoint storage unit) as described with reference to portion (a) of FIG. 32 and portion (b) of FIG. 32 as mentioned above, image quality adjust setpoint (also called last memory) of when the power source of the multi-view display device is turned on (or when the single-view display has changed over to the multi-view display), and image quality adjust setpoints that meet predetermined conditions among the image quality adjust setpoints stored in the image quality set data storage unit 67 (initial image quality adjust setpoint storage unit) when the power source of the multi-view display device is turned off (i.e., when the power source of the multi-view display device is broken) as will be described later (or when the multi-view display has changed over to the single-view display).

When the above predetermined image quality adjust setpoints are the initial image quality adjust setpoints stored by the manufacturer in advance in the image quality set data storage unit 67 (initial image quality adjust setpoint storage unit), the first and second images are adjusted for their image qualities by using the initial image quality adjust setpoints stored in advance in the image quality set data storage unit 67 (initial image quality adjust setpoint storage unit). Therefore, the initial image quality-adjusting states are automatically selected for the images, and no operation is required for adjusting the image quality.

When the above predetermined image quality adjust setpoints are the image quality adjust setpoints of when the power source of the multi-view display device is turned on (or when the single-view display is changed over to the multi-view display), on the other hand, the image quality adjust setpoints in the image quality-adjusting state storage unit 63 (first image RAM 64 and second image RAM 65) of when the power source of the multi-view display device is turned on (or when the single-view display is changed over to the multi-view display) may be once stored in the image quality set data storage unit 67 (initial image quality adjust setpoint storage unit) and the image quality adjust setpoints that had been stored at the start may be read out and written into the first image RAM 64 and the second image RAM 65, or the image quality adjust setpoints that were set to the first image RAM 64 and the second image RAM 65 when the power source of the multi-view display device was turned off (or when the multi-view display was changed over to the single-view display) may be maintained so will not to be erased (in this case, the above write process is not required). According to this constitution, the image quality adjust setpoints are set to those of the image qualities that had been used just before the power source of the multi-view display device was turned off (or just before the multi-view display was changed over to the single-view display). Therefore, the image quality-adjusting state that is highly probable to be continuously used is selected, and no operation is required for adjusting the image quality.

Further, when the above predetermined image quality adjust setpoints are the image quality adjust setpoints that meet predetermined conditions among the image quality adjust setpoints stored by the user in the image quality set data storage unit 67 (initial image quality adjust setpoint storage unit) or are the image quality adjust setpoints that meet predetermined conditions among the image quality adjust setpoints stored in the image quality set data storage unit 67 (initial image quality adjust setpoint storage unit) when the power source of the multi-view display device was turned off (or when the multi-view display was changed over to the single-view display), the image quality adjust setpoints that are highly probable to use at least one of the surrounding environment, frequency or last source, are set when the power source of the multi-view display device is turned on (or when the single-view display is changed over to the multi-view display), making it possible to select an image quality-adjusting state that is highly probable to be used.

Figure 35:
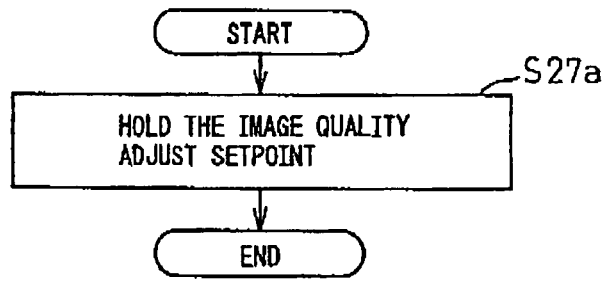
FIG. 35 is a flowchart for illustrating a process for storing the image adjust setpoint.

FIG. 35 is a flowchart for illustrating a process for storing the image adjust setpoints of when the power source of the multi-view display device is turned off (when the ignition is turned off)(or when the multi-view display is changed over to the single-view display).

This flowchart is executed when the CPU 7a has detected an instruction (ignition off instruction) for turning off the power source of the multi-view display device from the input unit 26 (or has detected an instruction for changing the multi-view display over to the single-view display). That is, the above process is executed when the user has turned off the power source of the display device, has turned off the ignition, or has changed the multi-view display over to the single-view display. This flowchart is different from that of portion (a) of FIG. 32 and portion (b) of FIG. 32 only with respect to the timing for executing the process.

At step S27a, the image quality adjust setpoints of when the power source of the display device is turned off (when the ignition is turned off) (or when the multi-view display is changed over to the single-view display) are stored in the image quality set data storage unit 67 and in the adjust-to-meet-the-environment value holding unit 68 to end the process. As for the method of storing the image quality adjust setpoints, the image quality adjust setpoints are stored in a form shown in portion (b) of FIG. 32 as mentioned above. Like the case of portion (b) of FIG. 32, the image quality adjust setpoint may be stored in a pair with at least any other item. According to this constitution, the image quality adjust setpoints adjusted (satisfied) by the user depending upon the surrounding environment are stored. By applying the stored image quality adjust setpoints to the processes of FIGS. 33 and 34 above, therefore, the image qualities can be adjusted more suitably from the next time.

It does not need to be pointed out that the above processes of FIGS. 22 to 35 may be used in a suitable combination.

The above image display process and the image quality adjust process can be executed by reading the programs stored in the program storage unit 69 by using the CPU 7a in the multi-view display device of FIG. 19 or by using the programs stored in the ROM or RAM incorporated in the CPU 7a.

More concretely, the program stored in the ROM or the RAM incorporated in the program storage unit 69 or in the CPU 7a of FIG. 19 includes a first image quality adjust process for adjusting the quality of the first image and a second image quality adjust process for adjusting the quality of the second image in the display device which is capable of simultaneously displaying the image (first image) displayed on the first display region which can be observed from the first direction and the image (second image) displayed on the second display region which can be observed from the second direction.

Desirably, the program stored in the ROM or RAM incorporated in the program storage unit 69 or in the CPU 7a in FIG. 19 includes a process for rewriting the adjust value in the first image quality adjust value storage unit that stores the value for adjusting the quality of the first image responsive to the image quality adjust operation for the image (first image) displayed on the first display region in the display device, a process for rewriting the adjust value in the second image quality adjust value storage unit that stores the value for adjusting the quality of the second image responsive to the image quality adjust operation for the image (second image) displayed on the second display region, a process for adjusting the quality of the first image based on the adjust value in the first image quality adjust value storage unit, and a process for adjusting the quality of the second image based on the adjust value in the second image quality adjust value storage unit.

The above embodiment of FIG. 19 has dealt with the case of using the optical separator element having a plurality of light-transmitting slits of a one-layer constitution or a two-layer constitution for realizing a multi-view display. Not being limited to this example, however, it is also allowable to use a slit-forming portion having a liquid crystal layer like a liquid crystal display panel and forming a plurality of vertical slits depending upon the intensity of the electric field applied to the liquid crystal layer (see, for example, FIGS. 36 and 37 described later) instead of using the optical separator element. Here, in the case of the multi-view display, a plurality of vertical slits may be expressed. In the case of the single-view display in which the same image can be watched from each of the directions, the plurality of vertical slits may be erased.

Figure 36:
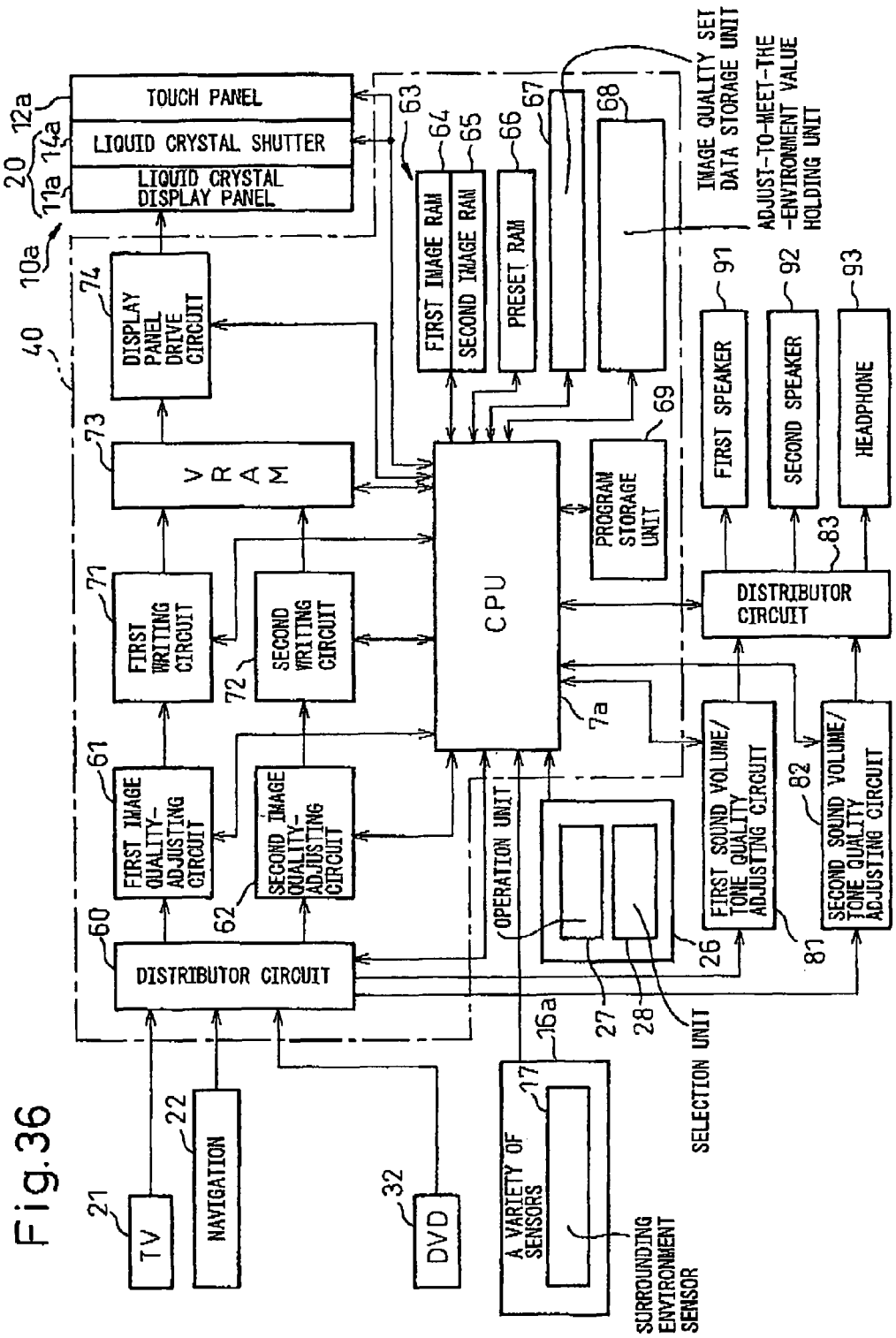
FIG. 36 is a block diagram schematically illustrating the constitution of the multi-view display device according to a fourth embodiment of the present invention.
Figure 37:
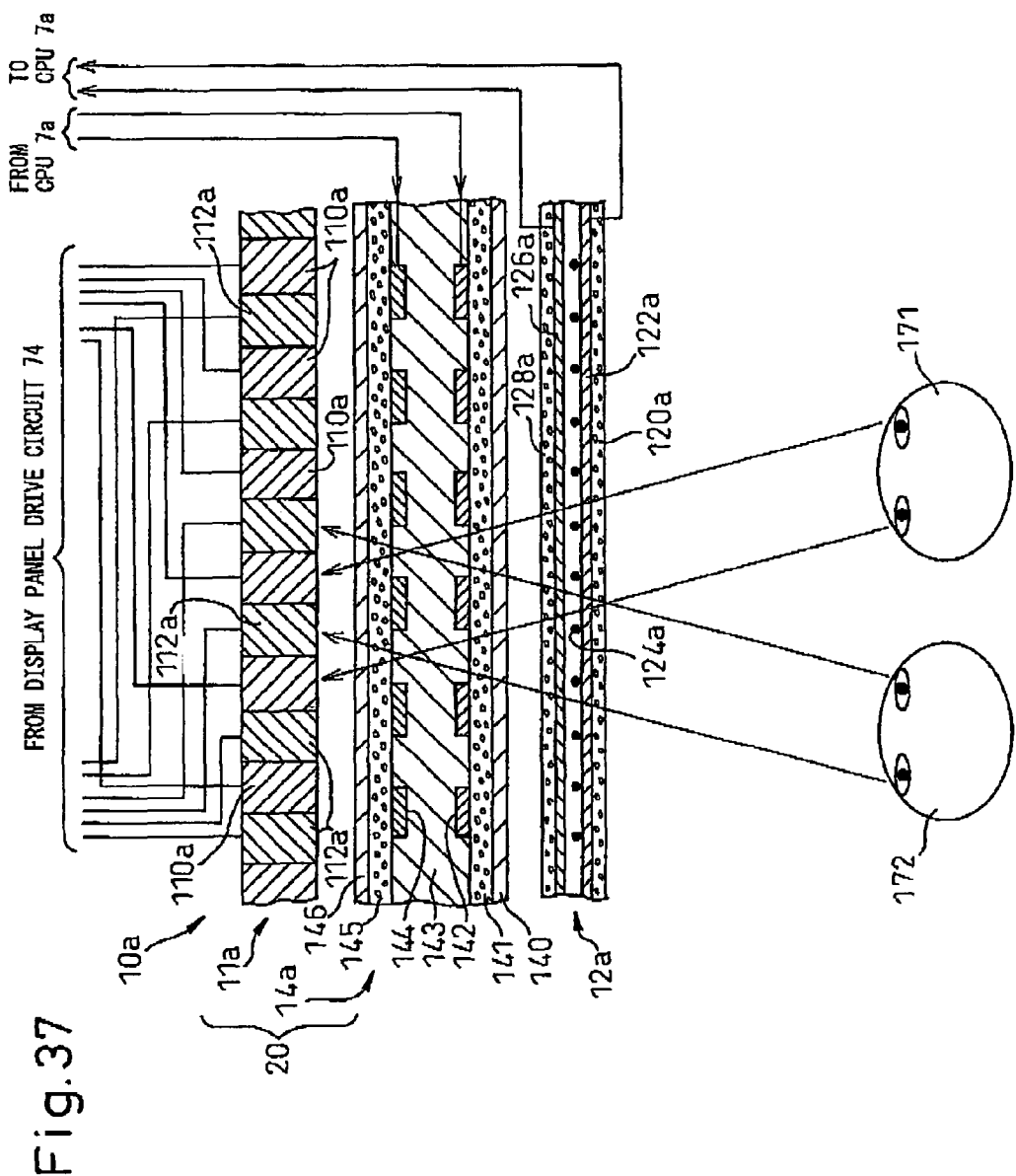
FIG. 37 is a view schematically illustrating the sectional shape of a display unit in FIG. 36.

FIG. 36 is a block diagram schematically illustrating the constitution of the multi-view display device according to a fourth embodiment of the present invention, and FIG. 37 is a view schematically illustrating the sectional shape of a display unit in FIG. 36.

Here, the constitution of a multi-view display device for mounting on a vehicle is schematically illustrated like in the embodiment of FIG. 19 described above to simultaneously display two kinds of individual images on the screen of the same multi-view display panel 11a by writing, into the VRAM 73, two kinds of image data from the image sources which have been individually adjusted for their image qualities.

Like in the third embodiment of FIG. 19 above, the multi-view display device according to the fourth embodiment of FIG. 36 is provided with the display unit 10a for offering a multi-view display for the driver's seat and for the assistant driver's seat of the vehicle. In the display unit 10a of FIG. 36, a liquid crystal shutter 14a is formed to substitute for the optical separator element 13a on the front surface side of the liquid crystal display panel 11a unlike the case of the third embodiment of FIG. 19. Concretely, the display unit 10a of FIG. 36 is of a structure in which the liquid crystal shutter 14a is provided on the front surface side of the liquid crystal display panel 11a to form a multi-view display panel 20 and, besides, a touch panel 12a is formed on the front surface thereof. In other respects, the multi-view display device of FIG. 36 is the same as that of the third embodiment of FIG. 19 described above. Therefore, the constituent elements are not closely described here again except the display unit 10a of FIGS. 36 and 37.

Referring to FIG. 37, the touch panel 12a is constituted by a pair of transparent insulating substrates 120a and 128a having flexibility, transparent electrodes 122a and 126a formed on the above pair of transparent insulating substrates, and dot spacers 124a arranged like a matrix on the transparent electrodes.

Like the multi-view display panel of FIG. 19 above, the liquid crystal display panel 11a of FIG. 37 is constituted by a liquid crystal display panel and is divided into a plurality of belt-like display regions in the longitudinal direction, alternately forming first display regions 110a displaying the first image that can be observed from the driver's seat and second display regions 112a displaying the second image that can be observed from the assistant driver's seat. The multi-view display panel 20 is formed by arranging the liquid crystal shutter 14a on the front surface side of the liquid crystal display panel 11a as described above. The display elements of the liquid crystal display panel 11a are driven and controlled by the display panel drive circuit 74.

The liquid crystal shutter 14a has a function of offering a multi-view display by separating the first image observed from the driver's seat and the second image observed from the assistant driver's seat from each other at a predetermined visual field angle. If described in further detail, the liquid crystal shutter 14a includes two pieces of transparent glass substrates 141 and 145, liquid crystals 143 sealed between these transparent glass substrates 141 and 145, and polarizer plates 140 and 146 arranged on the lower surface side of the transparent glass substrate 141 and on the upper surface side of the transparent glass substrate 145.

Transparent electrodes 142 of an ITO (indium-tin oxide) are formed on the surface of the transparent glass substrate 141 on the side of liquid crystals 143. Further, transparent electrodes 144 of ITO are formed on the transparent glass substrate 145 on the surface facing the transparent electrodes 142 on the side of liquid crystals 143. A major portion of the liquid crystal shutter 14a is constituted by the transparent electrodes 142 and 144 facing each other, and by the liquid crystals 143 between the transparent electrodes 142 and 144.

The transparent electrodes 142 and 144 are connected to the CPU 7a (see FIG. 28) which feeds drive signals to the liquid crystal shutter 14a to drive it. In a state in which no voltage is applied by the drive signals between the one transparent electrode 142 and the other transparent electrode 144 in the thus constituted liquid crystal shutter 14a, the light that has passed through the liquid crystal display panel 11a reaches both the driver's seat and the assistant driver's seat passing through two pieces of polarizing plates arranged, for example, in cross-Nicol.

When a predetermined voltage is applied between the one transparent electrode 142 and the other transparent electrode 144, on the other hand, the liquid crystals 143 vary their directions between the one transparent electrode 142 and the other transparent electrode 144, and light is shielded in the region between the transparent electrodes 142 and 144. As a result, a first passenger (e.g., driver) 171 in the first visual region inclusive of the driver's seat is allowed to watch the image of a set of the first display regions 110a as a first image for the driver's seat due to the action of the liquid crystal shutter 14a, and a second passenger (e.g., assistant driver) 172 in the second visual region inclusive of the assistant driver's seat is allowed to watch the image of a set of second display regions 112a as a second image for the assistant driver's seat due to the action of the liquid crystal shutter 14a. As described above, every other image is actually watched by dividing a single screen into a plurality of display regions in the longitudinal direction. By very decreasing the width of each display region, however, individual images can be simultaneously watched from both the driver's seat side and the assistant driver's seat side.

In the case of this constitution, the first image quality-adjusting circuit 61 and the second image quality-adjusting circuit 62 (see FIG. 36) work to correct the qualities of the first image and the second image (to adjust the qualities of the first image and the second image in the same direction or to adjust the image qualities when the first image and the second image have the same quality) by varying the voltage applied between the one transparent electrode 142 and the other transparent electrode 144 to control the transmission factor of the liquid crystal shutter 14a.

Next, the constitution and operation of the display device inclusive of the device for adjusting the contrast of the invention will be described with reference to the accompanying drawings (FIGS. 38 to 42). The contrast-adjusting device can be taken as a concrete example of the device for adjusting the image quality described with reference to FIG. 12.

Figure 38:
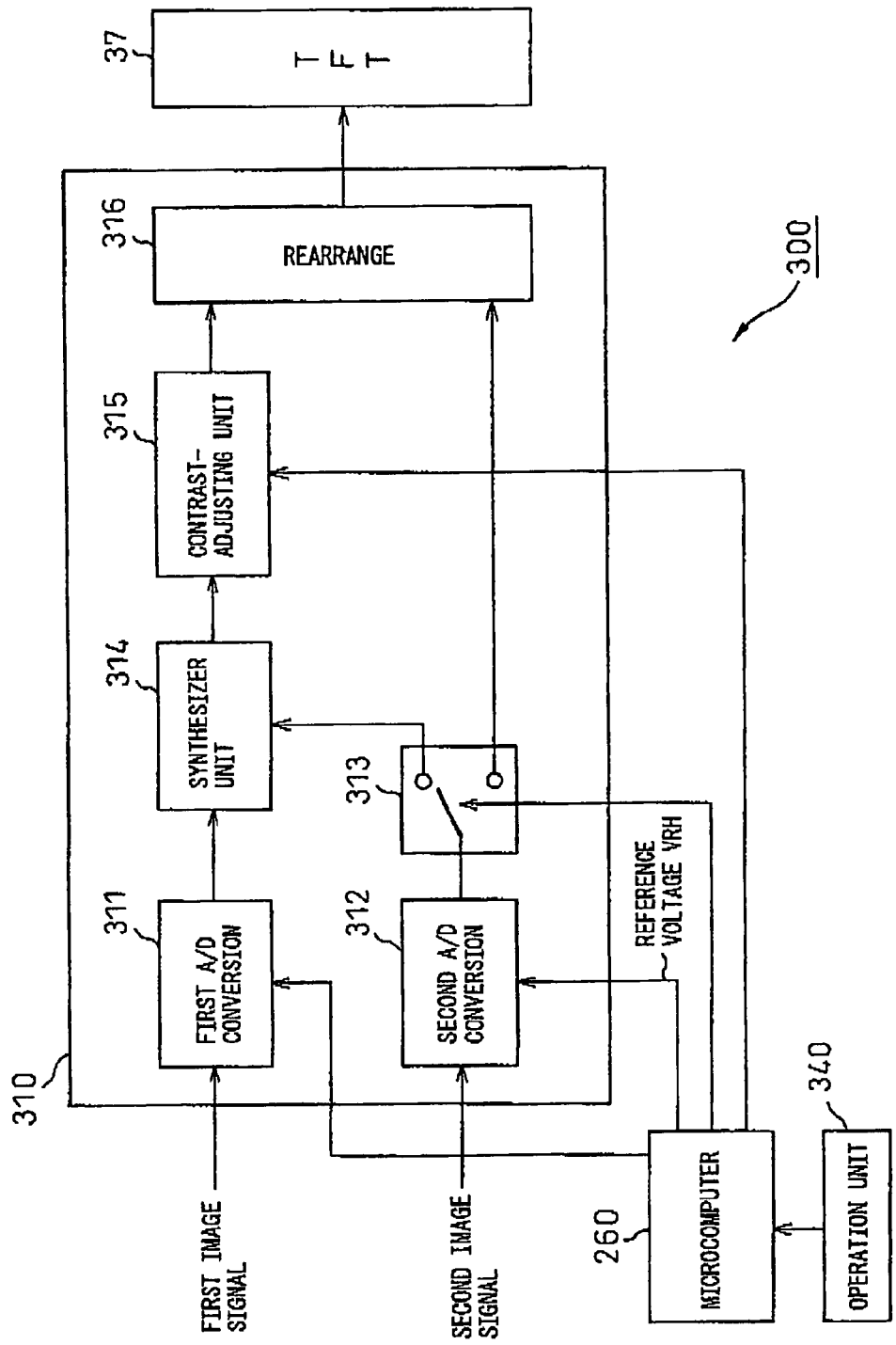
FIG. 38 is a block diagram illustrating the constitution of the display device including a device for adjusting the contrast having an A/D converter unit to which the invention is applied.
Figure 41:
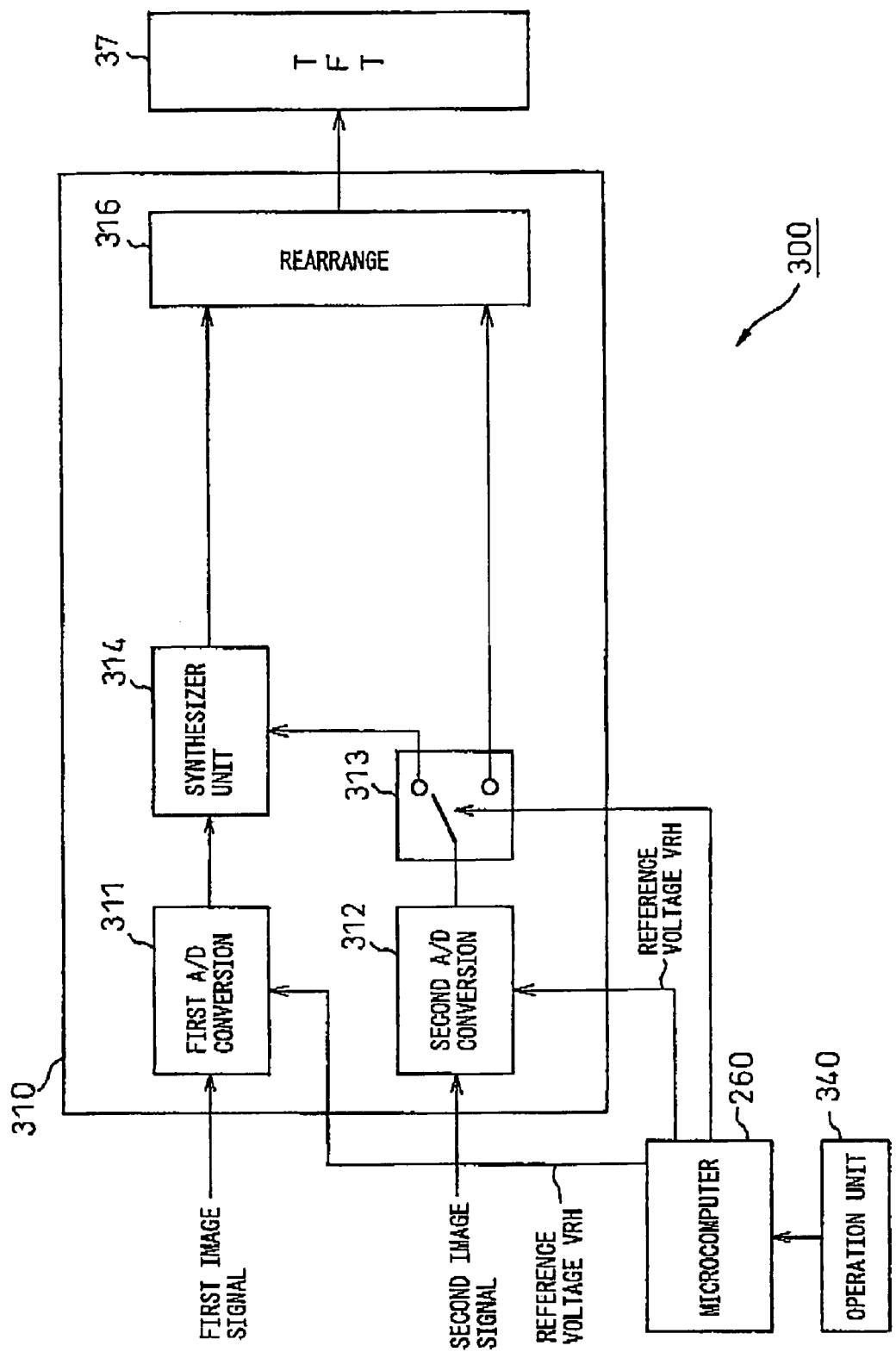
FIG. 41 is a block diagram illustrating a first modified example of the display device of FIG. 38.
Figure 42:
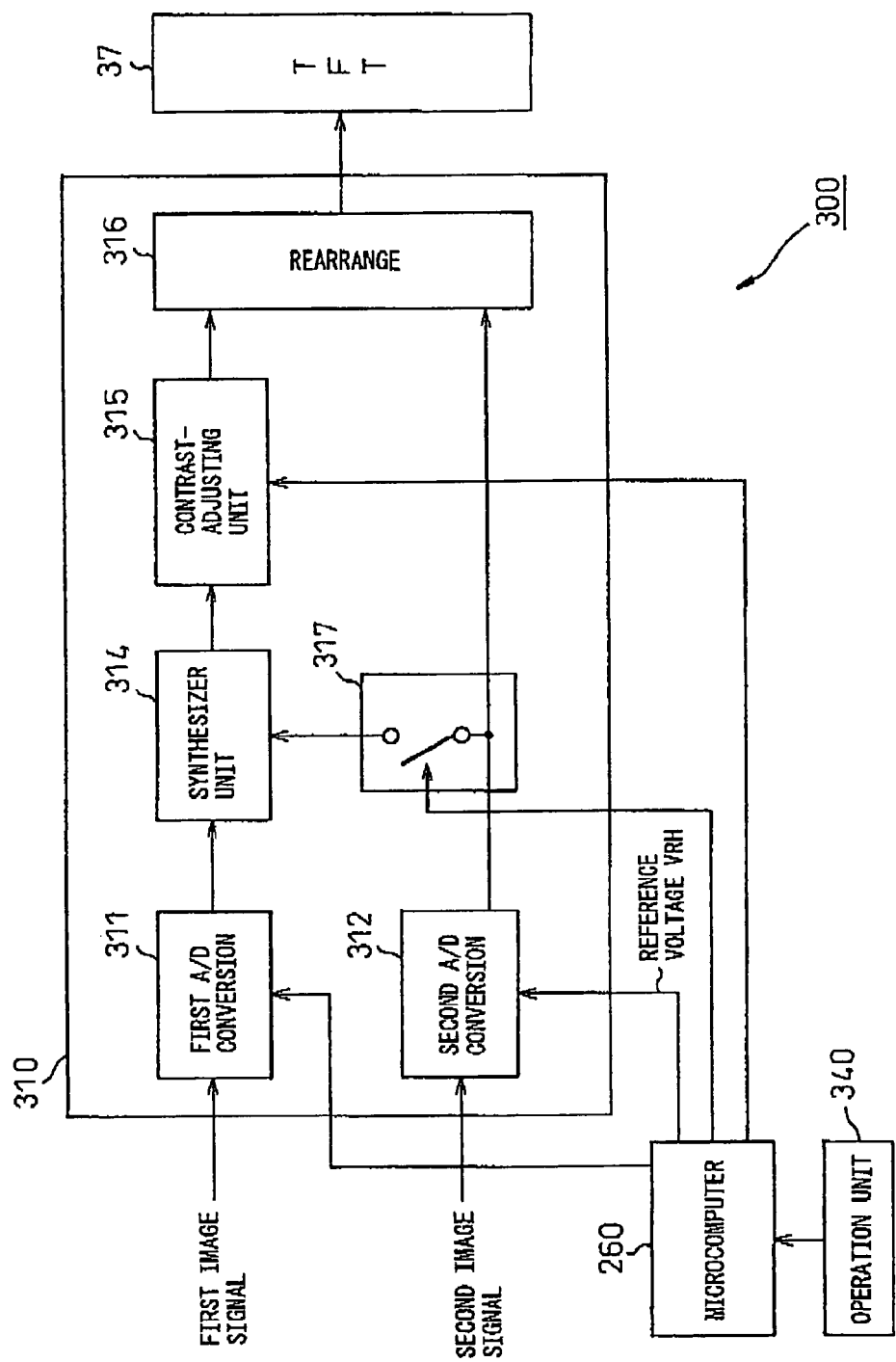
FIG. 42 is a block diagram illustrating a second modified example of the display device of FIG. 38.

FIG. 38 is a block diagram illustrating the constitution of the display device 300 including a device for adjusting the contrast having an A/D converter unit to which the invention is applied. The constituent portions same as those of the display device shown in FIG. 6 are denoted by the same reference numerals. The embodiment of FIG. 38 deals with a case in which the display device 300 is applied to a car navigation device for displaying TV images and maps for navigation.

This embodiment deals with a display device which displays, on the same display, individual images (image for the driver's seat and image for the assistant driver's seat) for the two viewing directions. Not being limited thereto only, however, the embodiment may deal with a display device which displays only one image or a display device which displays, on the same display, individual images for the two or more viewing directions. Further, not being limited to the one for mounting on a vehicle, the embodiment can be applied to any display device such as a TV receiver for domestic use, cell phone, etc.

The display device 300 is constituted by a display ASIC (application specific integrated circuit) 310, a TFT (thin film transistor)-type liquid crystal display (corresponds to the display unit 7 of FIG. 6, hereinafter abbreviated as TFT) 37, a microcomputer 260 (corresponds to the control unit 200 in FIG. 6), and an operation unit 340 (corresponds to the operation unit 215, touch panel 124 or remote control unit 217 in FIG. 6).

The display ASIC 310 is for realizing the so-called multi-view function to simultaneously display, for example, an image for the driver's seat that can be watched from the driver's seat side only and an image for the assistant driver's seat that can be watched from the assistant driver's seat side only.

The display ASIC 310 includes a first A/D converter unit 311 (provided in various sources in FIG. 6 (CD/MD reproduction unit 201, etc.)), a second A/D converter unit 312 (similarly provided in various sources in FIG. 6), a switch 313 (corresponds to the distributor circuit 207 in FIG. 6), synthesizer unit 314, a contrast-adjusting unit 315 (corresponds to the first or second image-adjusting circuit 208 or 209 in FIG. 6), and an arrangement changer-over unit 316 (corresponds to the image output unit 211 in FIG. 6). Here, the display ASIC 310 may be provided as an external unit without being furnished with the rearranging unit 316.

The first A/D converter unit 311 receives a first analog image signal (e.g., analog NTSC image signal), converts it into a first digital image signal (e.g., digital NTSC signal) and outputs it.

The second A/D converter unit 312 receives a second analog image signal (e.g., RGB signal representing a navigation image), converts it into a second digital image signal (e.g., digital RGB signal) and outputs it.

If an operation instruction is issued from the operation unit 340 to display the same image in two viewing directions, an analog image signal corresponding to an image that is instructed to be displayed may be input to either the first A/D converter unit 311 or the second A/D converter unit 312.

The switch 313 is connected to the second A/D converter unit 312 and to the microcomputer 260, and is, further, connected to the synthesizer unit 314 and to the rearranging unit 316 that will be described later. The switch 313 receives a second digital image signal from the second A/D converter unit 312, and outputs it to the synthesizer unit 314 or to the rearranging unit 316. The switching operation is executed based on a control signal from the microcomputer 260 that will be described later.

The synthesizer unit 314 is connected to the first A/D converter unit 311 and to the switch 313, and is, further, connected to the contrast-adjusting unit 315 that will be described later. The synthesizer unit 314 synthesizes the first digital image signal from the first A/D converter unit 311 and the second digital image signal from the switch 313 together, and outputs it to the contrast-adjusting unit 315.

Owing to the above synthesis, a navigation image can be on-screen-displayed on the NTSC image (or the NTSC image can be on-screen-displayed on the navigation image).

When the second digital image signal is not input from the switch 313, the synthesizer unit 314 outputs the first digital image signal of the first A/D converter unit 311 to the contrast-adjusting unit 315.

The contrast-adjusting unit 315 is also connected to the rearranging unit 316 and to the microcomputer 260, executes the operation based on the image signal from the synthesizer unit 314 and on the adjust signal from the microcomputer 260 that will be described later to adjust the contrast (whiteness, blackness, or brightness or darkness) for the image signal from the synthesizer unit 314, and outputs the adjusted image signal to the rearranging unit 316.

The rearranging unit 316 receives the image signal from the contrast-adjusting unit 315 and the image signal from the switch 313, alternately rearranges the pixel values of image signals for every pixel (or for every plurality of pixels) as described above, and outputs them to the TFT 37.

When no image signal is input from the contrast-adjusting unit 315, the rearranging unit 316 may output the image signal from the switch 313 to the TFT 37 without effecting the rearrangement, or may regard the image signals from the switch 313 as the image signals from the contrast-adjusting unit 315 and from the switch 313, and may alternately rearrange them as described above to output them to the TFT 37. It is, further, allowable to use a particular image (e.g., monochromatic image), regard the particular image as the image signal from the contrast-adjusting unit 315, alternately rearrange the particular image and the image signal from the switch 313 as described above, and outputs them to the TFT 37, or arrange the image signals from the switch 313 on the pixels corresponding to the second image signals, and outputs them to the TFT 37.

Further, when no image signal is input from the switch 313, the rearranging unit 316 may output the image signal from the contrast-adjusting unit 315 to the TFT 37 without effecting the rearrangement, or may regard the image signals from the contrast-adjusting unit 315 as the image signals from the contrast-adjusting unit 315 and from the switch 313, and may alternately rearrange them as described above to output them to the TFT 37. It is, further, allowable to use a particular image (e.g., monochromatic image), regard the particular image as the image signal from the switch 313, alternately rearrange the particular image and the image signal from the contrast-adjusting unit 315 as described above, and outputs them to the TFT 37, or arrange the image signals from the contrast-adjusting unit 315 on the pixels corresponding to the second image signals, and outputs them to the TFT 37.

Here, responsive to an instruction for displaying a single image from the operation unit 340, a rearrangement control signal for executing the above control may be output to the rearranging unit 316 from the microcomputer 260. Or, if a passenger detector unit 222 has detected that only one passenger is on board, the rearrangement control signal for effecting the above control may be output to the rearranging unit 316 from the microcomputer 260.

The TFT 37 is connected to the rearranging unit 316, and displays the image signals from the rearranging unit 316 on the liquid crystal screen. As described earlier, the parallax barrier 108 with slits of a width of a pixel (or of a width of a plurality of pixels) is provided on the front surface of the TFT 37. The parallax barrier 108 limits the outgoing directions of display light of image signals. Therefore, the first image (e.g., NTSC image) expressed by the first image signal can be seen on the assistant driver's seat side, and the second image (e.g., navigation image) expressed by the second image signal can be seen on the driver's seat side.

The microcomputer 260 is connected to the operation unit 340, second A/D converter unit 312, switch 313 and contrast-adjusting unit 315. Based on an instruction for adjusting the contrast of the second image signal from the operation unit 340, the microcomputer 260 outputs a reference voltage VRH that serves as a reference for effecting the A/D converter as a contrast adjust signal to the second A/D converter unit 312. The microcomputer 260 varies the reference voltage VRH based on the instruction for adjusting the contrast of the second image signal from the operation unit 340 to thereby adjust the contract of the second image displayed on the TFT 37. The microcomputer 260 outputs the reference voltage that serves as a reference for effecting the A/D converter to the first A/D converter unit 311, too. In this case, however, the reference voltage is maintained constant.

Further, when the operation unit 340 has issued an instruction for displaying the same image, an instruction for synthesizing and displaying the first image signal and the second image signal, and an instruction for displaying a single image, the microcomputer 260 produces a signal for so controlling the first A/D converter unit 311 or the second A/D converter unit 312 as to receive an analog image signal corresponding to an image that is instructed to be displayed, a control signal for so controlling the switch 313 that the first digital image signal and the second digital image signal are synthesized together through the synthesizer unit 314, and a rearrangement control signal for controlling the rearrangement in the rearranging unit 316.

In this embodiment, the device for adjusting the contrast of the invention corresponds to the second A/D converter unit 312, display ASIC 310 or second A/D converter unit 312 and microcomputer 260, or display ASIC 310 and microcomputer 260.

FIG. 39 is a diagram illustrating a relationship between the reference voltage VRH and the second analog image signal (e.g., analog RGB image signal for navigation) input to the second A/D converter unit 312, wherein the abscissa represents the time (T) and the ordinate represents the analog voltage (V).

When put to the A/D conversion, in general, the output digital value is decided based on the reference voltage VRH. That is, as shown in portion (A) of FIG. 39, the output digital value is decided by a relative ratio of when the reference voltage VRH is set to be 255 (when 8 bits are output).

For example, if it is presumed that the position of the highest voltage of the analog image signal is A, the voltage at that moment is 1.5 V, and the reference voltage VRH is 2 V, then the output digital value X at the position A is, $$2:1.5=255:X$$

$$\therefore X=(1.5/2)\times 255\approx 191$$

Here, if the reference voltage VRH is varied, the output digital value varies. Referring, for example, to portion (B) of FIG. 39, if the reference voltage VRH is 1.5 V, then the output digital value X1 at the position A is, $$1.5:1.5=255:X1$$

$$\therefore X1=(1.5/1.5)\times 255=255$$

Further, if the reference voltage VRH is 2.5 V, then the output digital value X2 at the position A is, 2.5:1.5=255:X2

∴X2=(1.5/2.5)×255≈153

Therefore, if the reference voltage VRH is varied, the output digital value varies, too. If the output digital value varies, an image can be output adjusting the contrast such as whiteness, blackness, etc.

FIG. 40 is a diagram illustrating how the output digital value varies when the reference voltage VRH is varied. The diagrams on the left side are the graphs of analog image signals, wherein the abscissa represents the time and the ordinate represents the voltage. The diagrams on the right side are the graphs of digital image signals, wherein the abscissa represents the time and the ordinate represents the output digital value.

Referring, for example, to portion (B) of FIG. 40, if the reference voltage VRH is about 1.4 V, an image is displayed having a standard whiteness. Further, if the reference voltage VRH is set to be higher than the above value, the image becomes slightly darker. If the reference voltage is lowered, the image that is displayed becomes bright (see portion (A) of FIG. 40 and portion (C) of FIG. 40).

To adjust the contrast, the user selectively operates the operation unit 340 (e.g., operation switch, operation button, etc.). Then, the microcomputer 260 detects the operation and outputs a reference voltage VRH which corresponds to the operation to adjust the contrast.

Reverting to FIG. 39, the second image signal (e.g., digital RGB signal for navigation) adjusted for its contrast is output to the synthesizer unit 314 or to the rearranging unit 316 via the switch 313. Thereafter, the rearranging unit 316 receives the first image signal (e.g., NTSC digital image signal) and a second image signal (e.g., digital RGB signal for navigation), and rearranges the image signals so that the images are displayed on the TFT 37. Therefore, the TFT 37 displays the first image (e.g., NTSC image) of the first image signal having the adjusted contrast as well as the second image (e.g., image for navigation) of the second image signal having the adjusted contrast.

In this embodiment, the second image signal is already adjusted for its contrast by the second A/D converter unit 312, and there is no need of providing a contrast-adjusting unit for the second image signals between the switch 313 and the rearranging unit 316 individually from the contrast-adjusting unit 315. Therefore, the display ASIC 310 can be simply constituted at a decreased cost.

The above embodiment has dealt with the case of when the variable reference voltage VRH was output to the second A/D converter unit 312 only. In addition to the above, however, the reference voltage VRH may be output not only to the second A/D converter unit 312 but also to the first A/D converter unit 311 as illustrated in a first modified example of FIG. 41. In this case, a first digital image signal having the adjusted contrast is output from the first A/D converter unit 311 like the second digital image signal having the adjusted contrast output from the second A/D converter unit 312. Therefore, since the first digital image signal has already been adjusted for its contrast, the contrast-adjusting unit 315 does not have to be provided between the synthesizing unit 314 and the rearranging unit 316 as compared to the above example. Without provided with the contrast-adjusting unit 315, the display ASIC 310 can be realized at a further decreased cost.

Further, instead of outputting the reference voltage VRH of the same value to the first A/D converter unit 311 and to the second A/D converter unit 312, reference voltages of different values (first reference voltage, second reference voltage) may be output to the converter units 311 and 312. Digital image signals adjusted for their contrasts are output from the converter units 311 and 312.

The above embodiment has dealt with a case in which the switch 313 has output the second digital image signal to either the synthesizer unit 314 or the rearranging unit 316. In addition to the above, however, the switch 317 may be so constituted that the second digital image signal output from the second A/D converter unit 312 is output to the rearranging unit 316 at all times and is, further, output to the synthesizing unit 314 or is not output thereto as in a second modified example shown in FIG. 42. The output to the synthesizer unit 314 is switched based on a control signal from the microcomputer 260. Therefore, if, for example, the first image is a TV image and the second image is a navigation image, the navigation image is output to the synthesizer unit 314, so that the navigation image is on-screen-displayed on the TV image on the assistant driver's seat side (or on the driver's seat side) and the navigation image is displayed on the driver's seat side (or on the assistant driver's seat side).

The above embodiment has described the case in which the display ASIC 310 was provided with the switch 313. However, the display ASIC 310 may not be provided with the switch 313, and the output of the second A/D converter unit 312 may be input to the rearranging unit 316.

In the above embodiment, further, the TFT 37 has displayed the first image (e.g., NTSC image) as the image on the assistant driver's seat side and the second image (e.g., image for navigation) as the image on the driver's seat side. In addition to the above, however, various images may be displayed on each side. For example, a TV image received through a TV antenna and a DVD image may be displayed on the assistant driver's seat side, and a travel regulation image may be displayed on the driver's seat side.

In the above embodiment, the first image signal was for forming the image on the assistant driver's seat side where it is highly probable to display the images that require fine contrast adjustment, such as NTSC image, TV image and DVD image, and the second image signal was for forming the image on the driver's seat side where it is highly probable to display the images that do not require so much fine contrast adjustment, such as images for navigation. In addition to the above, the first image formed by the first image signals may be displayed on the driver's seat side, and the second image formed by the second image signals may be displayed on the assistant driver's seat side. This can be realized by controlling the rearrangement of pixels through the rearranging unit 316.

Further, the above embodiment has dealt with the case of displaying two images. However, more images may be displayed. This can be realized by adjusting a predetermined number of images for their contrasts through the A/D converter unit.

In the above embodiment, further, the second A/D converter unit 312 has output 8-bit digital values. However, substantially the same action and effect are exhibited even with any other bit numbers.

Further, though the liquid crystal display of the TFT-type was described, it is also allowable to use the liquid crystal display of any other types, such as the STN (super twisted Nematic) type, DSTN (dual-scan super twisted Nematic) type, etc. In addition to the liquid display, there may be used a plasma display and an EL display. In any of these cases, the actions and the effects that are exhibited are the same as those of the above-mentioned embodiment.

Further, the above embodiment has dealt with the case in which the device for adjusting the contrast of the invention was applied to a car navigation device. In addition to the above, the device for adjusting the contrast of the invention can be applied to any equipment provided with a display device, such as a TV receiver for domestic use, cell phone and the like. In these cases, too, the same action and effect are obtained as those of the above examples.

Concerning the industrial applicability, the present invention is not limited to the flat panel-type liquid crystal display devices only but can further be applied to Brawn tube display devices, as well. Further, the flat panels are not limited to the liquid crystal display panels only but may also be the plasma display panels and organic EL display panels. Moreover, the present invention is not limited to car navigation devices only but can be applied to any equipment furnished with a display unit capable of offering a multi-view display ranging from such familiar devices as cell phones, PDAs (personal digital assistants), personal computers and TV receivers through up to measuring instruments, medical equipment and industrial machinery in general. Further, the invention is not limited to the two-dimensional (2D) displays only but can also be applied even to the three-dimensional (3D) displays capable of displaying a solid image by enabling both eyes of a viewer to view different images.

The invention claimed is:

1. A display device comprising:
a display unit for displaying a plurality of different images corresponding to a plurality of viewing directions so as to overlap images one upon another on a common screen;
an image quality-adjusting unit for independently adjusting the image qualities corresponding to the plurality of different images;
a preset holding unit for storing an image quality adjust setpoint representing an image quality-adjusting state for at least one image quality adjust setpoint registration operation unit; and
a preset image quality-adjusting unit for detecting the operation of the image quality adjust setpoint registration operation unit, and for adjusting the quality of the image that is to be adjusted by using the corresponding image quality adjust setpoint stored in the preset holding unit.

2. A display device comprising:
a display unit for displaying a plurality of different images corresponding to a plurality of viewing directions so as to overlap images one upon another on a common screen;
an image quality-adjusting unit for independently adjusting the image qualities corresponding to the plurality of different images;
a mode change-over operation unit for instructing the change-over of the adjusting mode; and
a mode change-over unit for detecting the operation of the mode change-over operation unit, and for changing over from an independent mode for independently adjusting the qualities of the plurality of different images to a common mode for commonly adjusting the image qualities of the plurality of different images.

3. A display device comprising:
a display unit for displaying a plurality of different images corresponding to a plurality of viewing directions so as to overlap images one upon another on a common screen;
an image quality-adjusting unit for independently adjusting the image qualities corresponding to the plurality of different images;
a common surrounding environment sensor for detecting the surrounding environment; and
a to-meet-the-surrounding-environment common compensation unit for commonly adjusting the image qualities of the plurality of different images depending upon the output of the common surrounding environment sensor.

4. A display device comprising:
a display unit for displaying a plurality of different images corresponding to a plurality of viewing directions so as to overlap images one upon another on a common screen;
an image quality-adjusting unit for independently adjusting the image qualities corresponding to the plurality of different images;
a plurality of independent surrounding environment sensors for independently detecting the surrounding environments of the plurality of different images; and
a to-meet-the-surrounding-environment compensation unit for adjusting the image quality of a corresponding image depending upon the outputs of the plurality of independent surrounding environment sensors.

5. A display device comprising:
a display unit for displaying a plurality of different images corresponding to a plurality of viewing directions so as to overlap images one upon another on a common screen;
an image quality-adjusting unit for independently adjusting the image qualities corresponding to the plurality of different images;
an initial image quality adjust setpoint storage unit for storing initial image quality adjust setpoints of the plurality of different images;
wherein at the start of the display device or at the start of displaying a plurality of different images corresponding to a plurality of viewing directions, the image quality-adjusting unit adjusts the image qualities of the plurality of images by using the initial image quality adjust setpoints stored in the initial image quality adjust setpoint storage unit.

6. A display device comprising:
a display unit for displaying a plurality of different images corresponding to a plurality of viewing directions so as to overlap images one upon another on a common screen;
an image quality-adjusting unit for independently adjusting the image qualities corresponding to the plurality of different images;
an adjust frequency storage unit for storing the image quality adjust setpoints of the plurality of different images and the frequency of adjustments by using the image quality adjust setpoints;
wherein at the start of the display device or at the start of displaying a plurality of different images corresponding to a plurality of viewing directions, the image quality-adjusting unit adjusts the image qualities of the plurality of different images by using the frequency of adjustments stored in the adjust frequency storage unit.

7. A display device comprising:
a display unit for displaying a plurality of different images corresponding to a plurality of viewing directions so as to overlap images one upon another on a common screen;

an image quality-adjusting unit for independently adjusting the image qualities corresponding to the plurality of different images; wherein the image quality-adjusting unit has a plurality of image quality-adjusting units for independently adjusting the image qualities of the plurality of different images; and at least one image quality-adjusting unit in the plurality of image quality-adjusting units comprises an A/D converter unit for converting analog image signals that are input into digital image signals and for outputting them; and the quality of the image is adjusted by varying a reference voltage that serves as a reference at the time of effecting the A/D conversion by the A/D converter unit.

* * * * *